(12) United States Patent
Rozbicki et al.

(10) Patent No.: US 12,235,560 B2
(45) Date of Patent: *Feb. 25, 2025

(54) FASTER SWITCHING ELECTROCHROMIC DEVICES

(71) Applicant: View, Inc., Milpitas, CA (US)

(72) Inventors: Robert T. Rozbicki, Saratoga, CA (US); Anshu A. Pradhan, Collierville, TN (US); Sridhar Karthik Kailasam, Fremont, CA (US); Robin Friedman, Redwood City, CA (US); Gordon E. Jack, San Jose, CA (US); Dane Thomas Gillaspie, Fremont, CA (US)

(73) Assignee: View, Inc., San Jose, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/597,701

(22) PCT Filed: Jul. 30, 2020

(86) PCT No.: PCT/US2020/044337
§ 371 (c)(1),
(2) Date: Jan. 19, 2022

(87) PCT Pub. No.: WO2021/022084
PCT Pub. Date: Feb. 4, 2021

(65) Prior Publication Data
US 2022/0252952 A1 Aug. 11, 2022

Related U.S. Application Data

(63) Continuation-in-part of application No. 16/327,789, filed as application No. PCT/US2017/047664 on (Continued)

(51) Int. Cl.
*G02F 1/153* (2006.01)
*E06B 9/24* (2006.01)
(Continued)

(52) U.S. Cl.
CPC .............. *G02F 1/1533* (2013.01); *E06B 9/24* (2013.01); *G02F 1/133345* (2013.01);
(Continued)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS

| 4,293,194 A | 10/1981 | Takahashi |
| 4,308,316 A | 12/1981 | Gordon |

(Continued)

FOREIGN PATENT DOCUMENTS

| AU | 2012209352 A1 | 8/2013 |
| CN | 1267416 A | 9/2000 |

(Continued)

OTHER PUBLICATIONS

Abdullah, et al., The properties of ITO/arc-ZnO passivating layer for TCO conducting substrate deposited by RF magnetron sputtering, Advanced Materials Research, vol. 832, 2014, pp. 579-584.
(Continued)

*Primary Examiner* — Dawayne Pinkney
(74) *Attorney, Agent, or Firm* — Weaver Austin Villeneuve & Sampson LLP; Brian D. Griedel

(57) ABSTRACT

Electrochromic device (550) having at least one multi-layer conductor (560,580) with a metal layer (564,584) between a first transparent conductive oxide layer (562,566,582,586) and a second transparent conductive oxide layer (562,566, 582,586) and optionally having one or more tuning layers adjacent the metal layer.

29 Claims, 16 Drawing Sheets

Related U.S. Application Data

Aug. 18, 2017, now Pat. No. 11,054,711, which is a continuation-in-part of application No. PCT/US2017/031106, filed on May 4, 2017, and a continuation-in-part of application No. PCT/US2015/062387, filed on Nov. 24, 2015, and a continuation-in-part of application No. PCT/US2016/023293, filed on Mar. 18, 2016, said application No. PCT/US2017/031106 is a continuation-in-part of application No. PCT/US2015/062387, filed on Nov. 24, 2015.

(60) Provisional application No. 62/379,163, filed on Aug. 24, 2016, provisional application No. 62/378,136, filed on Aug. 22, 2016, provisional application No. 62/352,508, filed on Jun. 20, 2016, provisional application No. 62/340,936, filed on May 24, 2016, provisional application No. 62/333,103, filed on May 6, 2016, provisional application No. 62/136,354, filed on Mar. 20, 2015, provisional application No. 62/084,502, filed on Nov. 25, 2014, provisional application No. 62/881,144, filed on Jul. 31, 2019.

(51) Int. Cl.
| | | |
|---|---|---|
| *G02F 1/01* | (2006.01) | |
| *G02F 1/03* | (2006.01) | |
| *G02F 1/1333* | (2006.01) | |
| *G02F 1/1335* | (2006.01) | |
| *G02F 1/15* | (2019.01) | |
| *G02F 1/1523* | (2019.01) | |
| *G02F 1/155* | (2006.01) | |
| *G02F 1/157* | (2006.01) | |
| *G09G 3/19* | (2006.01) | |
| *H04N 9/16* | (2006.01) | |
| *E06B 3/67* | (2006.01) | |

(52) U.S. Cl.
CPC ...... *G02F 1/133514* (2013.01); *G02F 1/1523* (2013.01); *G02F 1/155* (2013.01); *G02F 1/157* (2013.01); *E06B 3/6722* (2013.01); *E06B 2009/2464* (2013.01); *G02F 2001/1536* (2013.01)

(58) Field of Classification Search
CPC .......... G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 250/70; 348/817; 438/929
See application file for complete search history.

(56) References Cited

U.S. PATENT DOCUMENTS

| | | |
|---|---|---|
| 4,419,386 A | 12/1983 | Gordon |
| 4,752,119 A | 6/1988 | Ueno et al. |
| 4,854,675 A | 8/1989 | Yamazaki et al. |
| 4,864,314 A | 9/1989 | Bond |
| 4,874,903 A | 10/1989 | Clarke |
| 4,932,755 A | 6/1990 | Holdridge et al. |
| 4,950,888 A | 8/1990 | Hamada |
| 5,124,833 A | 6/1992 | Barton et al. |
| 5,133,594 A | 7/1992 | Haas et al. |
| 5,139,850 A | 8/1992 | Clarke et al. |
| 5,147,694 A | 9/1992 | Clarke |
| 5,202,788 A | 4/1993 | Weppner |
| 5,352,504 A | 10/1994 | Boulanger et al. |
| 5,625,369 A | 4/1997 | Newman |
| 5,699,192 A | 12/1997 | Van Dine et al. |
| 5,724,175 A | 3/1998 | Hichwa et al. |
| 5,724,177 A | 3/1998 | Ellis, Jr. et al. |
| 5,724,187 A | 3/1998 | Varaprasad et al. |
| 5,830,336 A | 11/1998 | Schulz |
| 5,877,936 A | 3/1999 | Nishitani et al. |
| 5,959,586 A | 9/1999 | Benham et al. |
| 5,959,762 A | 9/1999 | Bandettini et al. |
| 6,032,020 A | 2/2000 | Cook et al. |
| 6,089,721 A | 7/2000 | Schierbeek |
| 6,094,292 A | 7/2000 | Goldner et al. |
| 6,104,513 A | 8/2000 | Bloom |
| 6,128,471 A | 10/2000 | Quelch et al. |
| 6,176,715 B1 | 1/2001 | Buescher |
| 6,284,412 B1 | 9/2001 | Minakata et al. |
| 6,294,111 B1 | 9/2001 | Shacklett, III et al. |
| 6,407,847 B1 | 6/2002 | Poll et al. |
| 6,456,239 B1 | 9/2002 | Werb et al. |
| 6,620,342 B1 | 9/2003 | Burchill et al. |
| 6,703,981 B2 | 3/2004 | Meitzler et al. |
| 6,770,176 B2 | 8/2004 | Benson et al. |
| 6,795,226 B2 | 9/2004 | Agrawal et al. |
| 6,809,692 B2 | 10/2004 | Puente Baliarda et al. |
| 6,870,656 B2 | 3/2005 | Tonar et al. |
| 7,265,890 B1 | 9/2007 | Demiryont |
| 7,593,154 B2 | 9/2009 | Burdis et al. |
| 7,710,671 B1 | 5/2010 | Kwak et al. |
| 7,722,948 B2 | 5/2010 | Dixon et al. |
| 7,777,933 B2 | 8/2010 | Piroux et al. |
| 7,869,114 B2 | 1/2011 | Valentin et al. |
| 8,004,744 B2 | 8/2011 | Burdis et al. |
| 8,035,882 B2 | 10/2011 | Fanton et al. |
| 8,071,420 B2 | 12/2011 | Su et al. |
| 8,085,460 B2 | 12/2011 | Finley et al. |
| 8,099,140 B2 | 1/2012 | Arai |
| 8,164,818 B2 | 4/2012 | Collins et al. |
| 8,164,848 B2 | 4/2012 | Chan et al. |
| 8,213,074 B1 | 7/2012 | Shrivastava et al. |
| 8,259,380 B2 | 9/2012 | Valentin et al. |
| 8,614,848 B2 | 12/2013 | Ueda et al. |
| 8,634,764 B2 | 1/2014 | Cruz et al. |
| 8,780,432 B1 | 7/2014 | Nguyen |
| 8,924,076 B2 | 12/2014 | Boote et al. |
| 8,927,069 B1 | 1/2015 | Estinto et al. |
| 8,975,789 B2 | 3/2015 | Snyker et al. |
| 9,007,674 B2 | 4/2015 | Kailasam et al. |
| 9,019,588 B2 | 4/2015 | Brown et al. |
| 9,102,124 B2 | 8/2015 | Collins et al. |
| 9,229,291 B2 | 1/2016 | Kailasam et al. |
| 9,356,316 B2 | 5/2016 | Sun et al. |
| 9,408,303 B2 | 8/2016 | Hassan et al. |
| 9,454,053 B2 | 9/2016 | Strong et al. |
| 9,454,055 B2 | 9/2016 | Brown et al. |
| 9,482,921 B2 | 11/2016 | Lamine et al. |
| 9,581,875 B2 | 2/2017 | Burdis et al. |
| 9,664,976 B2 | 5/2017 | Rozbicki |
| 9,703,167 B2 | 7/2017 | Parker et al. |
| 9,898,912 B1 | 2/2018 | Jordan, II et al. |
| 9,921,421 B2 | 3/2018 | Branda et al. |
| 9,939,704 B2 | 4/2018 | Patterson et al. |
| 9,952,481 B2 | 4/2018 | Rozbicki et al. |
| 9,958,750 B2 | 5/2018 | Parker et al. |
| 9,995,985 B2 | 6/2018 | Parker et al. |
| 10,114,265 B2 | 10/2018 | Strong et al. |
| 10,153,845 B2 | 12/2018 | Ashrafi |
| 10,254,618 B2 | 4/2019 | Parker |
| 10,288,969 B2 | 5/2019 | Kailasam et al. |
| 10,295,880 B2 | 5/2019 | Dixit et al. |
| 10,299,101 B1 | 5/2019 | Lim et al. |
| 10,303,032 B2 | 5/2019 | Brossard et al. |
| 10,409,130 B2 | 9/2019 | Parker et al. |
| 10,505,751 B2 | 12/2019 | Casilli |
| 10,551,711 B2 | 2/2020 | Kozlowski et al. |
| 10,673,121 B2 | 6/2020 | Hughes et al. |
| 10,781,583 B2 | 9/2020 | Silva |
| 10,782,583 B2 | 9/2020 | Bhatnagar et al. |
| 10,788,723 B2 | 9/2020 | Rozbicki et al. |
| 10,795,232 B2 | 10/2020 | Strong et al. |
| 10,797,373 B2 | 10/2020 | Hughes et al. |
| 10,802,371 B2 | 10/2020 | Dixit et al. |
| 10,867,266 B1 | 12/2020 | Carlin et al. |
| 10,969,645 B2 | 4/2021 | Rozbicki et al. |

(56) References Cited

U.S. PATENT DOCUMENTS

| | | |
|---|---|---|
| 11,054,711 B2 | 7/2021 | Shrivastava et al. |
| 11,065,845 B2 | 7/2021 | Parker et al. |
| 11,086,182 B2 | 8/2021 | Dixit et al. |
| 11,114,742 B2 | 9/2021 | Shrivastava et al. |
| 11,205,926 B2 | 12/2021 | Shrivastava et al. |
| 11,322,818 B2 | 5/2022 | Kum et al. |
| 11,342,791 B2 | 5/2022 | Rozbicki et al. |
| 11,426,979 B2 | 8/2022 | Strong et al. |
| 11,462,814 B2 | 10/2022 | Hughes et al. |
| 11,559,852 B2 | 1/2023 | Dixit et al. |
| 11,559,970 B2 | 1/2023 | Strong et al. |
| 11,561,446 B2 | 1/2023 | Kailasam et al. |
| 11,599,003 B2 | 3/2023 | Kailasam |
| 11,630,366 B2 | 4/2023 | Shrivastava et al. |
| 11,668,990 B2 | 6/2023 | Rozbicki et al. |
| 11,670,833 B2 | 6/2023 | Hughes et al. |
| 11,732,527 B2 | 8/2023 | Rozbicki et al. |
| 11,799,187 B2 | 10/2023 | Shrivastava et al. |
| 11,865,632 B2 | 1/2024 | Dixit et al. |
| 2002/0004261 A1 | 1/2002 | Asami et al. |
| 2002/0024424 A1 | 2/2002 | Burns et al. |
| 2002/0072868 A1 | 6/2002 | Bartone et al. |
| 2002/0075552 A1 | 6/2002 | Poll et al. |
| 2002/0109634 A1 | 8/2002 | Aisenbrey |
| 2002/0140611 A1 | 10/2002 | Ligander et al. |
| 2002/0149829 A1 | 10/2002 | Mochizuka et al. |
| 2003/0007462 A1 | 1/2003 | Makinen et al. |
| 2003/0034926 A1 | 2/2003 | Veerasamy |
| 2003/0098791 A1 | 5/2003 | Carlson et al. |
| 2003/0112187 A1 | 6/2003 | Whitehouse |
| 2003/0117066 A1 | 6/2003 | Silvernail |
| 2003/0137712 A1 | 7/2003 | Westfall et al. |
| 2003/0179432 A1 | 9/2003 | Vincent et al. |
| 2003/0227663 A1 | 12/2003 | Agrawal et al. |
| 2003/0232181 A1 | 12/2003 | Simpson et al. |
| 2004/0042059 A1 | 3/2004 | Minami et al. |
| 2004/0053576 A1 | 3/2004 | Vasseur et al. |
| 2004/0121571 A1 | 6/2004 | Uchikoshi et al. |
| 2004/0123804 A1 | 7/2004 | Yamazaki et al. |
| 2004/0148057 A1 | 7/2004 | Breed et al. |
| 2004/0150867 A1 | 8/2004 | Lee et al. |
| 2004/0160324 A1 | 8/2004 | Stilp |
| 2004/0160657 A1 | 8/2004 | Tonar et al. |
| 2004/0196179 A1 | 10/2004 | Turnbull |
| 2004/0202001 A1 | 10/2004 | Roberts et al. |
| 2004/0233537 A1 | 11/2004 | Agrawal et al. |
| 2004/0234678 A1 | 11/2004 | Hirai et al. |
| 2005/0003737 A1 | 1/2005 | Montierth et al. |
| 2005/0082639 A1 | 4/2005 | Kikuta et al. |
| 2005/0117193 A1 | 6/2005 | Poll et al. |
| 2005/0157675 A1 | 7/2005 | Feder et al. |
| 2005/0195488 A1 | 9/2005 | McCabe et al. |
| 2005/0254442 A1 | 11/2005 | Proctor et al. |
| 2005/0260983 A1 | 11/2005 | DiPiazza |
| 2006/0033663 A1 | 2/2006 | Saint Clair et al. |
| 2006/0033978 A1 | 2/2006 | Morin et al. |
| 2006/0098289 A1 | 5/2006 | McCabe et al. |
| 2006/0132885 A1 | 6/2006 | Pichot et al. |
| 2006/0145833 A1 | 7/2006 | Brandt et al. |
| 2006/0209383 A1 | 9/2006 | Burdis et al. |
| 2006/0278333 A1 | 12/2006 | Lee et al. |
| 2007/0002422 A1 | 1/2007 | O'Shaughnessy |
| 2007/0042819 A1 | 2/2007 | Li et al. |
| 2007/0097481 A1 | 5/2007 | Burdis et al. |
| 2007/0109219 A1 | 5/2007 | Whitesides et al. |
| 2007/0115979 A1 | 5/2007 | Balay et al. |
| 2007/0126637 A1 | 6/2007 | Habib et al. |
| 2007/0138949 A1 | 6/2007 | Yoshida et al. |
| 2007/0182705 A1 | 8/2007 | Leyland et al. |
| 2007/0292606 A1 | 12/2007 | Demiryont |
| 2008/0018979 A1 | 1/2008 | Mahe et al. |
| 2008/0026166 A1 | 1/2008 | Pilloy |
| 2008/0030836 A1 | 2/2008 | Tonar et al. |
| 2008/0037128 A1 | 2/2008 | Knapp |
| 2008/0099065 A1 | 5/2008 | Ito et al. |
| 2008/0143906 A1 | 6/2008 | Allemand et al. |
| 2008/0177919 A1 | 7/2008 | Miyazawa |
| 2008/0190759 A1 | 8/2008 | Valentin et al. |
| 2008/0212189 A1 | 9/2008 | Baur et al. |
| 2008/0266642 A1 | 10/2008 | Burrell et al. |
| 2008/0304131 A1 | 12/2008 | Nguyen |
| 2009/0014693 A1 | 1/2009 | Zahn |
| 2009/0047900 A1 | 2/2009 | Cruz et al. |
| 2009/0054054 A1 | 2/2009 | Shao et al. |
| 2009/0067031 A1 | 3/2009 | Piroux et al. |
| 2009/0139052 A1 | 6/2009 | Boenisch |
| 2009/0140219 A1 | 6/2009 | Zahn |
| 2009/0148764 A1 | 6/2009 | Kwak et al. |
| 2009/0163170 A1 | 6/2009 | Norp et al. |
| 2009/0189458 A1 | 7/2009 | Kawasaki |
| 2009/0202743 A1 | 8/2009 | Schaepkens et al. |
| 2009/0224980 A1 | 9/2009 | Cruz et al. |
| 2009/0272483 A1 | 11/2009 | Howes |
| 2009/0284220 A1 | 11/2009 | Toncich et al. |
| 2009/0284821 A1 | 11/2009 | Valentin et al. |
| 2009/0296190 A1 | 12/2009 | Anderson et al. |
| 2009/0304912 A1 | 12/2009 | Kwak et al. |
| 2009/0304970 A1 | 12/2009 | Imaizumi et al. |
| 2009/0308933 A1 | 12/2009 | Osada |
| 2009/0316248 A1 | 12/2009 | Karmhag et al. |
| 2009/0323161 A1 | 12/2009 | Fuss et al. |
| 2009/0323162 A1 | 12/2009 | Fanton et al. |
| 2010/0027694 A1 | 2/2010 | Touboul et al. |
| 2010/0052718 A1 | 3/2010 | Baker et al. |
| 2010/0052844 A1 | 3/2010 | Wesby |
| 2010/0053722 A1 | 3/2010 | Finley et al. |
| 2010/0060971 A1 | 3/2010 | Schwendeman et al. |
| 2010/0067090 A1 | 3/2010 | Egerton et al. |
| 2010/0076615 A1 | 3/2010 | Daniel et al. |
| 2010/0079844 A1 | 4/2010 | Kurman et al. |
| 2010/0165436 A1 | 7/2010 | Voss et al. |
| 2010/0165440 A1 | 7/2010 | Nguyen et al. |
| 2010/0171667 A1 | 7/2010 | Knudsen |
| 2010/0210233 A1 | 8/2010 | Cook et al. |
| 2010/0243427 A1 | 9/2010 | Kozlowski et al. |
| 2010/0245973 A1 | 9/2010 | Wang et al. |
| 2010/0245991 A1 | 9/2010 | Ishihara et al. |
| 2010/0302624 A1 | 12/2010 | Moskowitz |
| 2010/0321758 A1 | 12/2010 | Bugno et al. |
| 2011/0031821 A1 | 2/2011 | Greene et al. |
| 2011/0074342 A1 | 3/2011 | Maclaughlin |
| 2011/0080629 A1 | 4/2011 | Neuman et al. |
| 2011/0080630 A1 | 4/2011 | Valentin et al. |
| 2011/0083152 A1 | 4/2011 | Centore, III et al. |
| 2011/0096388 A1 | 4/2011 | Agrawal et al. |
| 2011/0124313 A1 | 5/2011 | Jones |
| 2011/0128137 A1 | 6/2011 | Varaprasad et al. |
| 2011/0148218 A1 | 6/2011 | Rozbicki |
| 2011/0151383 A1 | 6/2011 | Yamashiro et al. |
| 2011/0159821 A1 | 6/2011 | Park |
| 2011/0170170 A1 | 7/2011 | Boote |
| 2011/0181939 A1 | 7/2011 | Bressand et al. |
| 2011/0199666 A1 | 8/2011 | Chun et al. |
| 2011/0211247 A1 | 9/2011 | Kozlowski et al. |
| 2011/0248901 A1 | 10/2011 | Alexopoulos et al. |
| 2011/0260856 A1 | 10/2011 | Rossmann et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0267673 A1 | 11/2011 | Agrawal et al. |
| 2011/0267674 A1 | 11/2011 | Wang et al. |
| 2011/0267675 A1 | 11/2011 | Wang et al. |
| 2012/0019889 A1 | 1/2012 | Lamine et al. |
| 2012/0033287 A1 | 2/2012 | Friedman et al. |
| 2012/0038967 A1 | 2/2012 | Copeland et al. |
| 2012/0133213 A1 | 5/2012 | Borke et al. |
| 2012/0133315 A1 | 5/2012 | Berman et al. |
| 2012/0147449 A1 | 6/2012 | Bhatnagar et al. |
| 2012/0154241 A1 | 6/2012 | Tatarnikov et al. |
| 2012/0188627 A1 | 7/2012 | Chen et al. |
| 2012/0194895 A1 | 8/2012 | Podbelski et al. |
| 2012/0212794 A1 | 8/2012 | Giron et al. |
| 2012/0217346 A1 | 8/2012 | Eberle et al. |
| 2012/0218620 A1 | 8/2012 | Kwak et al. |

(56) References Cited

U.S. PATENT DOCUMENTS

| | | |
|---|---|---|
| 2012/0218621 A1 | 8/2012 | Kwak et al. |
| 2012/0266945 A1 | 10/2012 | Letocart et al. |
| 2012/0275008 A1 | 11/2012 | Pradhan et al. |
| 2012/0281268 A1 | 11/2012 | McCabe et al. |
| 2012/0287017 A1 | 11/2012 | Parsche |
| 2012/0327499 A1 | 12/2012 | Parker et al. |
| 2012/0328849 A1 | 12/2012 | Neill et al. |
| 2013/0003157 A1 | 1/2013 | Wang et al. |
| 2013/0033736 A1 | 2/2013 | McCabe et al. |
| 2013/0054033 A1 | 2/2013 | Casilli |
| 2013/0092679 A1 | 4/2013 | Rozbicki et al. |
| 2013/0107563 A1 | 5/2013 | McCabe et al. |
| 2013/0128342 A1 | 5/2013 | Mitarai et al. |
| 2013/0194141 A1 | 8/2013 | Okajima et al. |
| 2013/0222877 A1 | 8/2013 | Greer et al. |
| 2013/0226353 A1 | 8/2013 | Park |
| 2013/0243120 A1 | 9/2013 | Tsai et al. |
| 2013/0271814 A1 | 10/2013 | Brown |
| 2013/0278988 A1 | 10/2013 | Jack et al. |
| 2013/0335800 A1 | 12/2013 | Konkin et al. |
| 2013/0337603 A1 | 12/2013 | Steinhauser et al. |
| 2014/0008992 A1 | 1/2014 | Leabman |
| 2014/0022621 A1 | 1/2014 | Kailasam et al. |
| 2014/0149416 A1 | 5/2014 | Wallace |
| 2014/0171016 A1 | 6/2014 | Sennett et al. |
| 2014/0217967 A1 | 8/2014 | Zeine et al. |
| 2014/0240474 A1 | 8/2014 | Kondo |
| 2014/0243033 A1 | 8/2014 | Wala et al. |
| 2014/0249825 A1 | 9/2014 | Proud |
| 2014/0253996 A1 | 9/2014 | Burdis et al. |
| 2014/0273911 A1 | 9/2014 | Dunn et al. |
| 2014/0319116 A1 | 10/2014 | Fischer et al. |
| 2014/0333485 A1 | 11/2014 | Stone et al. |
| 2014/0340731 A1 | 11/2014 | Strong et al. |
| 2014/0368048 A1 | 12/2014 | Leabman et al. |
| 2014/0368899 A1 | 12/2014 | Greer |
| 2015/0062688 A1 | 3/2015 | Friedman et al. |
| 2015/0092260 A1 | 4/2015 | Parker et al. |
| 2015/0131140 A1 | 5/2015 | Kailasam et al. |
| 2015/0153622 A1 | 6/2015 | Kalweit et al. |
| 2015/0155737 A1 | 6/2015 | Mayo |
| 2015/0198640 A1 | 7/2015 | Lee |
| 2015/0222126 A1 | 8/2015 | Leabman et al. |
| 2015/0253642 A1 | 9/2015 | Kalweit et al. |
| 2015/0323287 A1 | 11/2015 | Durand |
| 2015/0362816 A1 | 12/2015 | Strong et al. |
| 2016/0020647 A1 | 1/2016 | Leabman et al. |
| 2016/0028162 A1 | 1/2016 | Ou et al. |
| 2016/0077257 A1 | 3/2016 | Tatemura et al. |
| 2016/0091769 A1 | 3/2016 | Rozbicki |
| 2016/0097960 A1 | 4/2016 | Dixit et al. |
| 2016/0099757 A1 | 4/2016 | Leabman et al. |
| 2016/0103379 A1 | 4/2016 | Kozlowski et al. |
| 2016/0114523 A1 | 4/2016 | Luten et al. |
| 2016/0124283 A1 | 5/2016 | Brown et al. |
| 2016/0135175 A1 | 5/2016 | Tarlazzi |
| 2016/0138328 A1 | 5/2016 | Behmke et al. |
| 2016/0141258 A1 | 5/2016 | Jain et al. |
| 2016/0149635 A1 | 5/2016 | Hinman et al. |
| 2016/0154290 A1 | 6/2016 | Brown et al. |
| 2016/0181873 A1 | 6/2016 | Mitcheson et al. |
| 2016/0183056 A1 | 6/2016 | Leabman |
| 2016/0199936 A1 | 7/2016 | Luten et al. |
| 2016/0209723 A1 | 7/2016 | Rozbicki |
| 2016/0248270 A1 | 8/2016 | Zeine et al. |
| 2016/0334688 A1 | 11/2016 | Tran et al. |
| 2017/0052753 A1 | 2/2017 | Paolini, Jr. et al. |
| 2017/0066679 A1 | 3/2017 | Yeh |
| 2017/0102601 A1 | 4/2017 | Luten et al. |
| 2017/0104374 A1 | 4/2017 | Zeine et al. |
| 2017/0115544 A1 | 4/2017 | Parker et al. |
| 2017/0117754 A1 | 4/2017 | Noori et al. |
| 2017/0176831 A1 | 6/2017 | Dixit et al. |
| 2017/0184938 A1 | 6/2017 | Bergh et al. |
| 2017/0219903 A1 | 8/2017 | Strong et al. |
| 2017/0219906 A1 | 8/2017 | Garcia et al. |
| 2017/0272145 A1 | 9/2017 | Lilja |
| 2017/0272317 A1 | 9/2017 | Singla et al. |
| 2017/0279155 A1 | 9/2017 | Sun et al. |
| 2017/0365908 A1 | 12/2017 | Hughes et al. |
| 2018/0090992 A1 | 3/2018 | Shrivastava et al. |
| 2018/0095337 A1 | 4/2018 | Rozbicki et al. |
| 2018/0138576 A1 | 5/2018 | Cohen |
| 2018/0173071 A1 | 6/2018 | Mathew et al. |
| 2018/0176799 A1 | 6/2018 | Lange et al. |
| 2018/0187478 A1 | 7/2018 | Vigano et al. |
| 2018/0210307 A1 | 7/2018 | Parker et al. |
| 2018/0259822 A1 | 9/2018 | Dixit et al. |
| 2018/0301783 A1 | 10/2018 | Bulja et al. |
| 2019/0036209 A1 | 1/2019 | Au |
| 2019/0044606 A1 | 2/2019 | Mansikkamaki |
| 2019/0067826 A1 | 2/2019 | Achour et al. |
| 2019/0079365 A1 | 3/2019 | Sarrach et al. |
| 2019/0086756 A1 | 3/2019 | Dixit et al. |
| 2019/0097827 A1 | 3/2019 | Angle et al. |
| 2019/0107764 A1 | 4/2019 | Kailasam et al. |
| 2019/0155120 A1 | 5/2019 | Li et al. |
| 2019/0155122 A1 | 5/2019 | Brown et al. |
| 2019/0219881 A1 | 7/2019 | Shrivastava et al. |
| 2019/0267840 A1 | 8/2019 | Rozbicki et al. |
| 2019/0294018 A1 | 9/2019 | Shrivastava et al. |
| 2019/0319335 A1 | 10/2019 | Hughes et al. |
| 2019/0324341 A1 | 10/2019 | Tonar et al. |
| 2019/0331977 A1 | 10/2019 | Rozbicki et al. |
| 2019/0346732 A1 | 11/2019 | Parker et al. |
| 2019/0354071 A1 | 11/2019 | Turney et al. |
| 2019/0356508 A1 | 11/2019 | Trikha et al. |
| 2020/0193155 A1 | 6/2020 | Keohane et al. |
| 2020/0201132 A1 | 6/2020 | Kailasam et al. |
| 2020/0233278 A1 | 7/2020 | Kailasam |
| 2020/0259237 A1 | 8/2020 | Shrivastava et al. |
| 2020/0321682 A1 | 10/2020 | Hughes et al. |
| 2020/0379310 A1 | 12/2020 | Rozbicki et al. |
| 2020/0384738 A1 | 12/2020 | Strong et al. |
| 2021/0001426 A1 | 1/2021 | Dixit et al. |
| 2021/0018810 A1 | 1/2021 | Rozbicki et al. |
| 2021/0040789 A1 | 2/2021 | Rozbicki et al. |
| 2021/0119318 A1 | 4/2021 | Hughes et al. |
| 2021/0191214 A1 | 6/2021 | Rozbicki et al. |
| 2021/0247654 A1 | 8/2021 | Mogensen et al. |
| 2021/0376445 A1 | 12/2021 | Shrivastava et al. |
| 2021/0384764 A1 | 12/2021 | Shrivastava et al. |
| 2021/0394489 A1 | 12/2021 | Strong et al. |
| 2022/0001651 A1 | 1/2022 | Cabrera |
| 2022/0019117 A1 | 1/2022 | Shrivastava et al. |
| 2022/0021099 A1 | 1/2022 | Shrivastava et al. |
| 2022/0032584 A1 | 2/2022 | Parker et al. |
| 2022/0050348 A1 | 2/2022 | Dixit et al. |
| 2022/0080706 A1 | 3/2022 | Strong et al. |
| 2022/0231396 A1 | 7/2022 | Rozbicki et al. |
| 2022/0231399 A1 | 7/2022 | Brown et al. |
| 2022/0241893 A1 | 8/2022 | Dixit et al. |
| 2022/0255351 A1 | 8/2022 | Rozbicki et al. |
| 2023/0029868 A1 | 2/2023 | Ponce et al. |
| 2023/0074720 A1 | 3/2023 | Brown et al. |
| 2023/0261358 A1 | 8/2023 | Hughes et al. |
| 2023/0314892 A1 | 10/2023 | Rozbicki et al. |
| 2023/0324754 A1 | 10/2023 | Rozbicki et al. |
| 2024/0082949 A1 | 3/2024 | Dixit et al. |
| 2024/0192563 A1 | 6/2024 | Hur et al. |
| 2024/0276204 A1 | 8/2024 | Lee et al. |
| 2024/0284155 A1 | 8/2024 | Lee et al. |

FOREIGN PATENT DOCUMENTS

| | | |
|---|---|---|
| CN | 1276574 A | 12/2000 |
| CN | 1350326 A | 5/2002 |
| CN | 1482509 A | 3/2004 |
| CN | 1492274 A | 4/2004 |
| CN | 1537257 A | 10/2004 |
| CN | 1599280 A | 3/2005 |
| CN | 1620678 A | 5/2005 |
| CN | 1688923 A | 10/2005 |
| CN | 1739057 A | 2/2006 |

(56) References Cited

FOREIGN PATENT DOCUMENTS

| | | | |
|---|---|---|---|
| CN | 1808271 A | 7/2006 |
| CN | 1990820 A | 7/2007 |
| CN | 1993648 A | 7/2007 |
| CN | 101032052 A | 9/2007 |
| CN | 101276079 A | 10/2008 |
| CN | 101322069 A | 12/2008 |
| CN | 101401312 A | 4/2009 |
| CN | 101421666 A | 4/2009 |
| CN | 101438205 A | 5/2009 |
| CN | 101535885 A | 9/2009 |
| CN | 101868346 A | 10/2010 |
| CN | 102057323 A | 5/2011 |
| CN | 101438205 B | 9/2011 |
| CN | 102253559 A | 11/2011 |
| CN | 102255119 A | 11/2011 |
| CN | 102325326 A | 1/2012 |
| CN | 102326164 A | 1/2012 |
| CN | 102388340 A | 3/2012 |
| CN | 102460766 A | 5/2012 |
| CN | 103168269 A | 6/2013 |
| CN | 103261960 A | 8/2013 |
| CN | 103793730 A | 5/2014 |
| CN | 104011588 A | 8/2014 |
| CN | 104102060 A | 10/2014 |
| CN | 104321497 A | 1/2015 |
| CN | 104321696 A | 1/2015 |
| CN | 104364706 A | 2/2015 |
| CN | 104834145 A | 8/2015 |
| CN | 104884248 A | 9/2015 |
| CN | 105324708 A | 2/2016 |
| CN | 107533267 A | 1/2018 |
| CN | 104730795 B | 5/2018 |
| CN | 107112620 B | 12/2019 |
| EP | 0413580 A1 | 2/1991 |
| EP | 0588514 A1 | 3/1994 |
| EP | 0725944 A4 | 3/1995 |
| EP | 1382994 A2 | 1/2004 |
| EP | 1297380 B1 | 11/2008 |
| EP | 2078980 A1 | 7/2009 |
| EP | 2645474 A1 | 10/2013 |
| EP | 2733998 A1 | 5/2014 |
| EP | 2791733 A1 | 10/2014 |
| EP | 2851993 A1 | 3/2015 |
| EP | 3118912 A1 | 1/2017 |
| EP | 3238253 A2 | 11/2017 |
| EP | 3617788 A1 | 3/2020 |
| FR | 2669122 A1 | 5/1992 |
| FR | 2969771 A1 | 6/2012 |
| JP | S58126577 A | 7/1983 |
| JP | S58163921 A | 9/1983 |
| JP | S5961820 A | 4/1984 |
| JP | S5994744 A | 5/1984 |
| JP | S63271320 A | 11/1988 |
| JP | H02151838 A | 6/1990 |
| JP | H0728099 A | 1/1995 |
| JP | H10233612 A | 9/1998 |
| JP | 2000165970 A | 6/2000 |
| JP | 2001051307 A | 2/2001 |
| JP | 2001051308 A | 2/2001 |
| JP | 2001133816 A | 5/2001 |
| JP | 2001196826 A | 7/2001 |
| JP | 2002076390 A | 3/2002 |
| JP | 2002507781 A | 3/2002 |
| JP | 2004001765 A | 1/2004 |
| JP | 2005303348 A | 10/2005 |
| JP | 2006252886 A | 9/2006 |
| JP | 2006286412 A | 10/2006 |
| JP | 2007108750 A | 4/2007 |
| JP | 2009005116 A | 1/2009 |
| JP | 2009169229 A | 7/2009 |
| JP | 2011128504 A | 6/2011 |
| JP | 2011526378 A | 10/2011 |
| JP | 2012058515 A | 3/2012 |
| JP | 2012523018 A | 9/2012 |
| JP | 2012194412 A | 10/2012 |
| JP | 2013062133 A | 4/2013 |
| JP | 2013515457 A | 5/2013 |
| JP | 2013149433 A | 8/2013 |
| JP | 2014121122 A | 6/2014 |
| JP | 5556044 B2 | 7/2014 |
| JP | 5564620 B2 | 7/2014 |
| JP | 2014204550 A | 10/2014 |
| JP | 2015128349 A | 7/2015 |
| JP | 2015521459 A | 7/2015 |
| JP | 2016512677 A | 4/2016 |
| JP | 2019508946 A | 3/2019 |
| KR | 100302828 B1 | 7/2002 |
| KR | 20040031685 A | 4/2004 |
| KR | 20060122491 A | 11/2006 |
| KR | 20070055494 A | 5/2007 |
| KR | 20080068165 A | 7/2008 |
| KR | 20100024174 A | 3/2010 |
| KR | 20110128213 A | 11/2011 |
| KR | 20120007471 A | 1/2012 |
| KR | 101346862 B1 | 1/2014 |
| KR | 20150001549 A | 1/2015 |
| KR | 20190142032 A | 12/2019 |
| KR | 20210032133 A | 3/2021 |
| KR | 20210039721 A | 4/2021 |
| SG | 141352 A1 | 4/2008 |
| TW | 282613 B | 8/1996 |
| TW | 201013286 A | 4/2010 |
| TW | 201135545 A | 10/2011 |
| TW | 201211664 A | 3/2012 |
| TW | 201222119 A | 6/2012 |
| TW | 201243470 A | 11/2012 |
| TW | 201342509 A | 10/2013 |
| TW | 201344874 A | 11/2013 |
| TW | 201423773 A | 6/2014 |
| TW | 201435464 A | 9/2014 |
| TW | M519749 U | 4/2016 |
| WO | WO-9415247 A1 | 7/1994 |
| WO | WO-9530495 A1 | 11/1995 |
| WO | WO-9823116 A2 | 5/1998 |
| WO | WO-0182410 A1 | 11/2001 |
| WO | WO-03037056 A1 | 5/2003 |
| WO | WO-2004026633 A2 | 4/2004 |
| WO | WO-2006014591 A2 | 2/2006 |
| WO | WO-2006021707 A1 | 3/2006 |
| WO | WO-2007103342 A2 | 9/2007 |
| WO | WO-2008073372 A2 | 6/2008 |
| WO | WO-2008150851 A1 | 12/2008 |
| WO | WO-2009148861 A2 | 12/2009 |
| WO | WO-2010014648 A1 | 2/2010 |
| WO | WO-2010079388 A1 | 7/2010 |
| WO | WO-2010093703 A1 | 8/2010 |
| WO | WO-2010106648 A1 | 9/2010 |
| WO | WO-2010119228 A1 | 10/2010 |
| WO | WO-2011028254 A2 | 3/2011 |
| WO | WO-2011050291 A2 | 4/2011 |
| WO | WO-2011082208 A2 | 7/2011 |
| WO | WO-2011087726 A2 | 7/2011 |
| WO | WO-2011112882 A1 | 9/2011 |
| WO | WO-2011137080 A1 | 11/2011 |
| WO | WO-2012018688 A1 | 2/2012 |
| WO | WO-2012078634 A2 | 6/2012 |
| WO | WO-2012130262 A1 | 10/2012 |
| WO | WO-2012138281 A1 | 10/2012 |
| WO | WO-2012174260 A2 | 12/2012 |
| WO | WO-2013090209 A1 | 6/2013 |
| WO | WO-2013121103 A1 | 8/2013 |
| WO | WO-2013155467 A1 | 10/2013 |
| WO | WO-2013158365 A1 | 10/2013 |
| WO | WO-2013158464 A1 | 10/2013 |
| WO | WO-2013159778 A1 | 10/2013 |
| WO | WO-2013163107 A1 | 10/2013 |
| WO | WO-2014007487 A1 | 1/2014 |
| WO | WO-2014025913 A1 | 2/2014 |
| WO | WO-2014099974 A1 | 6/2014 |
| WO | WO-2014124303 A2 | 8/2014 |
| WO | WO-2014152493 A1 | 9/2014 |
| WO | WO-2014191770 A1 | 12/2014 |
| WO | WO-2014201287 A1 | 12/2014 |
| WO | WO-2014205014 A1 | 12/2014 |

(56) References Cited

FOREIGN PATENT DOCUMENTS

| WO | WO-2015013578 A1 | 1/2015 |
|---|---|---|
| WO | WO-2015075007 A1 | 5/2015 |
| WO | WO-2015077829 A1 | 6/2015 |
| WO | WO-2015103433 A1 | 7/2015 |
| WO | WO-2016004373 A1 | 1/2016 |
| WO | WO-2016029044 A1 | 2/2016 |
| WO | WO-2016044187 A1 | 3/2016 |
| WO | WO-2016072620 A1 | 5/2016 |
| WO | WO-2016085964 A1 | 6/2016 |
| WO | WO-2016105549 A2 | 6/2016 |
| WO | WO-2016126460 A2 | 8/2016 |
| WO | WO-2016154064 A1 | 9/2016 |
| WO | WO-2016174228 A1 | 11/2016 |
| WO | WO-2017062915 A1 | 4/2017 |
| WO | WO-2017129855 A1 | 8/2017 |
| WO | WO-2017192881 A1 | 11/2017 |
| WO | WO-2018039080 A1 | 3/2018 |
| WO | WO-2018063919 A1 | 4/2018 |
| WO | WO-2018094203 A1 | 5/2018 |
| WO | WO-2018098089 A1 | 5/2018 |
| WO | WO-2018200702 A1 | 11/2018 |
| WO | WO-2019022129 A1 | 1/2019 |
| WO | WO-2019178540 A1 | 9/2019 |
| WO | WO-2019204205 A1 | 10/2019 |
| WO | WO-2019213441 A1 | 11/2019 |
| WO | WO-2020227702 A2 | 11/2020 |
| WO | WO-2020243690 A1 | 12/2020 |
| WO | WO-2020227702 A3 | 1/2021 |
| WO | WO-2021118941 A1 | 6/2021 |

OTHER PUBLICATIONS

Agc, Inc., "AGC completes development of 5G-compatible 'Glass Antenna that adds cellular base station capabilities to windows,'" Press Release, Jun. 3, 2020, 2 pp.
Al Shakhs, M. et al., "Boosting the transparency of thin layers by coatings of opposing susceptibility: how metals help see through dielectrics," Scientific Reports (www.nature.com); 6:20659; DOI: 10.1038/srep20659, Feb. 10, 2016, 9 pp.
AU examination report dated Oct. 1, 2021, in application No. AU2020220165.
Australian Examination Report dated Feb. 16, 2017 in AU Application No. 2014214738.
Australian Examination Report dated Jul. 10, 2018 in AU Application No. 2017204525.
Australian Office Action dated Apr. 8, 2020 in AU Application No. 2015353606.
Australian Office Action dated Aug. 20, 2019 in AU Application No. 2015353606.
Australian Office Action dated Feb. 19, 2021 in AU Application No. 2017260101.
Australian Office Action dated Jun. 3, 2021 in AU Application No. AU 2020220165.
Australian Office Action dated Jun. 30, 2017 issued in AU Application No. 2014214738.
Australian Office Action dated Mar. 4, 2020 in AU Application No. 2015353606.
Australian Office Action dated May 10, 2019 in AU Application No. 2015353606.
Azini, A.S. et al., "Transparent Antenna Design for Wireless Access Point Application," PIERS Proceedings, Taipei, Mar. 25-28, 2013, pp. 910-913.
Balzano Q., et al., "RF Energy in Cars From Window-mounted Antennas", 36th IEEE Vehicular Technology Conference, 2006, pp. 32-39.
CA Office Action dated Dec. 22, 2021, in Application No. 2968665.
Canadian Office Action dated Apr. 26, 2021 issued in CA Application No. 2,899,607.
Canadian Office Action dated Feb. 24, 2020 issued in CA Application No. 2,899,607.
Canadian Office Action dated Nov. 12, 2020 issued in CA Application No. 2,899,607.
Chinese Office Aciton dated Dec. 23, 2020 issued in CN Application No. 201811008514.6.
Chinese Office Aciton dated Feb. 2, 2018 issued in CN Application No. 201480010617.X.
Chinese Office Aciton dated May 19, 2017 issued in Application No. CN 201480010617.X.
Chinese Office Action dated Apr. 9, 2020 in CN Application No. 201680023096.0.
Chinese Office Action dated Jun. 16, 2021 in CN Application No. 201680023096.0.
CN office action dated Dec. 6, 2021, in application No. 201680023096.0.
CN Office Action dated Apr. 29, 2020 in CN Application No. 201780038353.2.
CN Office Action dated Apr. 6, 2021 in CN Application No. 201780038353.2.
CN Office Action dated Apr. 6, 2021 in CN Application No. 201911227990.1.
CN Office Action dated Aug. 3, 2021 in CN Application No. 201780063202.2.
CN Office Action dated Aug. 6, 2019 in CN Application No. 201580070207.9.
CN Office Action dated Jul. 19, 2021, issued in CN Application No. 201811008514.6.
CN Office Action dated Jul. 28, 2021, in CN Application No. 201780057293.9.
CN Office Action dated Mar. 5, 2019 in CN Application No. 201580070207.9.
CN Office Action dated Nov. 6, 2020 in CN Application No. 201780038353.2.
CN Office Action dated Oct. 22, 2020 in CN Application No. 201911227990.1.
CN Office Action dated Sep. 15, 2021, in application No. CN201911227990.1.
Crupi, I., et al., "Optimization of ZnO:Al/Ag/ZnO:Al structures for ultra-thin high-performance transparent conductive electrodes," vol. 520, No. 13, Apr. 30, 2012, pp. 4432-4435.
EP Extended Search Report dated Dec. 4, 2019 in EP Application No. 17793364.5.
EP Extended Search Report dated Feb. 25, 2020 in EP Application No. 17844188.7.
EP Extended Search Report dated Mar. 31, 2020 in EP Application No. 17857230.1.
EP Extended Search Report dated Sep. 6, 2018 in EP Application No. 15863433.7.
EP Office Action dated Dec. 16, 2021, in Application No. EP17793364.5.
EP Office Action dated May 14, 2021 in EP Application No. 17844188.7.
EP Office Action dated Oct. 1, 2021, in application No. EP17857230.1.
EP Partial Supplementary Search Report dated May 23, 2018 in EP Application No. 15863433.7.
EP Search Report dated Nov. 29, 2021, in Application No. EP21184089.7.
European Office Action dated Aug. 20, 2020 in EP Application No. 19183372.2.
European Office Action dated Feb. 28, 2020 in EP Application No. 19183372.2.
European Office Action dated Jan. 22, 2019 in EP Application No. 14749144.3.
European Office Action dated Jul. 8, 2020 in EP Application No. 15863433.7.
European Office Action dated Jun. 14, 2021 in EP Application No. 16769458.7.
European Office Action dated May 7, 2021 in EP Application No. 15863433.7.
European Office Action dated Oct. 17, 2019 in EP Application No. 15863433.7.
European Office Action dated Sep. 5, 2019 in EP Application No. 19183372.2.

(56) References Cited

OTHER PUBLICATIONS

European Search Report dated Aug. 21, 2019 in EP Application No. 19183372.2.
Extended European Search Report dated Aug. 12, 2016, issued in EP Application No. 14749144.3.
Extended European Search Report dated Oct. 19, 2018 in EP Application No. 16769458.7.
Filatova, E. O. et al., "Transparent-conductive-oxide (TCO) buffer layer effect on the resistive switching process in metal/TiO2/TCO/metal assemblies," New Journal of Physics 16 (2014) 113014.
Guillen, C. et al., "TCO/metal/TCO structures for energy and flexible electronics," Thin Solid Films 520, 2011, pp. 1-17.
IN First Examination Report dated Jun. 29, 2021, in the IN Application No. 202038032392.
IN Office Action dated Dec. 24, 2021, in Application No. IN202138004005.
Indian Office Action dated Mar. 24, 2021 in IN Application No. 201817042545.
Indian Office Action dated Oct. 30, 2019 in IN Application No. 2583/KOLNP/2015.
Indian Office Action dated Sep. 25, 2020 in IN Application No. 201737018864.
International Preliminary Report on Patentability dated Apr. 11, 2019 in PCT/US2017/052798.
International Preliminary Report on Patentability dated Aug. 20, 2015, issued in PCT/US2014/015374.
International Preliminary Report on Patentability dated Dec. 9, 2021, in PCT Application No. PCT/US2020/035485.
International Preliminary Report on Patentability dated Jun. 8, 2017 in PCT Application No. PCT/US2015/062387.
International Preliminary Report on Patentability dated Mar. 7, 2019 in PCT/US2017/047664.
International Preliminary Report on Patentability dated Nov. 15, 2018 in PCT Application No. PCT/US2017/031106.
International Preliminary Report on Patentability dated Nov. 18, 2021, issued in PCT/US2020/032269.
International Preliminary Report on Patentability dated Oct. 1, 2020 in PCT/US19/22580.
International Preliminary Report on Patentability dated Oct. 5, 2017 issued in PCT/US16/23293.
International Preliminary Report on Patentability dated Sep. 24, 2020 in PCT/US2019/022129.
International Search Report and Written Opinion dated Jul. 29, 2016 issued in PCT/US16/23293.
International Search Report and Written Opinion dated May 24, 2019 in PCT/US19/22580.
International Search Report and Written Opinion dated Nov. 27, 2014, issued in PCT/US2014/015374.
International Search Report and Written Opinion (ISA/EP) dated Dec. 7, 2020 in PCT Application No. PCT/US2020/032269.
International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Aug. 5, 2021 in PCT Application No. PCT/US2021/027418.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Mar. 8, 2016 in PCT Application No. PCT/US2015/062387.
Jager, T. et al., "Thin films of SnO2:F by reactive magnetron sputtering with rapid thermal post-annealing," vol. 553, Feb. 28, 2014, pp. 21-25.
JP Office Action dated Mar. 2, 2021 in JP Application No. 2018-557808.

Korean Notice of Refusal dated Dec. 1, 2020 in KR Application No. 10-2015-7022800.
Korean Office Action dated Mar. 24, 2021 in KR Application No. 10-2020-7038114.
Korean Office Action dated Mar. 5, 2020 in KR Application No. 10-2015-7022800.
KR Office Action dated Apr. 16, 2021 in KR Application No. 10-2018-7035235.
Macleod, H.A., "Thin-film optical filters, 3rd Edition, (Chapter 15: Characteristics of thin-film dielectric materials)," 1986, Bristol, UK, pp. 622-627.
Pasternack Enterprises, Inc. Technical Data Sheet for MCX Jack Connector Solder Attachment Surface Mount Pcb (PE4889), 2013, 2 pp.
Restriction requirement dated Oct. 18, 2021, for U.S. Appl. No. 16/849,540.
Rolith Inc., "NanoWeb: sub-micron transparent metal mesh conductors," [http://www.rolith.com/applications/transparent-conductive-electrodes] retrieved Jan. 29, 2016, 3 pp.
Rubin, M., "Optical properties of soda lime silica glasses," Solar Energy Materials, vol. 12, No. 4, 1985, pp. 275-288.
Russian Decision to Grant, including Search Report, dated Jan. 9, 2018 issued in RU Application No. 2015138108.
Saad, A. "Printed millimeter-wave MIMO-based slot antenna arrays for 5G networks," AEU —International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
SunPartner Technologies web page, "Li-Fi", [http://sunpartnertechnologies.com/li-fi/]; 3 pages; retrieved Jan. 24, 2018.
SunPartner Technologies web page, "Smart Building-Cameleon", [http://sunpartnertechnologies.com/vitrage-intelligent/]; 3 pages; retrieved Jan. 24, 2018.
SunPartner Technologies web page, "Smart Building-Design Glass", [http://sunpartnertechnologies.com/vitrage-intelligent/]; 3 pages; retrieved Jan. 24, 2018.
SunPartner Technologies web page, "Smart Building-Vision Glass", [http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwan Office Action dated Jul. 6, 2017 issued in TW Application No. 103104169.
Taiwanese First Office Action dated May 21, 2021 in TW 109134283.
Taiwanese Office Action dated Mar. 16, 2020 in TW Application No. 104139297.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
Tvarusko, Aladar, "The Electric Resistivity of AgO," J. Electrochem. Soc. 1968 115(11), pp. 1105-1110.
TW Office Action dated May 31, 2021 in TW Application No. TW 106114947.
TW Office Action dated Nov. 29, 2021, in Application No. TW109134283 with English translation.
U.S. Corrected Notice of Allowability dated Jan. 10, 2022, in U.S. Appl. No. 16/334,716.
U.S. Corrected Notice of Allowability for U.S. Appl. No. 16/327,789 dated Mar. 1, 2021.
US Final Office Action dated Feb. 6, 2020 in U.S. Appl. No. 16/451,784.
US Final Office Action dated May 11, 2021 in U.S. Appl. No. 16/334,716.

(56) References Cited

OTHER PUBLICATIONS

U.S. Final Office Action dated Sep. 30, 2021, in U.S. Appl. No. 16/209,514.
U.S. Final Office Action for U.S. Appl. No. 15/086,438 dated Feb. 9, 2018.
U.S. Final Office Action for U.S. Appl. No. 16/209,514 dated Nov. 25, 2020.
U.S. Non-Final Office Action dated Oct. 14, 2021 in U.S. Appl. No. 16/806,972.
U.S Non-Final Office Action dated Sep. 29, 2021 in U.S. Appl. No. 16/836,420.
US Notice of Allowance dated Apr. 19, 2021 in U.S. Appl. No. 16/099,424.
U.S Notice of Allowance dated Dec. 22, 2021 in U.S. Appl. No. 16/334,716.
US Notice of Allowance dated May 25, 2021 in U.S. Appl. No. 15/709,339.
US Notice of Allowance dated May 26, 2020 in U.S. Appl. No. 16/451,784.
US Notice of Allowance dated Sep. 10, 2021, in the U.S. Appl. No. 15/709,339.
U.S. Notice of Allowance for U.S. Appl. No. 13/763,505 dated Oct. 23, 2014.
U.S. Notice of Allowance for U.S. Appl. No. 14/601,141 dated Sep. 25, 2015.
U.S. Notice of Allowance for U.S. Appl. No. 15/086,438 dated Dec. 28, 2018.
U.S. Notice of Allowance for U.S. Appl. No. 15/560,146 dated Aug. 28, 2020.
U.S. Notice of Allowance for U.S. Appl. No. 15/560,146 dated Jan. 15, 2021.
U.S. Notice of Allowance for U.S. Appl. No. 16/327,789 dated Feb. 4, 2021.
U.S. Notice of Allowance for U.S. Appl. No. 16/509,189 dated Jul. 8, 2020.
US Office Action dated Jan. 16, 2020 in U.S. Appl. No. 15/529,677.
US Office Action dated Jan. 21, 2021 in U.S. Appl. No. 15/709,339.
US Office Action dated Jul. 25, 2019 in U.S. Appl. No. 15/529,677.
US Office Action dated Nov. 12, 2020 in U.S. Appl. No. 16/334,716.
US Office Action dated Sep. 23, 2019 in U.S. Appl. No. 16/451,784.
U.S. Office Action for U.S. Appl. No. 13/763,505 dated May 23, 2014.
U.S. Office Action for U.S. Appl. No. 15/086,438 dated Jul. 27, 2017.
U.S. Office Action for U.S. Appl. No. 15/560,146 dated Aug. 7, 2019.
U.S. Office Action for U.S. Appl. No. 16/209,514 dated Mar. 18, 2020.
U.S. Office Action for U.S. Appl. No. 16/209,514 dated May 11, 2021.
U.S. Office Action for U.S. Appl. No. 16/327,789 dated Sep. 28, 2020.
U.S. Office Action for U.S. Appl. No. 16/509,189 dated Mar. 13, 2020.
U.S. Appl. No. 16/949,978, inventors Hughes, et al., filed Nov. 23, 2020.
U.S. Appl. No. 17/307,848, inventors Shrivastava et al., filed May 4, 2021.
U.S. Appl. No. 17/406,301, inventors Shrivastava et al., filed Aug. 19, 2021.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/146,365, inventors Brown et al., filed Feb. 5, 2021.
U.S. Appl. No. 63/171,871, inventors Gomez-Martinez et al., filed Apr. 7, 2021.
U.S. Appl. No. 63/187,632, inventors Hur et al., filed May 12, 2021.
U.S. Appl. No. 63/226, 127, inventors Lee et al., filed Jul. 21, 2021.
U.S. Pat. Appl. No. PCT/US2021/017946, filed on Feb. 12, 2021.
U.S. Pat. Appl. No. PCT/US2021/027418, inventors Makker et al., filed on Apr. 15, 2021.
U.S. Appl. No. 63/080,899, inventor Makker et al., filed Sep. 21, 2020.
U.S.Final Office Action for U.S. Appl. No. 15/560,146 dated Apr. 14, 2020.
Von Rottkay, K. et al., "Optical indices of pyrolytic tin-oxide glass," Mater. Res. Soc. Symp. Proc., vol. 426, 1996, 449, (LBNL Publication 38586), 7 pp.
WeBoost Connect 3G Cell Phone Booster 472205 [https://store.weboost.com/products/connect-3g-directional] retrieved Apr. 1, 2016, 12 pp.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.
KR Office Action dated Aug. 28, 2024 in KR Application No. 10-2021-7040307, with English Translation.
U.S. Non-Final Office Action dated Sep. 24, 2024 in U.S. Appl. No. 18/303,815.
AU Examination report No. 1 for Standard patent application, dated Jul. 13, 2020, for Australian Patent Application No. 2015371272.
AU Notice of Acceptance for patent application, dated Oct. 6, 2020, for Australian Patent Application No. 2015371272.
AU Office action dated Apr. 4, 2023, in AU Application No. AU2022202275.
AU Office Action dated Aug. 30, 2022, in Application No. AU20210250838.
AU Office Action dated Dec. 15, 2021, in Application No. AU20200250303.
AU Office Action dated Mar. 8, 2022, in Application No. AU2021200729.
CA Office Action dated Jul. 18, 2022 in Application No. CA3103961.
CA Notice of Allowance dated Jun. 22, 2021 in CA Application No. 2,859,023.
CA Office Action dated Apr. 7, 2022 in CA Application No. CA2859023.
CA Office Action dated Aug. 15, 2023, in Application No. CA2968665.
CA Office Action dated Aug. 30, 2023, in Application No. CA3103961.
CA Office Action dated Dec. 1, 2022, in Application No. CA2980477.
CA Office Action dated Dec. 15, 2021, in Application No. CA2972240.
CA Office Action dated Dec. 27, 2023 in CA Application No. 3172227.
CA Office Action dated Dec. 4, 2020 in CA Application No. 2,859,023.
CA Office Action dated Jan. 11, 2024 in CA Application No. 3038974.
CA Office Action dated Jan. 13, 2020 in CA Application No. 2,859,023.
CA Office Action dated Jan. 26, 2024 in CA Application No. CA3167832.
CA Office Action dated Jul. 10, 2023, in Application No. CA2972240.
CA Office Action dated Jun. 1, 2023, in Application No. CA3023072.
CA Office Action dated Mar. 7, 2022, in Application No. 2,980,477.
CA Office Action dated Nov. 9, 2023, in CA Application No. 3139813.
CA Office Action dated Nov. 15, 2022 in Application No. CA2968665.
CA Office Action dated Oct. 12, 2022, in Application No. CA2972240.
CA Office Action dated Sep. 1, 2023, in Application No. CA3034630.
CN Notice of Allowance with Search Report dated May 27, 2021 in CN Application No. 201580039994.0, with English Translation.
CN Office Action dated Apr. 15, 2022 in CN Application No. 201780063202.2 with English translation.
CN Office Action dated Apr. 27, 2022, in Application No. CN201780057293.9 with English translation.
CN Office Action dated Aug. 2, 2023, in Application No. CN201580074719.2 with EnglishTranslation.
CN Office Action dated Aug. 17, 2023, in Application No. CN202111203764.7 with English translation.

(56) References Cited

OTHER PUBLICATIONS

CN Office Action dated Aug. 2, 2021, in CN Application No. 201780038353.2.
CN Office Action dated Aug. 23, 2023, in application No. CN201980026767.2.
CN Office Action dated Dec. 24, 2020 in CN Application No. 201580039994.0, with English Translation.
CN Office Action dated Dec. 29, 2023 in CN Application No. CN202110650732.5 with English Translation.
CN Office Action dated Feb. 2, 2019 in CN Application No. 201280061260.9.
CN Office Action dated Feb. 3, 2020 in CN Application No. 201580039994.0.
CN Office Action dated Feb. 3, 2021 in CN Application No. 201580074719.2.
CN Office Action dated Feb. 4, 2017 in CN Application No. 201280061260.9.
CN Office Action dated Jan. 15, 2024 in CN Application No. CN202011606768.5, withEnglish Translation.
CN Office Action dated Jul. 5, 2022, in Application No. CN201680023096.0 with English translation.
CN Office Action dated Jun. 1, 2023, in Application No. CN201811008514.6 with English translation.
CN Office Action dated Jun. 7, 2024 in CN Application No. 202011606768.5 with English translation.
CN Office Action dated Mar. 16, 2020 in CN Application No. 201580074719.2.
CN Office Action dated Mar. 21, 2016 in CN Application No. 201280061260.9.
CN Office Action dated May 6, 2020 in CN Application No. 201280061260.9, with English Translation.
CN Office Action dated Oct. 10, 2022, in Application No. CN201780057293.9, with EnglishTranslation.
CN Office Action dated Oct. 10, 2023, in Application No. CN202110918754.5 with English translation.
CN Office Action dated Oct. 14, 2019 in CN Application No. 201480073448.4.
CN Office Action dated Oct. 16, 2017 in CN Application No. 201280061260.9.
CN Office Action dated Sep. 15, 2021, in application No. CN201911227990.1 with English translation.
CN Office Action dated Sep. 22, 2023 in CN Application No. 202080085370.3 with English translation.
CN Office Action dated Sep. 26, 2023, in CN Application No. 202080060919.3 with English Translation.
CN Office Action (Decision of Rejection) dated May 15, 2018 in CN Application No. 201280061260.9.
CN Reexamination Decision dated Mar. 25, 2021 in CN Application No. 201280061260.9, with English Translation.
CN Rejection Decision dated Dec. 1, 2020 in CN Application No. 201280061260.9, with English Translation.
CN Rejection Decision dated Jun. 28, 2021 in CN Application No. 201580074719.2.
Decision to Grant dated Apr. 22, 2021 for EP Application No. 17197774.7.
Decision to Grant dated Jun. 11, 2021 for EP Application No. 19150851.4.
EP Extended European Search report dated Apr. 2, 2024 in EP Application No. 21752901.5.
EP Extended European Search report dated Jun. 10, 2024 in EP Application No. 24161362.9.
EP Extended European Search report dated May 26, 2023, in Application No. EP23153638.4.
EP Extended European Search Report dated Oct. 6, 2023, in Application No. EP23165372.6.
EP Office Action dated Apr. 11, 2022, in Application No. EP15814398.2.
EP Office Action dated Dec. 11, 2023 in EP Application No. 21184089.7.
EP Office Action dated Feb. 21, 2024 in EP Application No. 20729442.2.
EP Office Action dated Jun. 3, 2022, in Application No. EP19713970.2.
EP Office Action dated Jun. 9, 2022, in Application No. EP19714068.4.
EP office action dated Jun. 21, 2023, in application No. EP20200757159.
EP Office Action dated Jun. 26, 2023, in Application No. EP19714068.4.
EP office action dated Nov. 25, 2021, in application No. EP19150841.4.
EP Search Report dated Apr. 7, 2022, in Application No. EP21204163.6.
EP search report mailed on Sep. 14, 2021, in application No. EP21173523.8.
European Office Action dated Apr. 5, 2023 for EP Application No. EP21173523.8.
European Office Action, dated Feb. 18, 2020, for EP Application No. 15814398.2.
European Office Action dated Jul. 28, 2016 for EP Application No. 12857376.3.
European Office Action dated Jun. 29, 2020 for EP Application No. 19150851.4.
European Office Action dated May 24, 2022, in EP Application No. 16769458.7.
European Office Action dated Sep. 15, 2023 in Application No. EP21204163.6.
European Search Report dated Apr. 24, 2018 for EP Application No. 17197774.7.
European Search Report dated Jan. 17, 2019 for EP Application No. 15873818.7.
European Search Report dated Jan. 30, 2018 for EP Application No. 15814398.2.
European Search Report dated Jul. 10, 2015 for EP Application No. 12857376.3.
European Search Report dated Mar. 28, 2019 for EP Application No. 17197774.7.
European Search Report dated Mar. 29, 2019 for EP Application No. 19150851.4.
IN Office Action dated Dec. 5, 2022 in Application No. IN202238032780.
IN Office Action dated Feb. 22, 2022, in Application No. IN201938042428.
IN Office Action dated May 10, 2022, in Application No. IN202037043494.
IN Office Action dated May 29, 2023, in Application No. IN202118042940.
International Preliminary Report on Patentability and Written Opinion dated Feb. 8, 2024 in PCT Application No. PCT/US2022/074162.
International Preliminary Report on Patentability and written opinion dated Jun. 23, 2022 in Application No. PCT/US2020/063672.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Feb. 10, 2022 issued in Application No. PCT/US2020/044337.
International Preliminary Report on Patentability dated Jan. 12, 2017, in PCT/US2015/039089.
International Preliminary Report on Patentability dated Jun. 26, 2014 in PCT/US2012/068817.
International Preliminary Report on Patentability dated Jun. 27, 2017, in PCT/US2015/00411.
International Preliminary Report on Patentability dated Oct. 19, 2023, in PCT Application No. PCT/US2022/023605.
International Preliminary Report on Patentability dated Oct. 27, 2022, in PCT Application No. PCT/US2021/027418.
International Search Report and Written Opinion dated Aug. 8, 2022, in Application No. PCT/US2022/023605.

(56) References Cited

OTHER PUBLICATIONS

International Search Report and Written Opinion dated Jul. 26, 2022 in Application No. PCT/US2022/024999.
International Search Report and Written Opinion dated Jun. 29, 2016, in PCT/US2015/00411.
International Search Report and Written Opinion dated Mar. 29, 2013, in PCT/US2012/068817.
International Search Report and Written Opinion dated Nov. 16, 2022 in PCT Application No. PCT/US2022/074162.
International Search Report and Written Opinion dated Nov. 30, 2022 in PCT Application No. PCT/US2022/075024.
International Search Report and Written Opinion dated Oct. 30, 2015, in PCT/US2015/039089.
International Search Report and Written Opinion dated Sep. 1, 2022 in Application No. PCT/US2022/028850.
JP Office Action dated Jul. 5, 2022, in Application No. JP2021-119155 with English translation.
JP Office Action dated Jun. 11, 2024 in JP Application No. 2021-564914, with EnglishTranslation.
JP Office Action dated Nov. 8, 2022 for JP Application No. 2021-119155 with English translation.
Korean Office Action dated Mar. 21, 2023 in KR Application No. 10-2022-7028353 with English translation.
KR Notice of Decision to Grant, dated Jan. 30, 2020, in KR Application No. 2014-7018018.
KR Office action dated Apr. 4, 2022 in Application No. KR1020207038114 with English translation.
KR Office Action dated Apr. 4, 2023, in Application No. KR10-2022-7027548 with English translation.
KR Office Action dated Aug. 2, 2023, in Application No. KR10-2022-7042723 with English translation.
KR Office Action dated Dec. 7, 2022, in Application No. KR10-2022-7005495 WithEnglish translation.
KR Office Action dated Dec. 20, 2018 in KR Application No. 2014-7018018.
KR Office Action dated Feb. 22, 2022, in Application No. KR1020177017285 with English translation.
KR Office Action dated Jan. 4, 2023 in Application No. KR10-2022-7015306 with English Translation.
KR Office Action dated Jan. 19, 2022, in Application No. KR1020207038114 with English translation.
KR Office Action dated Jan. 26, 2022, in Application No. KR1020207008593 with English translation.
KR Office Action dated Mar. 28, 2023, in application No. KR10-2020-7008593 with English translation.
KR Office Action dated May 19, 2022 in Application No. KR10-20207008593 with English translation.
KR Office Action dated May 25, 2022, in Application No. KR1020227005495 With English Translation.
KR Office Action dated Oct. 30, 2019 in KR Application No. 2014-7018018.
KR Office Action, Notification of Provisional Rejection, dated Apr. 8, 2021 in KR Application No. 10-2020-7008593.
KR Office Action, Notification of Provisional Rejection, dated Jun. 22, 2020 in KR Application No. 10-2020-7008593.
Minutes of the Oral Proceedings dated Dec. 3, 2020 for EP Application No. 17197774.7.
Notice of Allowance dated Dec. 9, 2020 for EP Application No. 17197774.7.
Notice of Allowance dated May 17, 2021 for EP Application No. 15873818.7.
Preliminary Amendment filed Aug. 31, 2015 in U.S. Appl. No. 14/822,732.
Preliminary Amendment filed Oct. 21, 2014 in U.S. Appl. No. 14/363,769.
Response to Summons dated Oct. 23, 2020 for EP Application No. 17197774.7.
Results of the telephone consultation dated Dec. 1, 2020 for EP Application No. 17197774.7.
RU Notice of Allowance dated Jul. 19, 2017 in RU Application No. 2014128536.
RU Office Action dated Apr. 14, 2017 in RU Application No. 2014128536.
Singapore Exam Report and Grant Notice dated Mar. 5, 2018 for SG Application No. 10201608917Q.
Singapore Search Report and Written Opinion dated Apr. 19, 2017 for SG Application No. 10201608917Q.
Summons to attend oral proceedings dated May 12, 2020 for EP Application No. 17197774.7.
Taiwanese Office Action dated Jan. 31, 2019 for TW Application No. 104121575.
Taiwanese Office Action dated Nov. 12, 2020 for TW Application No. 109106926 with English Translation.
TW Office Action dated Apr. 25, 2023 in Application No. TW20220115251 with English translation.
TW Office Action dated Apr. 26, 2022 in Application No. TW110144841 with English translation.
TW Office Action dated Aug. 31, 2018 in TW Application No. 106146406.
TW Office Action dated Aug. 31, 2022, in Application No. TW111111140 with EnglishTranslation.
TW Office Action dated Feb. 15, 2017 in TW Application No. 101146775 with English Translation.
TW Office Action dated Feb. 24, 2023, in Application No. TW111111140 with English Translation.
TW Office Action dated Jul. 11, 2022 In Application No. TW110146990 with English translation.
TW Office Action dated Jun. 20, 2018 in TW Application No. 106119450.
TW Office Action dated Mar. 13, 2022, in Application No. TW106114947 with English translation.
TW Office Action dated May 10, 2021 in TW Application No. 108117698.
TW Office Action dated May 31, 2023 in Application No. TW111144104 with English translation.
TW Office Action dated Nov. 30, 2022, in Application No. TW110132429 with EnglishTranslation.
TW Office Action dated Oct. 18, 2023 in TW Application No. 111115251 with English Translation.
TW Office Action dated Oct. 20, 2016 in TW Application No. 101146775.
TW Office Action dated Sep. 20, 2023 in TW Application No. 110132429 with English Translation.
U.S. Final office Action dated Jul. 11, 2022 in U.S. Appl. No. 16/981,600.
U.S. Final office Action dated Jun. 28, 2022 in U.S. Appl. No. 16/836,420.
U.S. Non-Final office Action dated Sep. 15, 2022 in U.S. Appl. No. 17/192,883.
U.S. Advisory Action dated Mar. 13, 2024 in U.S. Appl. No. 17/385,810.
U.S. Advisory Action dated Mar. 31, 2022, in U.S. Appl. No. 16/209,514.
US Corrected Notice of Allowability dated Apr. 24, 2020 in U.S. Appl. No. 15/539,650.
U.S Corrected Notice of Allowance dated Apr. 26, 2022 in U.S. Appl. No. 16/334,716.
U.S. Corrected Notice of Allowance dated Aug. 3, 2023, in U.S. Appl. No. 17/658,825.
U.S. Corrected Notice of Allowance dated Feb. 1, 2023 in U.S. Appl. No. 16/947,757.
U.S. Corrected Notice of Allowance dated Feb. 15, 2023 in U.S. Appl. No. 16/949,978.
U.S. Corrected Notice of Allowance dated Jan. 9, 2023 in U.S. Appl. No. 16/836,420.
U.S. Corrected Notice of Allowance dated Jul. 17, 2023, in U.S. Appl. No. 16/980,305.
U.S. Corrected Notice of Allowance dated Jun. 2, 2022 in U.S. Appl. No. 17/456,165.
U.S. Corrected Notice of Allowance dated Jun. 3, 2022 in U.S. Appl. No. 16/849,540.

(56) References Cited

OTHER PUBLICATIONS

U.S. Corrected Notice of Allowance dated Mar. 30, 2022, in U.S. Appl. No. 17/456,165.
U.S. Corrected Notice of Allowance dated Nov. 3, 2022 in U.S. Appl. No. 16/947,834.
U.S. Corrected Notice of Allowance dated Sep. 6, 2022 in U.S. Appl. No. 16/849,540.
U.S. Corrected Notice of Allowance dated Sep. 27, 2023, in U.S. Appl. No. 17/658,825.
U.S. Final office Action dated Jul. 13, 2022 in U.S. Appl. No. 16/806,972.
U.S. Final office Action dated Apr. 26, 2023 in U.S. Appl. No. 17/304,741.
US Final Office Action dated Aug. 22, 2019 in U.S. Appl. No. 15/491,869.
U.S. Final Office Action dated Dec. 19, 2023 in U.S. Appl. No. 17/192,883.
U.S. Final Office Action dated Dec. 28, 2023 in U.S. Appl. No. 17/385,810.
U.S. Final Office Action dated Jun. 7, 2023 in U.S. Appl. No. 16/981,600.
U.S. Final Office Action dated Mar. 2, 2023 in U.S. Appl. No. 17/304,012.
U.S. Final Office Action dated Mar. 13, 2024 in U.S. Appl. No. 18/303,815.
U.S. Final Office Action dated Nov. 15, 2023 in U.S. Appl. No. 17/609,671.
US Final Office Action dated Oct. 16, 2017 in U.S. Appl. No. 15/364,162.
U.S. Final office Action dated Oct. 25, 2022 in U.S. Appl. No. 16/947,757.
U.S. Non Final Office Action dated Feb. 16, 2022 in U.S. Appl. No. 16/981,600.
U.S. Non Final Office Action dated Jan. 31, 2022 in U.S. Appl. No. 16/849,540.
U.S. Non-Final office Action dated Jun. 23, 2022 in U.S. Appl. No. 16/209,514.
U.S. Non-Final Office Action dated Apr. 18, 2023 in U.S. Appl. No. 17/609,671.
U.S. Non-Final office Action dated Apr. 28, 2022 in U.S. Appl. No. 16/947,757.
U.S. Non-Final office Action dated Aug. 5, 2022 in U.S. Appl. No. 16/947,834.
U.S. Non-Final Office Action dated Aug. 24, 2023 in U.S. Appl. No. 17/656,612.
U.S. Non-Final Office Action dated Dec. 2, 2022 in U.S. Appl. No. 16/980,305.
U.S. Non-Final Office Action dated Dec. 27, 2023 in U.S. Appl. No. 17/304,012.
U.S. Non-Final Office Action dated Feb. 29, 2024 in U.S. Appl. No. 18/330,591.
U.S. Non-Final Office Action dated Jan. 5, 2024 in U.S. Appl. No. 17/446,566.
U.S. Non-Final Office Action dated Jan. 24, 2024 in U.S. Appl. No. 17/609,671.
U.S. Non-Final Office Action dated Jul. 3, 2023, in U.S. Appl. No. 17/385,810.
U.S. Non-Final Office Action dated Jun. 4, 2024 in U.S. Appl. No. 18/138,846.
U.S. Non-Final Office Action dated Mar. 1, 2023 in U.S. Appl. No. 17/380,785.
U.S. Non-Final office Action dated Mar. 31, 2023 in U.S. Appl. No. 17/658,825.
U.S. Non-Final Office Action dated May 7, 2024 in U.S. Appl. No. 17/385,810.
U.S. Non-Final Office Action dated May 9, 2023 in U.S. Appl. No. 17/192,883.
U.S. Non-Final Office Action dated May 9, 2023 in U.S. Appl. No. 17/307,848.
U.S. Non-Final Office Action dated May 31, 2024 in U.S. Appl. No. 17/612,479.
U.S. Non-Final Office Action dated Nov. 8, 2023 in U.S. Appl. No. 18/303,815.
U.S. Non-Final Office Action dated Nov. 18, 2022, in U.S. Appl. No. 17/307,848.
U.S. Non-Final Office Action dated Oct. 13, 2022, in U.S. Appl. No. 17/304,741.
U.S. Non-Final Office Action dated Oct. 20, 2023, in U.S. Appl. No. 16/981,600.
U.S. Non-Final office Action dated Oct. 28, 2022 in U.S. Appl. No. 16/981,600.
U.S. Non-Final office Action dated Sep. 8, 2022 in U.S. Appl. No. 17/406,301.
U.S. Non-Final office Action dated Sep. 28, 2022 in U.S. Appl. No. 17/304,012.
U.S. Non-Final office Action dated Sep. 29, 2022 in U.S. Appl. No. 16/949,978.
US Notice of Allowance (corrected) dated May 19, 2016 in U.S. Appl. No. 14/362,863.
US Notice of Allowance dated Apr. 26, 2019 for U.S. Appl. No. 15/934,854.
U.S. Notice of Allowance dated Aug. 1, 2022 in U.S. Appl. No. 17/456,165.
U.S. Notice of Allowance dated Aug. 24, 2022 in U.S. Appl. No. 16/947,841.
U.S. Notice of Allowance dated Aug. 31, 2023, in U.S. Appl. No. 17/380,785.
U.S. Notice of Allowance dated Dec. 6, 2023 in U.S. Appl. No. 17/658,825.
U.S. Notice of Allowance dated Dec. 8, 2022 in U.S. Appl. No. 16/947,841.
U.S. Notice of Allowance dated Dec. 11, 2023 in U.S. Appl. No. 17/304,741.
U.S. Notice of Allowance dated Dec. 20, 2023 in U.S. Appl. No. 17/304,741.
U.S. Notice of Allowance dated Dec. 21, 2022 in U.S. Appl. No. 16/836,420.
U.S. Notice of Allowance dated Feb. 1, 2023 in U.S. Appl. No. 16/949,978.
U.S. Notice of Allowance dated Feb. 24, 2022, in U.S. Appl. No. 17/456,165.
US Notice of Allowance dated Feb. 6, 2018 in U.S. Appl. No. 15/364,162.
U.S. Notice of Allowance dated Jan. 17, 2023 in U.S. Appl. No. 17/406,301.
US Notice of Allowance dated Jan. 2, 2019 in U.S. Appl. No. 15/390,421.
U.S. Notice of Allowance dated Jan. 20, 2023 in U.S. Appl. No. 16/947,757.
US Notice of Allowance dated Jan. 23, 2020 in U.S. Appl. No. 15/539,650.
U.S. Notice of Allowance dated Jan. 25, 2023 in U.S. Appl. No. 17/406,301.
US Notice of Allowance dated Jan. 4, 2019 for U.S. Appl. No. 15/934,854.
U.S. Notice of Allowance dated Jul. 21, 2023 in U.S. Appl. No. 17/658,825.
US Notice of Allowance dated Jun. 26, 2018 in U.S. Appl. No. 14/822,732.
US Notice of Allowance dated Mar. 12, 2021 for U.S. Appl. No. 16/523,852.
U.S. Notice of Allowance dated May 10, 2024 in U.S. Appl. No. 17/609,671.
U.S. Notice of Allowance dated May 11, 2023 in U.S. Appl. No. 16/949,978.
US Notice of Allowance dated May 12, 2017 for U.S. Appl. No. 14/512,297.
US Notice of Allowance dated May 14, 2020 in U.S. Appl. No. 15/491,869.
US Notice of Allowance dated May 15, 2020 in U.S. Appl. No. 15/539,650.

(56) References Cited

OTHER PUBLICATIONS

US Notice of Allowance dated May 23, 2018 in U.S. Appl. No. 15/390,421.
U.S. Notice of Allowance dated May 23, 2024 in U.S. Appl. No. 17/609,671.
U.S. Notice of Allowance dated May 24, 2023 in U.S. Appl. No. 16/980,305.
U.S. Notice of Allowance dated May 26, 2022, in U.S. Appl. No. 16/849,540.
US Notice of Allowance dated May 6, 2016 in U.S. Appl. No. 14/362,863.
US Notice of Allowance dated Nov. 23, 2020 in U.S. Appl. No. 16/195,693.
US Notice of Allowance dated Oct. 4, 2016 for U.S. Appl. No. 14/512,297.
U.S. Notice of Allowance dated Sep. 18, 2023, in U.S. Appl. No. 17/380,785.
US Notice of Allowance dated Sep. 19, 2018 in U.S. Appl. No. 15/390,421.
US Notice of Allowance dated Sep. 23, 2019 for U.S. Appl. No. 14/884,683.
U.S. Notice of Allowance dated Sep. 28, 2022 in U.S. Appl. No. 16/806,972.
U.S. Notice of Allowance dated Sep. 29, 2022 in U.S. Appl. No. 16/947,834.
US Office Action dated Apr. 2, 2020 for U.S. Appl. No. 16/523,852.
US Office Action dated Aug. 1, 2018 for U.S. Appl. No. 15/934,854.
US Office Action dated Feb. 15, 2019 in U.S. Appl. No. 15/491,869.
US Office Action dated Jan. 10, 2020 in U.S. Appl. No. 15/491,869.
US Office Action dated Jan. 29, 2016 in U.S. Appl. No. 14/362,863.
US Office Action dated Jun. 29, 2018 in U.S. Appl. No. 15/491,869.
US Office Action dated Mar. 28, 2017 for U.S. Appl. No. 15/364,162.
US Office Action dated May 10, 2016 for U.S. Appl. No. 14/512,297.
US Office Action dated May 15, 2019 for U.S. Appl. No. 14/884,683.
US Office Action dated Oct. 15, 2015 for U.S. Appl. No. 14/512,297.
US Office Action dated Oct. 25, 2019 for U.S. Appl. No. 16/523,852.
US Office Action dated Oct. 31, 2018 for U.S. Appl. No. 14/884,683.
US Office Action dated Sep. 12, 2017 in U.S. Appl. No. 14/822,732.
US Office Action dated Sep. 16, 2020 for U.S. Appl. No. 16/523,852.
U.S. Appl. No. 15/364,162, inventors Parker et al., filed Nov. 29, 2016.
U.S. Appl. No. 15/390,421, inventors Dixit et al., filed Dec. 23, 2016.
U.S. Appl. No. 15/491,869, inventors Strong et al., filed Apr. 19, 2017.
U.S. Appl. No. 15/539,650, inventors Dixit et al., filed Jun. 23, 2017.
U.S. Appl. No. 15/934,854, inventors Parker et al., filed Mar. 23, 2018.
U.S. Appl. No. 16/195,693, inventors Dixit et al., filed Nov. 19, 2018.
U.S. Appl. No. 16/523,852, inventors Parker et al., filed Jul. 26, 2019.
U.S. Appl. No. 14/363,769, filed Jun. 6, 2014, entitled "Connectors for Smart Windows"—371 national phase application.
U.S. Appl. No. 14/822,732, filed Aug. 10, 2015, entitled "Thin-Film Devices and Fabrication".
U.S. Appl. No. 14/884,683, filed Oct. 15, 2015, entitled "Fabrication of Low Defectivity Electrochromic Devices".
U.S. Appl. No. 17/916,986, inventors Makker et al., filed Oct. 4, 2022.
U.S. Appl. No. 18/797,037, inventors Brown S.C, et al., filed Aug. 7, 2024.
U.S. Appl. No. 18/819,746, inventors Hughes H, et al., filed Aug. 29, 2024.
US Preliminary Amendment dated Sep. 17, 2019 for U.S. Appl. No. 16/523,852.
US Preliminary Amendment filed Aug. 26, 2020 in U.S. Appl. No. 16/947,834.
US Preliminary Amendment filed Aug. 31, 2020 in U.S. Appl. No. 16/947,841.
US Preliminary Amendment filed Nov. 20, 18 in U.S. Appl. No. 16/195,693.
US Preliminary Amendment filed Jan. 12, 2017 for U.S. Appl. No. 15/364,162.
US Preliminary Amendment filed Apr. 17, 18 in U.S. Appl. No. 15/934,854.
US Preliminary Amendment filed Apr. 20, 2017 for U.S. Appl. No. 15/491,869.
US Preliminary Amendment filed Aug. 17, 2015 in U.S. Appl. No. 14/362,863.
U.S. Preliminary Amendment filed on Apr. 12, 2022 for U.S. Appl. No. 17/658,825.
US Preliminary Amendment filed Sep. 12, 2014 in U.S. Appl. No. 14/362,863.
U.S. Restriction Requirement dated Apr. 15, 2022 in U.S. Appl. No. 17/304,741.
U.S. Restriction Requirement dated Jan. 24, 2024 in U.S. Appl. No. 17/612,479.
U.S. Restriction requirement dated Mar. 15, 2023 in U.S. Appl. No. 17/385,810.
Wikipedia webpage., "Visible Spectrum", 2018, 4 pages.
CN Notice of Allowances dated Oct. 21, 2024 in CN Application No. 202011606768.5 with English translation.
U.S. Corrected Notice of Allowance dated Dec. 6, 2024 in U.S. Appl. No. 17/192,883.
U.S. Final Office Action dated Sep. 27, 2024 in U.S. Appl. No. 18/330,591.
U.S. Notice of Allowance dated Nov. 14, 2024 in U.S. Appl. No. 17/192,883.
U.S. Notice of Allowance dated Nov. 21, 2024 in U.S. Appl. No. 18/138,846.
U.S. Notice of Allowance dated Oct. 1, 2024 in U.S. Appl. No. 17/385,810.
U.S. Notice of Allowance dated Oct. 15, 2024 in U.S. Appl. No. 17/612,479.
U.S. Notice of Allowance dated Oct. 29, 2024 in U.S. Appl. No. 17/612,479.
U.S. Appl. No. 18/918,606, inventors Shrivastava D, et al., filed on Oct. 17, 2024.
U.S. Appl. No. 18/930,286, inventors Rozbicki R.T, et al., filed on October 29, 2024.

FASTER SWITCHING ELECTROCHROMIC DEVICES

CROSS-REFERENCES TO RELATED APPLICATIONS

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The disclosure generally relates to electrochromic devices and in particular to material layers in electrochromic devices.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. Electrochromic materials may be incorporated into, for example, windows and mirrors. The color, transmittance, absorbance, and/or reflectance of such windows and mirrors may be changed by inducing a change in the electrochromic material. However, advances in electrochromic technology, apparatus, and related methods of making and/or using them, are needed because conventional electrochromic windows suffer from, for example, high defectivity and low versatility.

SUMMARY

Certain embodiments pertain to electrochromic devices comprising first and second conductors, wherein at least one of the first and second conductors is a multi-layered conductor. The electrochromic devices further comprising an electrochromic stack between the conductors adjacent a substrate. The at least one multi-layer conductor comprises a metal layer sandwiched between a first non-metal layer and a second non-metal layer such that the metal layer does not contact the electrochromic stack.

Certain embodiments pertain to an electrochromic device comprising first and second conductors and an electrochromic stack between the first and second conductors adjacent a substrate. At least one of the first and second conductors is a multi-layered conductor. The multi-layer conductor comprises a metal layer sandwiched between a first non-metal layer and a second non-metal layer such that the metal layer does not contact the electrochromic stack. In one embodiment, each of the first and second non-metal layers is a transparent conductive oxide layer or a second defect mitigating insulating layer. In one embodiment, the electrochromic device further comprises one or more additional metal layers, wherein each of the additional metal layers is sandwiched between the first non-metal layer and the second non-metal layer and optionally each of the first and second non-metal layers is a transparent conductive oxide layer or a second defect mitigating insulating layer or the first and second non-metal layers are additional defect mitigating insulating layers. In one embodiment, each of the first and second conductors is a multi-layered conductor comprising a metal layer. In one embodiment, the electrochromic device further comprises a diffusion barrier disposed on the substrate and optionally the diffusion barrier comprises one or more layers or the diffusion barrier is a tri-layer stack of $SiO_2$, $SnO_2$, and $SiO_x$ layers, wherein the $SiO_2$ layer has a thickness of between 20 nm and 30 nm, wherein the $SnO_2$ layer has a thickness of between 20 nm and 30 nm, and wherein the $SiO_x$ layer has a thickness of between 2 nm and 10 nm and further optionally the one or more layers of the diffusion barrier comprise at least one of silicon dioxide, silicon oxide, tin oxide, and FTO. In some cases, an overall sheet resistance of the first and second conductors is less than $10\Omega/\square$, less than $5\Omega/\square$, or less than $5\Omega/\square$. In one case, a resistivity of one of the first and second conductors is the range of between 150 $\Omega$-cm and about 500 $\Omega$-cm. In some cases, a sheet resistance of the first and second conductors varies by less than 20%, 10%, or 5%. In some cases, a thickness of each of the first and second conductors varies by less than 10%, 5% or 2% from a nominal thickness. In one embodiment, the metal layer is transparent. Certain embodiments pertain to electrochromic devices comprising in the following order: a) a glass substrate, b) a first transparent conductive oxide (TCO) layer, c) a first defect mitigating insulating layer, d) a first metal layer, e) a second defect mitigating insulating layer, f) an electrochromic stack comprising a cathodically coloring electrode layer and an anodically coloring electrode layer sandwiching an ion conductor layer, g) a second TCO layer, h) a second metal layer, and i) a third TCO layer. In one embodiment, the glass substrate is float glass and there is a diffusion barrier between the glass substrate and the first TCO layer. In one embodiment, the first TCO layer is FTO. In one embodiment, the first and second metal layers are silver. In one embodiment, the second and third TCO layers are ITO. In one embodiment, the electrochromic device further comprises, in the following order: a third metal layer; and k) a fourth TCO layer, optionally wherein the third metal layer is silver and the fourth TCO layer is ITO.

Certain embodiments pertain to an electrochromic device comprising, in the following order, a substantially transparent substrate, a first multi-layer conductor disposed on the substantially transparent substrate, an electrochromic stack, and a second multi-layer conductor disposed on the electrochromic stack. The first multi-layer conductor comprises, in order, a first conductive material layer, a first defect mitigating insulating layer, a second conductive material layer, and a second defect mitigating insulating layer. The second multi-layer conductor comprises, in order, a third defect mitigating insulating layer, a third conductive material layer, a fourth defect mitigating insulating layer, and a fourth conductive material layer. In one embodiment, the electrochromic device further comprises one or more diffusion barrier layers between the substantially transparent substrate and the first multi-layer conductor.

Certain embodiments pertain to an electrochromic device comprising, in the following order, a substantially transparent substrate, a first multi-layer conductor disposed on the substantially transparent substrate, an electrochromic stack, and a second multi-layer conductor disposed on the electrochromic stack. The first multi-layer conductor comprises, in order, a first transparent conductive oxide layer, a first metal layer, a second transparent conductive oxide layer, and a first defect mitigating insulating layer. The second multi-layer conductor comprises, in order, a third transparent conductive oxide layer, a second metal layer, and a fourth transparent conductive oxide layer.

Certain embodiments pertain to an electrochromic device comprising, in the following order, a substantially transparent substrate, a first multi-layer conductor disposed on the substantially transparent substrate, an electrochromic stack, and a second multi-layer conductor disposed on the electrochromic stack. The first multi-layer conductor comprises, in order, a first transparent conductive oxide layer, a first metal layer, a second transparent conductive oxide layer, one or more barrier/blocking layers, and a first defect mitigating insulating layer. The second multi-layer conductor comprises, in order, a third transparent conductive oxide layer, a second metal layer, and a fourth transparent conductive oxide layer. In one embodiment, the electrochromic device further comprises one or more diffusion barrier layers between the substantially transparent substrate and the first multi-layer conductor.

Certain embodiments pertain to an electrochromic device comprising, in the following order a substantially transparent substrate, a first multi-layer conductor disposed on the substantially transparent substrate, an electrochromic stack, and a second multi-layer conductor disposed on the electrochromic stack. The first multi-layer conductor comprises, in order, a first transparent conductive oxide layer, a first metal layer, a protective cap layer, and a second transparent conductive oxide layer. The second multi-layer conductor comprises, in order, a third transparent conductive oxide layer, a second metal layer, and a fourth transparent conductive oxide layer.

Certain embodiments pertain to an electrochromic device comprising, in the following order: a substantially transparent substrate, a first multi-layer conductor disposed on the substantially transparent substrate, an electrochromic stack, and a second multi-layer conductor disposed on the electrochromic stack. The first multi-layer conductor comprises, in order, one or more color tuning layers, a first metal layer, and a first defect mitigating insulating layer. The second multi-layer conductor comprises, in order, a second defect mitigating insulating layer and a second metal layer. In one embodiment, the electrochromic device further comprises one or more diffusion barrier layers between the substantially transparent substrate and the first multi-layer conductor. In one embodiment, the first metal layer becomes transparent when disposed over the one or more color tuning layers. In one embodiment, the one or more color tuning layers has wavelength absorption characteristics such that light transmitted through the electrochromic device is of a predetermined spectrum. In one embodiment, the one or more color tuning layers has wavelength absorption characteristics such that light transmitted through the electrochromic device is blue.

Certain aspects of the present disclosure pertain to windows that include one or more electrochromic devices described herein.

Certain embodiments are directed to an electrochromic window configured for electromagnetic shielding (i.e. an electromagnetic-shielding, electrochromic window). In one embodiment, an electromagnetic-shielding, electrochromic window comprises a first multi-layer conductor disposed on a transparent substrate, an electrochromic stack disposed on the first conductor, and a second multi-layer conductor. One or both of the first and second multi-layer conductors comprises an electromagnetic shielding stack configured to be activated to block electromagnetic communication signals through the window. The electromagnetic shielding stack comprises a first electroconductive material layer (e.g. metal layer) sandwiched between a first anti-reflection layer (e.g., a TCO layer or a DMIL layer) and a second anti-reflection layer.

Certain implementations pertain to an electrochromic device including first and second conductors and a solid state and inorganic electrochromic stack between the first and second conductors adjacent a substrate. In these implementations, at least one of the first and second conductors is a multi-layer conductor comprising a metal layer sandwiched between a first transparent conductive oxide layer and a second transparent conductive oxide layer. In some cases, the electrochromic device further includes a diffusion barrier disposed on the substrate and/or one or more color tuning layers adjacent the metal layer.

Certain implementations pertain to an electrochromic device including first and second conductors and a solid state and inorganic electrochromic stack between the first and second conductors adjacent a substrate. In these implementations, at least one of the first and second conductors is a multi-layer conductor having a metal layer sandwiched between a first transparent conductive oxide layer and a defect mitigating insulating layer. In some cases, the electrochromic device further includes a diffusion barrier disposed on the substrate and/or one or more color tuning layers adjacent the metal layer.

Certain implementations pertain to an electrochromic device including first and second conductors and a solid state and inorganic electrochromic stack between the first and second conductors adjacent a substrate. In these implementations, at least one of the first and second conductors is a multi-layer conductor comprising a metal layer sandwiched between a first transparent conductive oxide layer and a blocking/barrier layer. In some cases, the electrochromic device further includes a diffusion barrier disposed on the substrate and/or one or more color tuning layers adjacent the metal layer.

Certain implementations pertain to an electrochromic device including a first conductor comprising a first transparent conductive oxide layer, a second conductor comprising a metal layer sandwiched between a second transparent conductive oxide layer and a third transparent conductive oxide layer, and a solid state and inorganic electrochromic stack between the first and second conductors adjacent a substrate. In these implementations, a first sheet resistance of the first conductor approximately matches a second sheet resistance of the second conductor. In some cases, the electrochromic device further includes a diffusion barrier disposed on the substrate and/or one or more color tuning layers adjacent the metal layer.

These and other features and embodiments will be described in more detail below with reference to the drawings.

DETAILED DESCRIPTION

Figure 1:
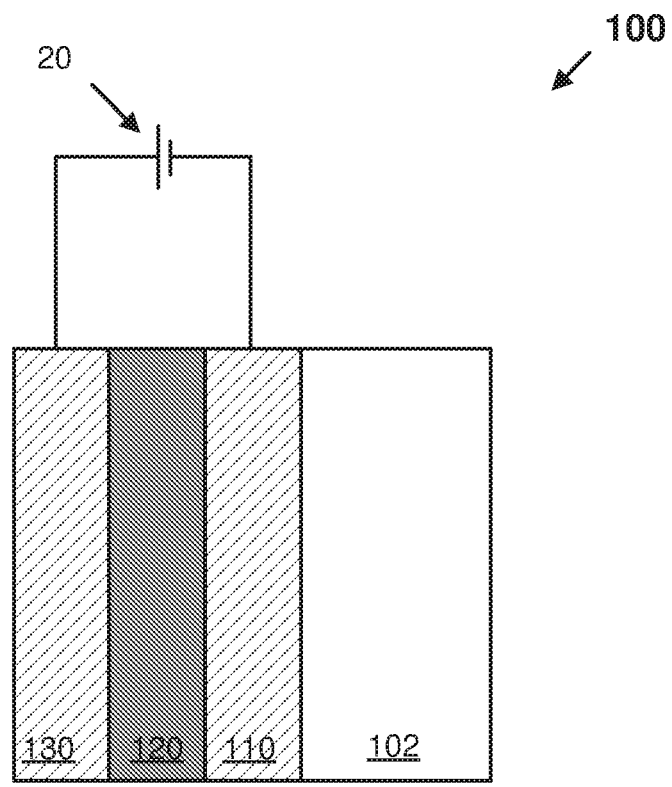
FIG. 1 depicts a schematic illustration of a cross section of an electrochromic device, according to aspects.

Different aspects are described below with reference to the accompanying drawings. The features illustrated in the drawings may not be to scale. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments.

Certain aspects pertain to electrochromic devices configured not only for faster switching, but also for high quality low-defect count. In some cases, the electrochromic devices have multi-layer conductors of differing materials. The different conductor material layers are configured for faster switching relative to conventional single-layer conductors, while also being optically and materially compatible with the other device layers. In other aspects, electrochromic devices are configured with one or more barrier/blocking layer and/or one or more metal alloy layers to help prevent migration of the metal into the electrochromic device for improved durability. These and other aspects are described below.

I. Electrochromic Device Structure

Before turning to a more detailed description on conductor designs and other improvements in layers of an electrochromic device, examples of the structure of an electrochromic device are provided. An electrochromic device generally includes two conductors that sandwich an electrochromic stack. The electrochromic stack typically includes an electrochromic (EC) layer, a counter electrode (CE) layer, and optionally one or more ion conducting (IC) layers that allow ion transport but are electrically insulating. Electrochromic devices are typically deposited on a substrate, and oftentimes are depicted as fabricated on a horizontally oriented substrate, and thus for the purposes of this disclosure, the conductors of the electrochromic device are sometimes referred to as "upper" and "lower" conductors where the description makes reference to drawings that depict the conductors in this manner In other cases, the conductors are referred to as "first" and "second" conductors.

FIG. 1 is a schematic illustration of a cross-section of an electrochromic device 100, according to embodiments. The electrochromic device 100 includes a substrate 102 (e.g., glass), a first conductor 110, an electrochromic stack 120, and a second conductor 130. A voltage source, 20, operable to apply an electric potential across electrochromic stack 120 effects the transition of the electrochromic device 100 between tint states such as, for example, between a bleached state and a colored state. In certain implementations, the electrochromic device 100 further includes a diffusion barrier of one or more layers between the substrate 102 and the first conductor 110. In some cases, the substrate 102 may be fabricated with the diffusion barrier.

In certain embodiments, the electrochromic stack is a three-layer stack including an EC layer, optional IC layer that allows ion transport but is electrically insulating, and a CE layer. The EC and CE layers sandwich the IC layer. Oftentimes, but not necessarily, the EC layer is tungsten oxide based and the CE layer is nickel oxide based, e.g., being cathodically and anodically coloring, respectively. In one embodiment, the electrochromic stack is between about 100 nm and about 500 nm thick. In another embodiment, the electrochromic stack is between about 410 nm and about 600 nm thick. For example, the electrochromic stack may include an electrochromic layer that is between about 200 nm and about 250 nm thick, an IC layer that is between about 10 and about 50 nm thick, and a CE layer that is between about 200 nm and 300 nm thick.

Figure 2A:
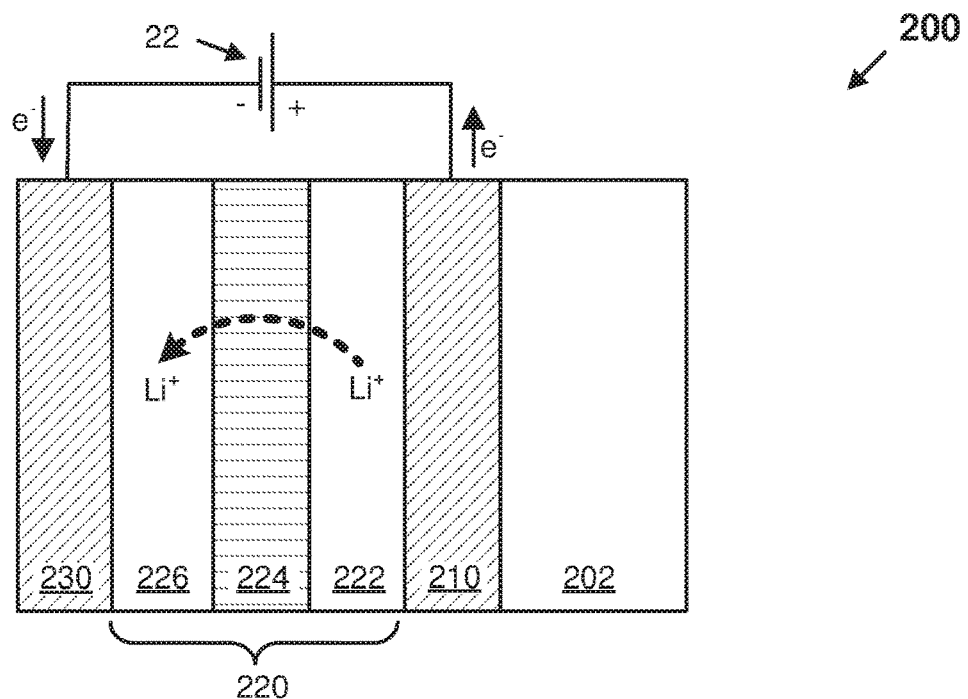
FIGS. 2A and 2B depict schematic illustrations of a cross section of an electrochromic device, according to certain aspects.
Figure 2B:
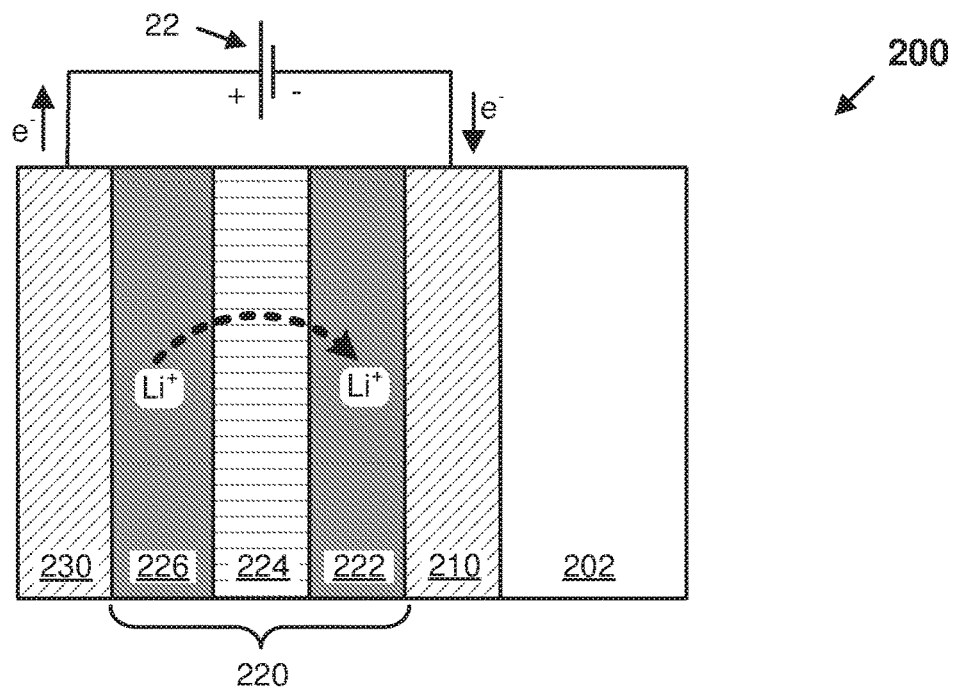

FIGS. 2A and 2B are schematic cross-sections of an electrochromic device 200, according to embodiments. The electrochromic device 200 includes a substrate 202, a first conductor 210, an electrochromic stack 220, and a second conductor 230. The electrochromic stack 220 includes an electrochromic layer (EC) 222, an optional ion conducting (electronically resistive) layer (IC) 224, and a counter electrode layer (CE) 226. A voltage source 22 is operable to apply a voltage potential across the electrochromic stack 220 to effect transition of the electrochromic device between tint states such as, for example, between a bleached state (refer to FIG. 2A) and a colored state (refer to FIG. 2B). In certain implementations, the electrochromic device 200 further includes a diffusion barrier located between the substrate 202 and the first conductor 210.

In certain implementations of the electrochromic device 200 of FIGS. 2A and 2B, the order of layers in the electrochromic stack 220 may be reversed with respect to the substrate 202 and/or the position of the first and second conductors may be switched. For example, in one implementation the layers may be in the following order: substrate 202, second conductor 230, CE layer 226, optional IC layer 224, EC layer 222, and first conductor 210.

In certain implementations, the CE layer may include a material that is electrochromic or not. If both the EC layer and the CE layer employ electrochromic materials, one of them is a cathodically coloring material and the other an anodically coloring material. For example, the EC layer may employ a cathodically coloring material and the CE layer may employ an anodically coloring material. This is the case when the EC layer is a tungsten oxide and the counter electrode layer is a nickel tungsten oxide. The nickel tungsten oxide may be doped with another metal such as tin, niobium or tantalum.

During an exemplary operation of an electrochromic device (e.g. electrochromic device 100 or electrochromic device 200), the electrochromic device can reversibly cycle between a bleached state and a colored state. For simplicity, this operation is described in terms of the electrochromic device 200 shown in FIGS. 2A and 2B, but applies to other electrochromic devices described herein as well. As depicted in FIG. 2A, in the bleached state, a voltage is applied by the voltage source 22 at the first conductor 210 and second conductor 230 to apply a voltage potential across the electrochromic stack 220, which causes available ions (e.g. lithium ions) in the stack to reside primarily in the CE layer 226. If the EC layer 222 contains a cathodically coloring material, the device is in a bleached state. In certain electrochromic devices, when loaded with the available ions, the CE layer can be thought of as an ion storage layer. Referring to FIG. 2B, when the voltage potential across the electrochromic stack 220 is reversed, the ions are transported across optional IC layer 224 to the EC layer 222, which causes the material to transition to the colored state. Again, this assumes that the optically reversible material in the electrochromic device is a cathodically coloring electrochromic material. In certain embodiments, the depletion of ions from the counter electrode material causes it to color also as depicted. In other words, the counter electrode material is anodically coloring electrochromic material. Thus, the EC layer 222 and the CE layer 226 combine to synergistically reduce the amount of light transmitted through the stack. When a reverse voltage is applied to the electrochromic device 200, ions travel from the EC layer 222, through the IC layer 224, and back into the CE layer 226. As a result, the electrochromic device 200 bleaches i.e. transitions to the bleached state. In certain implementations, electrochromic devices can operate to transition not only between bleached and colored states, but also to one or more intermediate tint states between the bleached and colored states.

Some pertinent examples of electrochromic devices are presented in the following US patent applications, each of which is hereby incorporated by reference in its entirety: U.S. patent application Ser. No. 12/645,111, filed on Dec. 22, 2009; U.S. patent application Ser. No. 14/772,055, filed on Apr. 30, 2010; U.S. patent application Ser. No. 12/645, 159, filed on Dec. 22, 2009; U.S. patent application Ser. No. 12/814,279, filed on Jun. 11, 2010; and U.S. patent application Ser. No. 13/462,725, filed on May 2, 2012.

Electrochromic devices described herein such as those described with reference to FIGS. 1, 2A, 2B, 3, 4, 5A, 5B, 6, 7, and 8 can be incorporated, for example, in electrochromic windows. In these examples, the substrate is a transparent or substantially transparent substrate such as glass. For example, the substrate 102 or the substrate 202 may be architectural glass upon which electrochromic devices are fabricated. Architectural glass is glass that can be used as a building material. Architectural glass is typically used in commercial buildings, but may also be used in residential buildings, and typically, though not necessarily, separates an indoor environment from an outdoor environment. In certain embodiments, architectural glass is at least 20 inches by 20 inches. In some embodiments, architectural glass can be as large as about 72 inches by 120 inches.

As larger and larger substrates are used in electrochromic window applications, it becomes more desirable to reduce the number and extent of the defects in the electrochromic devices, otherwise performance and visual quality of the electrochromic windows may suffer. Certain embodiments described herein may reduce defectivity in electrochromic windows.

In some embodiments, one or more electrochromic devices are integrated into an insulating glass unit (IGU). An insulated glass unit includes multiple panes (also referred to as "lites") with a spacer sealed between panes to form a sealed interior region that is thermally insulating and can contain a gas such as an inert gas. In some embodiments, an IGU includes multiple electrochromic lites, each electrochromic lite having at least one electrochromic device disposed on a substantially transparent substrate. In other cases, an IGU includes one electrochromic lite with at least one electrochromic device disposed on a substantially transparent substrate. In one example, an IGU includes at least one lite that is of a laminate construction.

Figure 15:
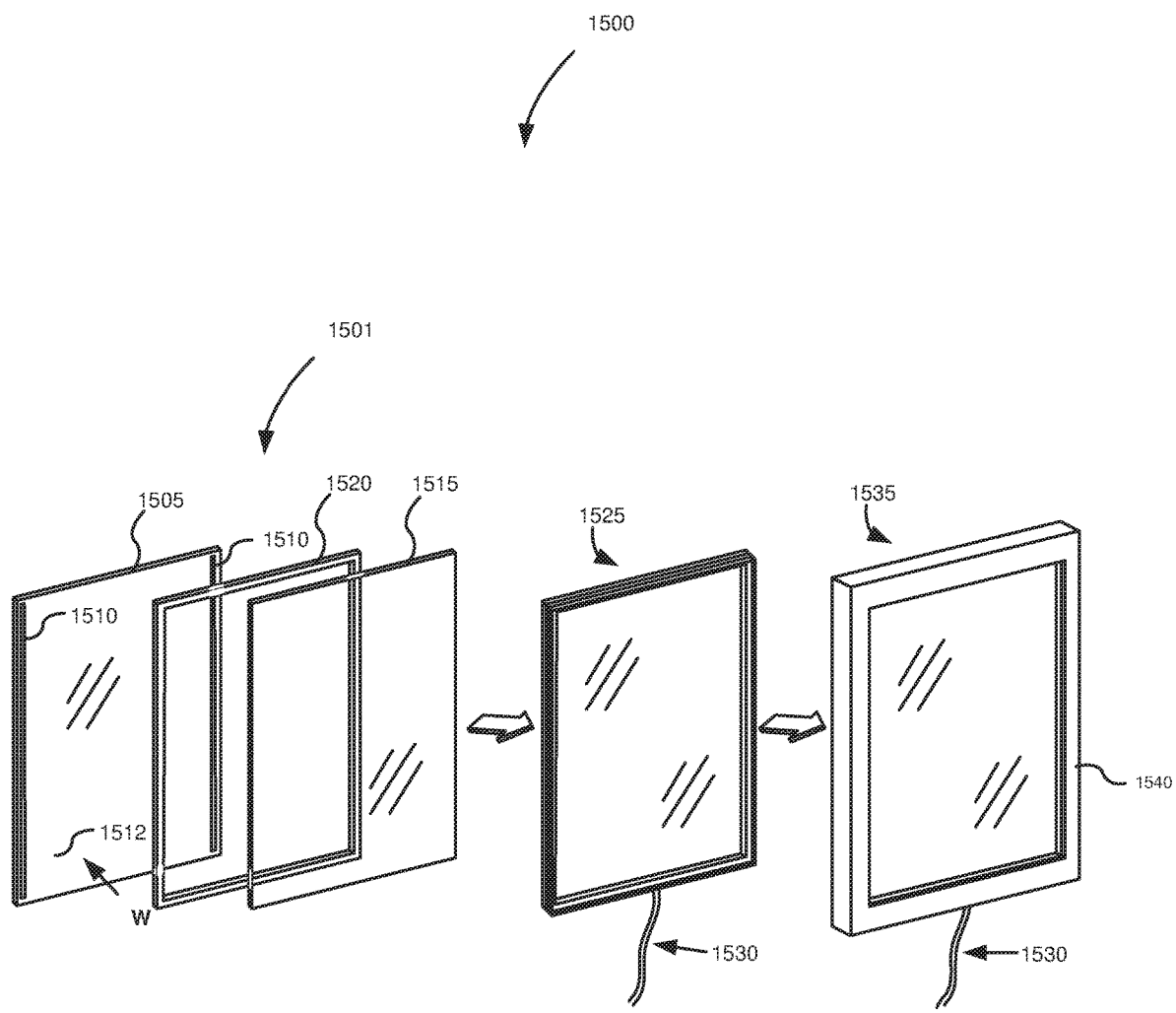
FIG. 15 depicts an example of operations in an electrochromic window assembly fabrication process, according to embodiments.

FIG. 15 depicts an example of operations in an electrochromic window assembly fabrication process 1500, according to embodiments. The fabrication process 1500 includes operations 1501 for fabricating an IGU 1525. During the fabrication of the IGU 1525, an electrochromic lite 1505 having an electrochromic device 1512 disposed on surface W and a pair of bus bars 1510, which deliver power to the electrochromic device 1512, is matched with another lite, 1515. Alternatively, the electrochromic device 1512 may be disposed on the opposing surface to surface W or an electrochromic device may be disposed on both opposing surfaces.

During fabrication of the IGU 1525, a spacer 1520 is sandwiched in between and registered with lites 1505 and 1515. The IGU 1525 has an associated interior space defined by the faces of the lites in contact with the spacer 1520 and the interior surfaces of the spacer 1520. The spacer 1520 is typically a sealing spacer, that is, it includes a spacer and sealing material between the spacer and each lite where they adjoin in order to hermetically seal the interior region and thus protect the interior region from moisture and the like. Once the lites 1505, 1515 are sealed to the spacer 1520, a secondary sealing material may be applied around the perimeter edges of the IGU 1525 in order to impart not only further sealing from the ambient, but also further structural rigidity to the IGU 1525. The IGU 1525 may be wired to a power supply and/or controller via wires, such as wires 1530. The IGU 1525 is installed in and supported by a frame 1540 to form the electrochromic window assembly 1535. The electrochromic window assembly 1535 may be separately connected to a controller (not shown). The controller may also be in electrical communication (wired and/or wirelessly) to one or more sensors in the IGU 1525, the frame 1540, and/or external to the electrochromic window assembly 1535, e.g., via a communication network.

Typically, an IGU is formed by placing a primary sealing spacer, which may include a gasket or sealing material (e.g., PVB (polyvinyl butyral), PIB (polyisobutylene), or other suitable elastomer) and a rigid spacer around the perimeter of the glass sheet. The primary sealing spacer may also be referred to as a primary sealant. In the disclosed embodiments, the primary sealing spacer includes a metal spacer; or other rigid material spacer, and sealing material between the metal spacer and each glass lite. After the lites are joined to the primary sealing spacer, a secondary seal may be formed around the outer perimeter of the primary sealing spacer. The secondary seal may be, for example, a polymeric material that resists water and that adds structural support to the IGU. Typically, but not necessarily, a desiccant is included in the IGU frame or spacer during assembly to absorb any moisture and/or organic volatiles that may diffuse from the sealant materials. In some embodiments, the primary sealing spacer surrounds the bus bars and electrical leads to the bus bars extend through the seal. Typically, but not necessarily, the IGU is filled with an inert gas such as argon. The completed IGU can be installed in, for example, a frame or curtain wall and connected to a source of electricity and a controller to operate the electrochromic window assembly such as, e.g., by controlling tint states of the electrochromic device(s).

In certain embodiments, an electrochromic device is fabricated by thin film deposition methods such as, e.g., sputter deposition, chemical vapor deposition, pyrolytic spray on technology and the like, including combinations of thin film deposition technologies known to one of ordinary skill in the art. In one embodiment, the electrochromic device is fabricated using all plasma vapor deposition.

In certain embodiments, an electrochromic device may further comprise one or more bus bars for applying voltage to the conductors of the electrochromic device. The bus bars are in electrical communication with a voltage source. The bus bars are typically located at one or more edges of the electrochromic device and not in the center region, for example, the viewable central area of an IGU. In some cases, the bus bars are soldered or otherwise connected to the first and second conductors to apply a voltage potential across the electrochromic stack. For example, ultrasonic soldering, which makes a low resistance connection, may be used. Bus bars may be, for example, silver ink based materials and/or include other metal or conductive materials such as graphite and the like.

II. Conductor and Other Electrochromic Device Materials

Recently, there has been increased attention paid to improving conductors for applications such as large-area electrochromic devices. Conventionally, single-layer conductors with transparent conductive oxides (TCOs) based on $In_2O_3$, ZnO, aluminum zinc oxide (AZO), fluorine tin oxide (FTO), indium tin oxide (ITO) have been used, but advanced and/or large-area electrochromic devices require new conductors with lower resistivities than previously achieved, e.g., for faster switching speeds. A TCO/metal/TCO three-layer structure can serve as an alternative since it may provide superior electrical characteristics to that of a conventional single-layer conductor and may have improved optical properties. However, improvements are still needed with regards to this structure. For example, incorporating a TCO/metal/TCO three-layer structure into advanced electrochromic devices introduces problematic issues such as addressing optical and material compatibility with other layers of the advanced electrochromic devices. Generally speaking, recent advancements in electrochromic device design have necessitated improvements in conductors compatible with these advanced designs. A TCO/metal/TCO stack is also referred to herein as an "IMI stack."

In some embodiments, electrochromic devices are configured not only for faster switching, but also to take into account the need for high quality, low-defect count electrochromic devices. In some cases, the electrochromic device conductors are configured for faster switching relative conventional single-layer TCO conductors, while also being optically and materially compatible with the other device layers.

The conductors described herein generally include one or more metal layers or one or more TCO layers, and in some embodiments, include both one or more metal layers and one or more TCO layers. The conductors having two or more layers of differing composition are sometimes referred to herein as "composite conductors" or "multi-layer conductors." In some cases, a composite conductor has two or more metal layers of differing composition. In other cases, a composite conductor has one or more metal layers and one or more TCO layers. In yet other cases, a composite conductor has two or more TCO layers. Generally, but not necessarily, the TCO materials used in conductors are high band gap metal oxides.

Some examples of TCO materials used in a TCO layer of a conductor include, but are not limited to, tin oxide (SnO), indium tin oxide (ITO), antimony tin oxide (ATO), fluorine tin oxide (FTC), aluminum zinc oxide (AZO), gallium zinc oxide (GZO), indium zinc oxide (MO), zinc oxide (ZnO), boron zinc oxide (BZO), tungsten zinc oxide (WZO), tungsten tin oxide (WTO), niobium titanium oxide (NTiO), zinc indium tin oxide (zITo), gallium indium tin oxide (GITO), and other metal oxides, doped with one or more dopants or not, for example.

According to one aspect, a TCO layer in a conductor has a thickness of less than 200 nm. According to one aspect, the thickness of a TCO layer in a conductor is between about 20 nm and about 50 nm. In some cases, the TCO layer is between about 200 nm and 500 nm thick. In some cases, the TCO layer is between about 100 nm and 500 nm thick. In some cases, the TCO layer is between about 10 nm and 100 nm thick. In some cases, the TCO layer is between about 10 nm and 50 nm thick. In some cases, the TCO layer is between about 200 nm and 500 nm thick. In some cases, the TCO layer is between about 100 nm and 250 nm thick.

Some examples of metals used in a metal layer of a conductor include, but are not limited to, silver, copper, aluminum, tungsten, gold, platinum, and mixtures, intermetallics and alloys thereof. According to one aspect, a metal layer or metal layers in a conductor have a thickness of less than about 20 nm. In one embodiment, the metal layer has a thickness in the range of between about 1 nm and 5 nm thick. In one embodiment, the metal layer has a thickness in the range between about 5 nm to about 30 nm. In one embodiment, the metal layer has a thickness in the range between about 10 nm and about 25 nm. In one embodiment, the metal layer has a thickness in the range between about 15 nm and about 25 nm.

In some embodiments, a metal layer of a conductor may be comprised of a "metal sandwich" construction of two or more different metal sublayers. For example, a metal layer may comprise a "metal sandwich" construction of Cu/Ag/Cu sublayers instead of a single layer of, for example, Cu. In another example, a metal layer may comprise a "metal sandwich" construction of NiCr/metal/NiCr, where the metal sublayer is one of the aforementioned metals.

In some embodiments, a metal layer of a conductor includes a metal alloy. Electromigration resistance of metals can be increased through alloying. Increasing the electromigration resistance of metal layers in a conductor reduces the tendency of the metal to migrate into the electrochromic stack and potentially interfere with operation of the device. By using a metal alloy, the migration of metal into the electrochromic stack can be slowed and/or reduced which can improve the durability of the electrochromic device. Certain aspects pertain to using a metal alloy in a metal layer of a conductor to help reduce the tendency of migration of the metal into the electrochromic stack and potentially improve the durability of the electrochromic device. For example, addition of small amounts of Cu or Pd to silver can substantially increase the electromigration resistance of the silver material. In one embodiment, for example, a silver alloy with Cu or Pd is used in a conductor to reduce the tendency of migration of silver into the electrochromic stack to slow down or prevent such migration from interfering with normal device operation. In some cases, the metal layer may be comprised of an alloy whose oxides have low resistivity. In one example, the metal layer may further comprise another material (e.g., Hg, Ge, Sn, Pb, As, Sb, or Bi) as compound during the preparation of the oxide to increase density and/or lower resistivity.

In some embodiments, the one or more metal layers of a composite conductor are transparent. Typically, a transparent metal layer is less than 10 nm thick, for example, about 5 nm thick or less. In other embodiments, the one or more metal layers of a composite conductor are opaque or not entirely transparent.

In certain embodiments, a composite conductor includes a layer of material of "opposing susceptibility" adjacent a dielectric or metal layer. A material of "opposing susceptibility," referring to the material's electric susceptibility, generally refers to a material that has susceptibility to having an opposing sign. Electric susceptibility of a material refers to its ability to polarize in an applied electric field. The greater the susceptibility, the greater the ability of the material to polarize in response to the electric field. Including a layer of "opposing susceptibility" can change the wavelength absorption characteristics to increase the transparency of the dielectric or metal layer and/or shift the wavelength transmitted through the combined layers. For example, a composite conductor can include a high-index dielectric material layer (e.g., $TiO_2$) of "opposing susceptibility" adjacent a metal layer to increase the transparency of the metal layer. In some cases, the added layer of "opposing susceptibility" adjacent a metal layer can cause a not entirely transparent metal layer to be more transparent. For example, a metal layer (e.g., silver layer) that has a thickness in the range of from about 5 nm to about 30 nm, or between about 10 nm and about 25 nm, or between about 15 nm and about 25 nm, may not be entirely transparent by itself, but when coated with a material of "opposing susceptibility" (e.g., $TiO_2$ layer on top of the silver layer), the transmission through the combined layers is higher than the metal or dielectric layer alone. Certain aspects pertain to selecting a dielectric or metal layer and an adjacent layer of "opposing susceptibility" to color tune the electrochromic device to transmit certain wavelengths of a predetermined spectrum.

In certain embodiments, a composite conductor includes one or more metal layers and one more "color tuning" layers also referred to as "index matching" layers. These color tuning layers are generally of a high-index, low-loss dielectric material of "opposing susceptibility" to the one or more metal layers. Some examples of materials that can be used in "color tuning" layers include silicon oxide, tin oxide, indium tin oxide, and the like. In these embodiments, the thickness and/or material used in the one or more color tuning layers changes the absorption characteristics to shift the wavelength transmitted through the combination of the material layers. For example, the thickness of the one or more color tuning layers can be selected to tune the color of light transmitted through the electrochromic device in a bleached state to a predetermined spectrum (e.g., more blue over green or red). In another example, tuning layers are chosen and configured to reduce transmission of certain wavelengths (e.g., yellow) through the electrochromic device, and thus e.g. a window which includes the device coating.

Although the first and second composite conductors generally have the same or substantially similar layers and the order of the layers in the first composite conductor mirrors the order of the layers of the second composite conductor in described implementations, the disclosure is not so limiting. For example, the first composite conductor may have different layers than the second composite conductor in other embodiments. As another example, the first composite conductor may have the same layers as the second composite conductor but the order of the layers may not mirror each other.

In certain embodiments, the first and second conductors have matched sheet resistance, for example, to provide optimum switching efficiency of the electrochromic device and/or a symmetric coloration front. Matched conductors have sheet resistances that vary from each other by no more than 20% in some embodiments, in other embodiments by no more than 10%, and in yet other embodiments by no more than 5%.

For large-area electrochromic devices, e.g., those devices disposed on architectural scale substrates, that is, substrates at least 20×20 inches and up to 72×120 inches, the overall sheet resistance of each of the multi-layer conductors (including all layers of the conductor such as metal, TCO, and DMIL, if present) is typically less than 15Ω/□, less than 10Ω/□, less than 5Ω/□, less than 3Ω/□, or less than 2Ω/□. This allows for faster switching relative to conventional devices, particularly when the sheet resistance is less than 5Ω/□, or less than 3Ω/□, or less than 2Ω/□. Resistivities of conductors described herein are typically measured in Ω-cm. In one example, the resistivity of one or more of the multi-layer conductors may be between about 150 Ω-cm and about 500 Ω-cm. One or more of the layers of a multi-layer conductor, such as a metal layer, may have a lower resistivity.

Ideally, at least the lower conductor's topography should be smooth for better conformal layers in the deposited stack thereon. In certain embodiments, one or both of the conductors is a substantially uniform conductor layer that varies by about +10% in thickness in some cases, or about ±5% in thickness in some cases, or even about ±2% in thickness in some cases. Although typically the thickness of conductors is about 10-800 nm, the thickness will vary depending upon the materials used, thickness of individual layers and how many layers are in the conductor. For example, for composite conductors that include one or more TCOs, the TCO components can be between about 50 nm and about 500 nm thick while the conductor also includes one or more metal layers. In one example, the thickness of the metal layer(s) is in the range of between about 0.1 nm and about 5 nm thick. In one example, the thickness of the metal layer(s) is in the range of between about 1 nm and about 5 nm thick. In one example, the thickness of the metal layer(s) is in the range of about 5 nm to about 30 nm. In one example, the thickness of the metal layer(s) is in the range of between about 10 nm and about 25 nm. In one example, the thickness of the metal layer(s) is in the range of or between about 15 nm and about 25 mm.

In certain cases, the one or more metal layers of a conductor are fabricated sufficiently thin so as to be transparent in a transmissive electrochromic device. In other cases, a metal layer of a conductor is fabricated sufficiently thin to be almost transparent and then a material of "opposing susceptibility" is disposed adjacent the almost transparent metal to increase the transparency of the metal layer in transmissive electrochromic device. In cases with reflective devices, the one or more metal layers may have non-transparent metal layers without adding an adjacent layer of material of "opposing susceptibility."

Electrochromic devices described herein may include one or more defect mitigating insulating layers (DMILs) such as those described in U.S. patent application Ser. No. 13/763,505, titled "DEFECT MITIGATION LAYERS IN ELECTROCHROMIC DEVICES" and filed on Feb. 8, 2013, which is hereby incorporated by reference in its entirety. DMIL technology includes devices and methods employing the addition of at least one DMIL. A DMIL prevents electronically conducting layers and/or electrochromically-active layers from contacting layers of the opposite polarity and creating a short circuit in regions where certain types of defects form. In some embodiments, a DMIL, can encapsulate particles and prevent them from ejecting from the electrochromic stack and possibly cause a short circuit when subsequent layers are deposited. In certain embodiments, a DMIL has an electronic resistivity of between about 1 and $5 \times 10^{10}$ Ohm-cm.

In some embodiments, the defect-mitigating insulating layer is a metal oxide, a metal nitride, a metal carbide, a metal oxynitride, or a metal oxycarbide. For example, the DMIL, may be a metal oxide, e.g., a cerium oxide, a titanium oxide, an aluminum oxide, a zinc oxide, a tin oxide, a silicon aluminum oxide, a tungsten oxide, a nickel tungsten oxide, a tantalum oxide, or an oxidized indium tin oxide. As another example, the DMIL, may be a metal nitride, e.g., a titanium nitride, an aluminum nitride, a silicon nitride, a tantalum nitride, or a tungsten nitride. Still further, the DMIL may be a metal carbide, e.g., a titanium carbide, an aluminum carbide, a silicon carbide, a tantalum carbide, or a tungsten carbide. In some devices, the DMIL contains a nitride, carbide, oxynitride, or oxycarbide such as nitride, carbide, oxynitride, or oxycarbide analogs of the listed oxides, e.g., silicon aluminum oxynitride. In some devices, the DMIL may also contain a mixture or other combination of oxide and nitride materials (e.g., a silicon oxynitride). In some devices, the DMIL, contains two distinct electronically insulating materials. For example, the DMIL may include particles of a polishing compound. In one aspect, a DMIL is a $TiO_x$ layer.

The defect-mitigating insulating layer may be between about 5 nm and 500 nm in thickness. In various embodiments, the DMIL has an electronic resistivity of between about 1 ohm-cm and about $10^{15}$ ohm-cm. In certain embodiments, the defect-mitigating insulation layer is ionically conductive.

The general attributes of a DMIL include transparency in the visible range, weak or no electrochromism, electronic resistance comparable to or higher than that of undoped electrode material (electrochromic and/or counter electrode), and physical and chemical durability. In certain embodiments, the DMIL has a density of at most about 90% of the maximum theoretical density of the material from which it is fabricated.

As discussed above, one of the properties of a DMIL is its particular electronic resistivity. Generally, a DMIL should have an electronic resistivity level that is substantially greater than that of the transparent conductive layer in the conductor, and in certain cases orders of magnitude greater. In some embodiments, the DMIL has an electronic resistivity that is intermediate between that of anion conducting layer and that of a transparent conductive layer (e.g., indium tin oxide). Thus, in these embodiments the electronic resistivity of the DMIL would be greater than about $10^{-4}$ Ω-cm (approximate resistivity of indium tin oxide) or greater than about $10^{-6}$ Ω-cm. In some cases, the DMIL has an electronic resistivity that is greater than about $10^{-4}$ Ω-cm (approximate resistivity of indium tin oxide). In some cases, the DMIL, has an electronic resistivity that is greater than about $10^{-6}$ Ω-cm. In some cases, the DMIL has an electronic resistivity that is between about $10^{-4}$ Ω-cm and $10^{14}$ Ω-cm (approximate resistivity of certain examples of ion conductors for electrochromic devices). In some cases, the the DMIL has an electronic resistivity between about $10^{-5}$ Ω-cm and $10^{12}$ Ω-cm. In certain embodiments, the electronic resistivity of the DMIL is between about 1 and $5 \times 10^{13}$ Ω-cm. In certain embodiments, the electronic resistivity of the DMIL is between about $10^2$ and $10^{12}$ Ω-cm. In certain embodiments, the electronic resistivity of the DMIL, is between about $10^6$ and $5 \times 10^{12}$ Ω-cm. In certain embodiments, the electronic resistivity of the DMIL is between about $10^7$ and $5 \times 10^9$ Ω-cm. In some embodiments, the DMIL has an electronic resistivity that is comparable (e.g., within an order of magnitude) of that of the electrochromic layer or the counter electrode layer of the electrochromic stack. DMILs are designed within specified resistivity ranges while blocking/barrier layers are not limited to those resistivity ranges, e.g. a blocking/barrier layer may be highly electrically conductive, or not, while a DMIL has the specified electrical resistivity.

The electronic resistivity is coupled to the thickness of the DMIL. This resistivity and thickness level will together yield a sheet resistance value which may in fact be more important than simply the resistivity of the material alone (a thicker material will have a lower sheet resistance). When using a material having a relatively high resistivity value, the electrochromic device may be designed with a relatively thin DMIL, which may be desirable to maintain the optical quality of the device. In certain embodiments, the DMIL has a thickness of about 100 nm or less or about 50 nm or less. In one example, the DMIL has a thickness of about 5 mu, in another example, the layer has a thickness of about 20 nm, and in another example, the layer has a thickness of about 40 nm. In certain embodiments, the DMIL has a thickness of between about 10 nm and about 100 nm. In one case, a DMIL is about 50 nm thick. In certain embodiments, the electronic sheet resistance of the DMIL is between about 40 and 4000Ω per square or between about 100 and 1000Ω per square. In some cases, the insulating material is electrically semiconducting having a sheet resistance that cannot be easily measured.

In certain embodiments, particularly those in which a DMIL is disposed on the substrate, a thicker layer of a DMIL is sometimes employed. The thickness of the DMIL may be, for example, between about 5 and 500 nm, between about 5 and 100 nm, between 10 and 100 nm, between about 15 and 50 nm, between about 20 and 50 nm, or between about 20 and 40 nm.

In certain embodiments, the material making up the DMIL has a relatively low charge capacity. In the context of an electrochromic device, a material's charge capacity represents its ability to reversibly accommodate lithium ions during normal electrochromic cycling. Charge capacity is the capacity of the material to irreversibly accommodate lithium ions that it encounters during fabrication or during initial cycling. Those lithium ions that are accommodated as charge are not available for subsequent cycling in and out of the material in which they are sequestered. If the insulating material of the DMIL has a high charge capacity, then it may serve as a reservoir of nonfunctional lithium ions (typically the layer does not exhibit electrochromism so the lithium ions that pass into it do not drive a coloring or bleaching transition). Therefore, the presence of this additional layer requires additional lithium ions to be provided in the device simply to be taken up by this additional layer. This is of course a disadvantage, as lithium can be difficult to integrate into the device during fabrication. In certain embodiments, the charge capacity of the DMIL is between about 10 and 100 milliCoulomb/cm$^2$*um. In one example, the charge capacity of the DMIL is between about 30 and 60 milliCoulomb/cm$^2$. For comparison, the charge capacity of a typical nickel tungsten oxide electrochromic layer is approximately 120 milliCoulomb/cm$^2$*um. In certain embodiments, the charge capacity of a DMIL is between about 30 and 100 milliCoulomb/cm$^2$*um. In one example, the charge capacity of the DMIL is between about 100 and 110 milliCoulomb/cm$^2$*um. For comparison, the charge capacity of a typical nickel tungsten oxide electrochromic layer is typically less than about 100 milliCoulomb/cm$^2$*um.

In certain embodiments, the DMIL is ionically conductive. This is particularly the case if the layer is deposited before the counter electrode layer. In some of these embodiments, the DMIL has an ionic conductivity of between about $10^{-7}$ Siemens/cm and $10^{10-12}$ Siemens/cm. In other of these embodiments, the DMIL has an ionic conductivity of between about $10^{-8}$ Siemens/cm and $10^{-11}$ Siemens/cm. In other of these embodiments, the DMIL has an ionic conductivity of between about between $10^{-9}$ Siemens/cm and $10^{-10}$ Siemens/cm.

In some implementations, the DMIL exhibits little or no electrochromism during normal operation. Electrochromism may be measured by applying a defined voltage change or other driving force and measuring the change in optical density or transmissivity of the device.

According to certain implementations, the material of the DMIL should have favorable optical properties. For example, the material of the DMIL should have a relatively low optical density such as, for example, an optical density below about 0.1 or an optical density below about 0.05. Additionally in certain cases, the material of the DMIL, has a refractive index that matches that of adjacent materials in the stack so that it does not introduce significant reflection. The material should also adhere well to other materials adjacent to it in the electrochromic stack.

As discussed above, a DMIL can serve to encapsulate particles that deposit on the device during fabrication in certain embodiments. By encapsulating these particles, they are less likely to eject and potentially cause defects. In certain implementations, the fabrication operation that deposits the DMIL is performed immediately after or soon after the process operation or operations that likely introduces particles into the device. These implementations may be useful to improve encapsulating the particles and reduce defectivity in electrochromic devices. In certain implementations, thicker layers of DMILs are used. Using thicker DMILs may be particularly useful to increase encapsulating of particles and reduce defectivity in electrochromic devices.

Various insulating materials may be used in DMILs. Some of these insulating materials include various transparent metal oxides such as, for example, aluminum oxide, zinc oxide, tin oxide, silicon aluminum oxide, silicon oxide, cerium oxide, stoichiometric tungsten oxide (e.g., WO$_3$, wherein the ratio of oxygen to tungsten is exactly 3), variations of nickel tungsten oxide, and highly oxidized indium tin oxide (ITO). In some cases, the insulating material of the DMIL is selected from aluminum oxide, zinc oxide, silicon aluminum oxide, tantalum oxide, and nickel tungsten oxide (typically a non-electrochromic type). In addition, some nitrides, carbides, oxynitrides, oxycarbides, and fluorides having medium to high resistance and optical transparency can be used. For example, nitrides such as titanium nitride, tantalum nitride, aluminum nitride, silicon nitride, and/or tungsten nitride may be used. Further, carbides such as titanium carbide, aluminum carbide, tantalum carbide, silicon carbide, and/or tungsten carbide may be used. Oxycarbides and/or oxynitrides may also be used in certain embodiments. Unless otherwise specified, each of these compositions may be present in various stoichiometries or ratios of elements. For DMILs containing nickel and tungsten, the ratio of nickel to tungsten may be controlled such that relatively high ratios are employed. For example the Ni:W (atomic) ratio may be between about 90:10 and 50:50 or between about 80:20 and 60:40.

In some cases, the material chosen for the DMIL is a material that integrates well (i.e. compatible) with electrochromic stack. The integration may be promoted by (a) employing compositions similar to those of materials in layers adjacent to DMIL in the stack (promotes ease of fabrication), and (b) employing materials that are optically compatible with the other materials in the stack and reduce quality degradation in the overall stack.

In certain embodiments, the electrochromic device includes a diffusion barrier between the lower conductor and the transparent substrate (e.g., a glass substrate such as soda lime glass). The diffusion barrier may include one or more layers. The diffusion barrier layer or layers keep sodium ions from diffusing into the electrochromic device layers above it and may also, optionally, be optically tuned to enhance various optical properties of the entire construct, e.g., % optical transmission (% T), haze, color, reflection and the like.

In one embodiment, the diffusion barrier includes one or more layers including one more of, for example, silicon dioxide, silicon oxide, tin oxide, FTO and the like. In certain aspects, the diffusion barrier is a three-layer stack of SiO$_2$, SnO$_2$, and SiO$_x$, wherein the SiO$_2$ layer has a thickness in the range of between 20 nm and 30 nm, the a SnO$_2$ layer has a thickness in the range of between 20 and 30 nm, and the SiO$_x$ layer has a thickness in the range of 2 nm to 10 nm. In one aspect, the SiO$_x$ layer of the tri-layer diffusion barrier is a monoxide or a mix of the monoxide with SiO$_2$. In one aspect, the tri-layer diffusion barrier may be sandwiched between an FTO and the substrate. In certain aspects, the diffusion barrier is in a bi-layer or tri-layer construction of SnO$_2$, SiO$_2$ and SiO$_x$ in various combinations. In one embodiment, thicknesses of individual diffusion barrier layers may be in the range between about 10 nm and 30 nm. In certain cases, thicknesses of individual diffusion barrier layers may be in the range of 20 nm-30 nm. In some cases, the diffusion barrier may be a sodium diffusion barrier and/or an anti-reflection or anti-iridescent layer.

In certain implementations, the electrochromic device has a diffusion barrier between the lower conductor and the substrate. In other implementations, the electrochromic device does not have a diffusion barrier. In some cases, a diffusion barrier may not be necessary and is not used. For example, if the substrate is a sodium free substrate such as plastic or alkali free glass, the diffusion barrier is optional. In other examples, an electrochromic device may have one or more color tuning layers over the substrate that function as a diffusion barrier.

In certain implementations, the substrate upon which the electrochromic device is disposed is made of a glass material and especially an architectural glass or other shatter-resistant glass material such as, for example, a silicon oxide ($SO_x$)-based glass material. As a more specific example, a substrate can be a soda-lime glass substrate or float glass substrate. Such glass substrates can be composed of, for example, approximately 75% silica ($SiO_2$) as well as $Na_2O$, CaO, and several minor additives. However, the substrate can be formed of any material having suitable optical, electrical, thermal, and mechanical properties. For example, other suitable substrates can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, the substrate may be strengthened, for example, by tempering, heating, chemically strengthening, or lamination with another substrate.

III. Composite Conductors Examples

This section includes examples of electrochromic devices having one or more composite conductors, according to embodiments. In certain implementations, the electrochromic stacks and other layers of the electrochromic devices described in this section may have similar characteristics to layers described in the sections above. For example, the layers of the electrochromic stacks described in this section and in other sections may be similar in some respects to the layers described with reference to FIGS. 2A and 2B in Section I. As another example, the characteristics of the DMILs described in this section are described in detail in Section II.

Conductive Material/DMIL1/Conductive Material/DMIL2

In certain embodiments, a composite conductor includes material layers with the order of: a first conductive material layer, a first DMIL adjacent the first conductive material layer, a second conductive material layer adjacent the first DMIL, and a second DMIL adjacent the second conductive material layer. In these embodiments, the first conductive material layer is a metal layer or a TCO layer and the second conductive material layer is a metal layer or a TCO layer. In certain examples, both the first and second conductive material layers are metal layers. In other examples, both the first and second conductive material layers are a TCO layers. In other examples, the first or second conductive material layer is a TCO layer and the other conductive material layer is a metal layer. An example of a composite conductor with material layers, in order, of: a first conductive material layer, a first DMIL, a second conductive material layer, and a second DMIL is shown in FIG. 3.

Figure 3:
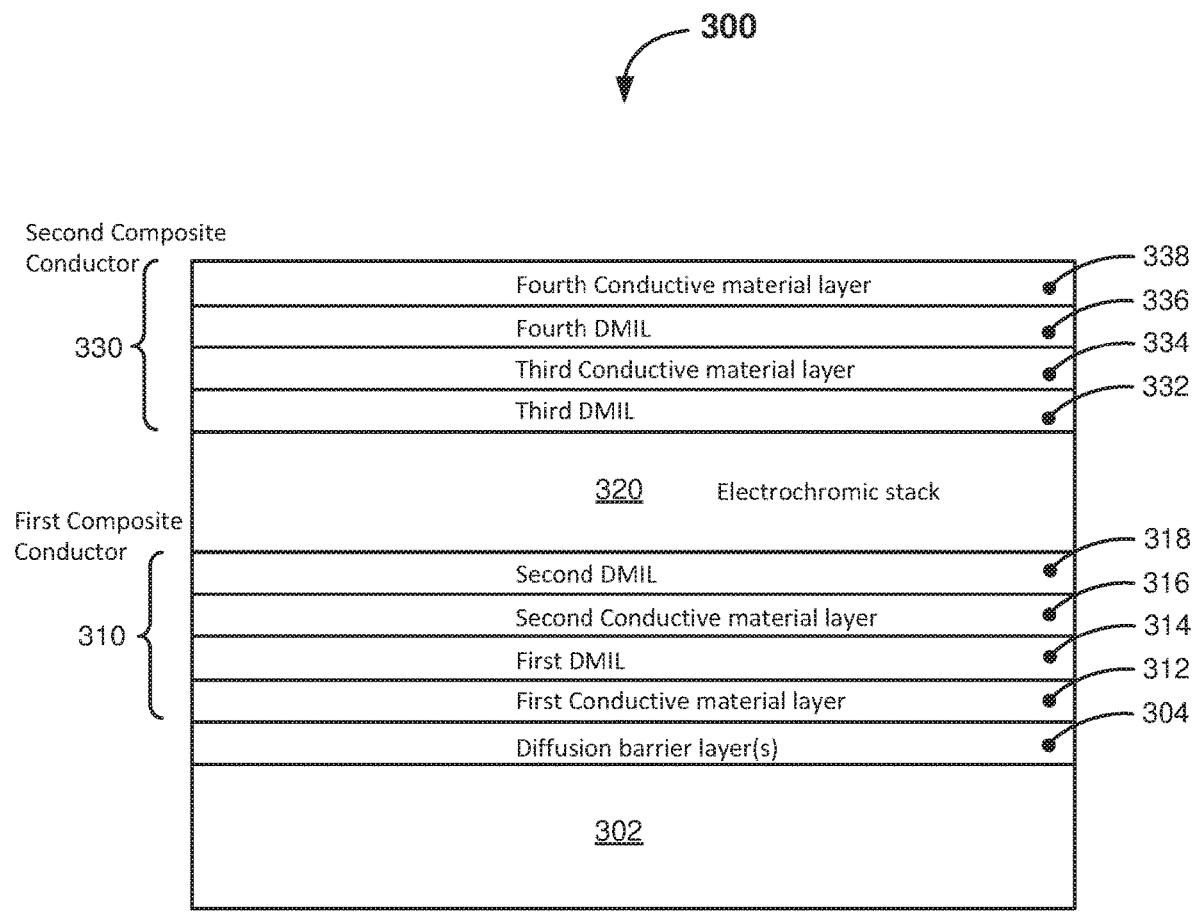
FIG. 3 depicts a schematic illustration of a cross section of an electrochromic device including in order a substrate, a diffusion barrier, a first composite conductor with a first conductive (metal or TCO) material layer, a first DMIL, a second conductive (metal or TCO) material layer, and a second DMIL and a second composite conductor with mirrored layers to first composite conductor, according to embodiments.

FIG. 3 depicts a schematic illustration of the material layers of an electrochromic device 300, according to embodiments. The electrochromic device 300 includes a substrate 302, one or more diffusion barrier layers 304 disposed on the substrate 302, a first composite conductor 310 disposed on the diffusion barrier layer(s) 304, an electrochromic stack 320 disposed on the first composite conductor 310, and a second composite conductor 330 disposed on the electrochromic stack 320. The first composite conductor 310 includes a first conductive material layer 312, a first DMIL 314, a second conductive material layer 316, and a second DMIL 318. The second composite conductor 330 includes a third DMIL 314, a third conductive material layer 334, a fourth DMIL 336, and a fourth conductive material layer 338. The first conductive material layer 312 and the fourth conductive material layer 338 are either a metal layer or a TCO layer. The second conductive material layer 316 and the third conductive material layer 334 are either a metal layer or a TCO layer. In one example, the first conductive material layer 312 is a TCO layer and the second conductive material layer 316 is a metal layer. In another example, the first conductive material layer 312 is a metal layer and the second conductive material layer 316 is a TCO layer. In another example, both the first conductive material layer 312 and the second conductive material layer 316 are made of metal. In another example, both the first conductive material layer 312 and the second conductive material layer 316 are made of a TCO.

If the first conductive material layer 312 is made of a TCO, then the layer is made of any of the materials described above for TCOs and has the associated electrical, physical and optical properties of the TCO materials as described above. If the first conductive material layer 312 is made of a metal, then the layer may be made of any of the metal materials as described above for metal layers, including alloys, intermetallics, mixtures and/or layers of metals, and having the electrical, physical and optical properties of the metals as described above. In one embodiment where the first conductive material layer 312 is made of a metal, the thickness is between about 1 nm and 5 nm thick. In one embodiment where the first conductive material layer 312 is made of a metal, the thickness is between about 5 nm to about 30 nm. In one embodiment Where the first conductive material layer 312 is made of a metal, the thickness is between about 10 nm and about 25 nm. In one embodiment where the first conductive material layer 312 is made of a metal, the thickness is between about 15 nm and about 25 mm. In one embodiment, the first conductive material layer 312 is made of a silver metal. The first DMIL 314 may be made of any of the materials described above for DMILs and has the associated electrical, physical and optical properties of the DMIL materials as described above. In one embodiment, the first DMIL 314 is of $TiO_2$. In one case, the first DMIL 314 of $TiO_2$ is between 10 nm and 100 nm thick. In another case, the first DMIL 314 of $TiO_2$ is between 25 nm and 75 nm thick. In another case, the first DMIL 314 of $TiO_2$ is between 40 nm and 60 nm thick. In yet another case, the first DMIL 314 of $TiO_2$ is about 50 nm thick.

If the second conductive material layer 316 is made of a TCO, then the layer is made of any of the materials described above for TCOs and has the associated electrical, physical and optical properties of the TCO materials as described above. If the second conductive material layer 316 is made of a metal, then the layer may be made of any of the metal materials as described above for metal layers, including alloys, intermetallics, mixtures and/or layers of metals, and having the electrical, physical and optical properties of the metals as described above. In one embodiment where the second conductive material layer 316 is made of a metal, the thickness is between about 1 nm and 5 nm thick. In one embodiment where the second conductive material layer 316 is made of a metal, the thickness is between about 5 nm to about 30 nm. In one embodiment where the second conductive material layer 316 is made of a metal, the thickness is between about 10 nm and about 25 nm. In one embodiment where the second conductive material layer 316 is made of a metal, the thickness is between about 15 nm and about 25 nm. In one embodiment, the second conductive material layer 316 is made of a silver metal.

The second DMIL 318 may be made of any of the materials described above for DMILs and has the associated electrical, physical and optical properties of the DMIL materials as described above. In one embodiment, the second DMIL 318 is of $TiO_2$. In one case, the second DMIL 318 of $TiO_2$ is between 10 nm and 100 nm thick. In another case, the second DMIL 318 of $TiO_2$ is between 25 nm and 75 nm thick. In another case, the second DMIL 318 of $TiO_2$ is between 40 nm and 60 nm thick. In yet another case, the second WAIL 318 of $TiO_2$ is about 50 nm thick.

The third DMIL 314 may be made of any of the materials described above for DMILs and has the associated electrical, physical and optical properties of the DMIL materials as described above. In one embodiment, the third DMIL 314 is of $TiO_2$. In one case, the third DMIL 314 of $TiO_2$ is between 10 nm and 100 nm thick. In another case, the third DMIL 314 of $TiO_2$ is between 25 nm and 75 nm thick. In another case, the third DMIL 314 of $TiO_2$ is between 40 nm and 60 nm thick. In yet another case, the third DMIL 314 of $TiO_2$ is about 50 nm thick.

The fourth DMIL 336 may be made of any of the materials described above for DMILs and has the associated electrical, physical and optical properties of the DMIL, materials as described above. In one embodiment, fourth DMIL 336 is of $TiO_2$. In one case, fourth DMIL 336 of $TiO_2$ is between 10 nm and 100 nm thick. In another case, the fourth DMIL 336 of $TiO_2$ is between 25 nm and 75 nm thick. In another case, the fourth DMIL 336 of $TiO_2$ is between 40 nm and 60 nm thick. In yet another case, the fourth DMIL 336 of $TiO_2$ is about 50 nm thick.

If the third conductive material layer 334 is made of a TCO, then the layer is made of any of the materials described above for TCOs and has the associated electrical, physical and optical properties of the TCO materials as described above. If the third conductive material layer 334 is made of a metal, then the layer may be made of any of the metal materials as described above for metal layers, including alloys, intermetallics, mixtures and/or layers of metals, and having the electrical, physical and optical properties of the metals as described above. In one embodiment where the third conductive material layer 334 is made of a metal, the thickness is between about 1 nm and 5 nm thick. In one embodiment where the third conductive material layer 334 is made of a metal, the thickness is between about 5 nm to about 30 nm. In one embodiment where the third conductive material layer 334 is made of a metal, the thickness is between about 10 nm and about 25 nm. In one embodiment where the third conductive material layer 334 is made of a metal, the thickness is between about 15 nm and about 25 nm. In one embodiment, the third conductive material layer 334 is made of a silver metal.

If the fourth conductive material layer 338 is made of a TCO, then the layer is made of any of the materials described above for TCOs and has the associated electrical, physical and optical properties of the TCO materials as described above. If the fourth conductive material layer 338 is made of a metal, then the layer may be made of any of the metal materials as described above for metal layers, including alloys, intermetallics, mixtures and/or layers of metals, and having the electrical, physical and optical properties of the metals as described above. In one case, the fourth conductive material layer 338 is silver and is between about 1 nm and 5 nm thick. In one embodiment where the fourth conductive material layer 338 is made of a metal, the thickness is between about 1 nm and 5 nm thick. In one embodiment where the fourth conductive material layer 338 is made of a metal, the thickness is between about 5 nm to about 30 nm. In one embodiment where the fourth conductive material layer 338 is made of a metal, the thickness is between about 10 nm and about 25 nm. In one embodiment where the fourth conductive material layer 338 is made of a metal, the thickness is between about 15 nm and about 25 nm. In one embodiment, the fourth conductive material layer 338 is made of a silver metal.

In the illustrated embodiment, the first and second composite conductors 310 and 330 have the same or substantially similar material layers as each other with a mirrored layout. That is, the third DMIL 332 is the same or substantially similar to the second DMIL 318, the fourth DMIL 336 is the same or substantially similar to the first DMIL 314, the first conductive material layer 312 is the same or substantially similar to the fourth conductive material layer 338, and the second conductive material layer 316 is the same or substantially similar to the third conductive material layer 334. In other embodiments, the first and second composite conductors 310 and 330 may have different orders of the same layers. In yet other embodiments, the first and second composite conductors 310 and 330 have different material layers. Although the electrochromic device 300 is shown in with diffusion barrier layer(s) 304, another embodiment omits it.

In certain aspects, the first composite conductor 310 of the electrochromic device 300 shown in FIG. 3 further includes one or more color tuning layers located between the substrate 302 and the first conductive material layer 312. In these aspects, the first conductive material layer 312 is made of metal. In some of these aspects, the color tuning layer(s) is substituted for the diffusion barrier 304. In these color tuning embodiments, the one or more color tuning layers may be selected to increase transparency of the conductor and/or to modify the wavelength of light passing through the electrochromic device to change the color of light transmitted. Some examples of materials that can be used in color tuning layers are silicon oxide, tin oxide, indium tin oxide, and the like.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first composite conductor 310 in FIG. 3. In another implementation, the first conductor and the second conductor have the construct of the second composite conductor 330 in FIG. 3. In another implementation, the first conductor has the construct of the second composite conductor 330 in FIG. 3 and the second conductor have the construct of the first composite conductor 310 in FIG. 3. Alternatively, the order of the layers in each of the conductors in any of these implementations may be reversed.

Various Layers with "Opposing Susceptibility"

Figure 4:
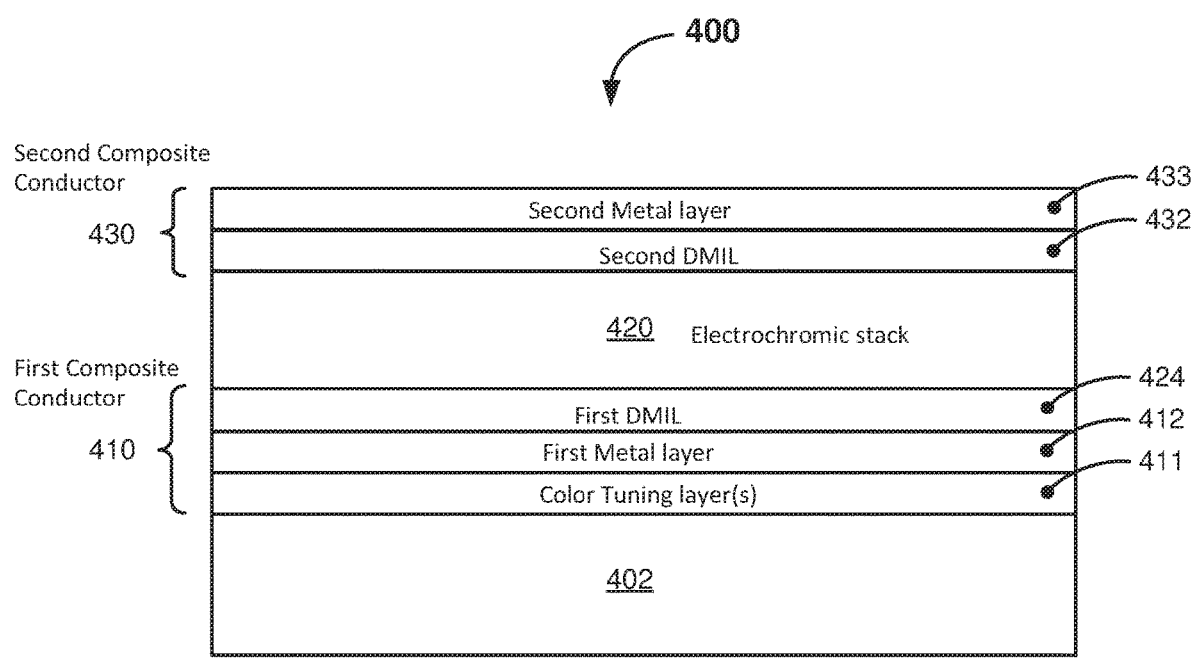
FIG. 4 depicts a schematic illustration of a cross section of an electrochromic device with a composite conductor having one or more color tuning layers, according to aspects.

In certain embodiments, the materials used in one or more of the diffusion barrier layer(s), blocking/barrier layer(s), color tuning layer(s) and DMIL layer(s) are selected based on "opposing susceptibility" to adjacent layers to increase the transparency of the electrochromic device and/or tune the wavelength of light transmitted through the electrochromic device to a predetermined spectrum. For example, the materials may be selected to transmit a range of wavelengths associated with blue light through the electrochromic device. In some cases, the materials are selected to shift the range of wavelengths away from green or red. An example of a construction of an electrochromic device with a composite conductor including one or more color tuning layers is shown in FIG. 4. In this example, the electrochromic device 400 does not have a separate diffusion barrier disposed on the substrate 402.

FIG. 4 depicts a schematic illustration of an electrochromic device 400 including a substrate 402, a first composite conductor 410 disposed on the substrate 402, an electrochromic stack 420 disposed on the first composite conductor 410, and a second composite conductor 430 disposed on the electrochromic stack 420. The first composite conductor 410 includes one or more color tuning layers 411, a metal layer (e.g., silver) 412 disposed on the one or more color tuning layers 411, and a first DMIL (e.g., $TiO_2$) 424 disposed on the metal layer 412. The second composite conductor 420 includes a second DMIL 432 disposed on the electrochromic stack 420, and a second metal layer 433. In another embodiment, the order of the layers in either or both of the composite conductors 410 and 430 may be reversed.

In certain implementations, the second DMIL 432 is the same or substantially similar to the first DMIL 424 and/or the second metal layer 433 is the same or substantially similar to the first metal layer 412. In other embodiments, the first composite conductor 410 and/or the second composite conductor 430 have additional layers. For example, one or more color tuning layers may be added to the second composite conductor 430. As another example, a diffusion barrier may be added between the one or more color tuning layers 411 and the substrate 402.

The one or more color tuning layers 411 is made of any of the materials described above for color tuning layers. The first metal layer 412 is made of any of the metal materials as described above for metal layers, including alloys, intermetallics, mixtures and/or layers of metals, and having the electrical, physical and optical properties of the metals as described above. In one embodiment, the first metal layer 412 has a thickness in a range of between about 1 nm and about 5 nm. In one embodiment, the first metal layer 412 has a thickness in a range of between about 5 nm and about 30 nm. In one embodiment, the first metal layer 412 has a thickness in a range of between about 10 nm and about 25 nm. In one embodiment, the first metal layer 412 has a thickness in a range of between about 15 nm and about 25 nm. In one embodiment, the first metal layer 412 has a thickness of less than about 20 nm. In one embodiment, the first metal layer 412 is made of silver.

The first DMIL 424 may be made of any of the materials described above for DMILs and has the associated electrical, physical and optical properties of the DMIL materials as described above. In one embodiment, the first DMIL 424 is of $TiO_2$. In one case, first Milt 424 of $TiO_2$ is between 10 nm and 100 nm thick. In another case, the first 424 of $TiO_2$ is between 25 nm and 75 nm thick. In another case, the first DMIL 424 of $TiO_2$ is between 40 nm and 60 nm thick. In yet another case, the first DMIL 424 of $TiO_2$ is about 50 nm thick.

The second metal layer 433 is made of any of the metal materials as described above for metal layers, including alloys, intermetallics, mixtures and/or layers of metals, and having the electrical, physical and optical properties of the metals as described above. In one embodiment, the second metal layer 433 is silver, for example, having a thickness between about 1 nm and 5 nm thick. In one embodiment; the second metal layer 433 has a thickness between about 1 nm and about 5 nm thick. In one embodiment, the second metal layer 433 has a thickness between about 5 nm and about 30 nm. In one embodiment, the second metal layer 433 has a thickness between about 10 nm and about 25 nm. In one embodiment, the second metal layer 433 has a thickness between about 15 nm and about 25 nm. In one embodiment, the second metal layer 433 has a thickness of less than about 20 nm.

The second DMIL 432 may be made of any of the materials described above for DMILs and has the associated electrical, physical and optical properties of the DMIL materials as described above. In one embodiment, the second DMIL 432 is of $TiO_2$. In one case, second DMIL 432 of $TiO_2$ is between 10 nm and 100 nm thick. In another case, the second DMIL 432 of $TiO_2$ is between 25 nm and 75 nm thick. In another case, the second DMIL 432 of $TiO_2$ is between 40 nm and 60 nm thick. In yet another case, the second DMIL 432 of $TiO_2$ is about 50 nm thick.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductors have the construct of the first composite conductor 410 in FIG. 4. In another implementation, the first conductor and the second conductors have the construct of the second composite conductor 430 in FIG. 4. In another implementation, the first conductor has the construct of the second composite conductor 430 in FIG. 4 and the second conductor have the construct of the first composite conductor 410 in FIG. 4. Alternatively, the order of the layers in each of the conductors in any of these implementations may be reversed.

In certain embodiments, one or more of the layers of materials describe herein can serve multiple functions. For example, in one embodiment, a layer disposed on the substrate function both as a diffusion barrier and an opposite susceptibility layer. Also, a layer can function both as a DMIL layer and an opposite susceptibility layer.

Electrochromic Devices Having Conductor(s) with TCO/Metal/TCO "IMI" Stack

Figure 10:
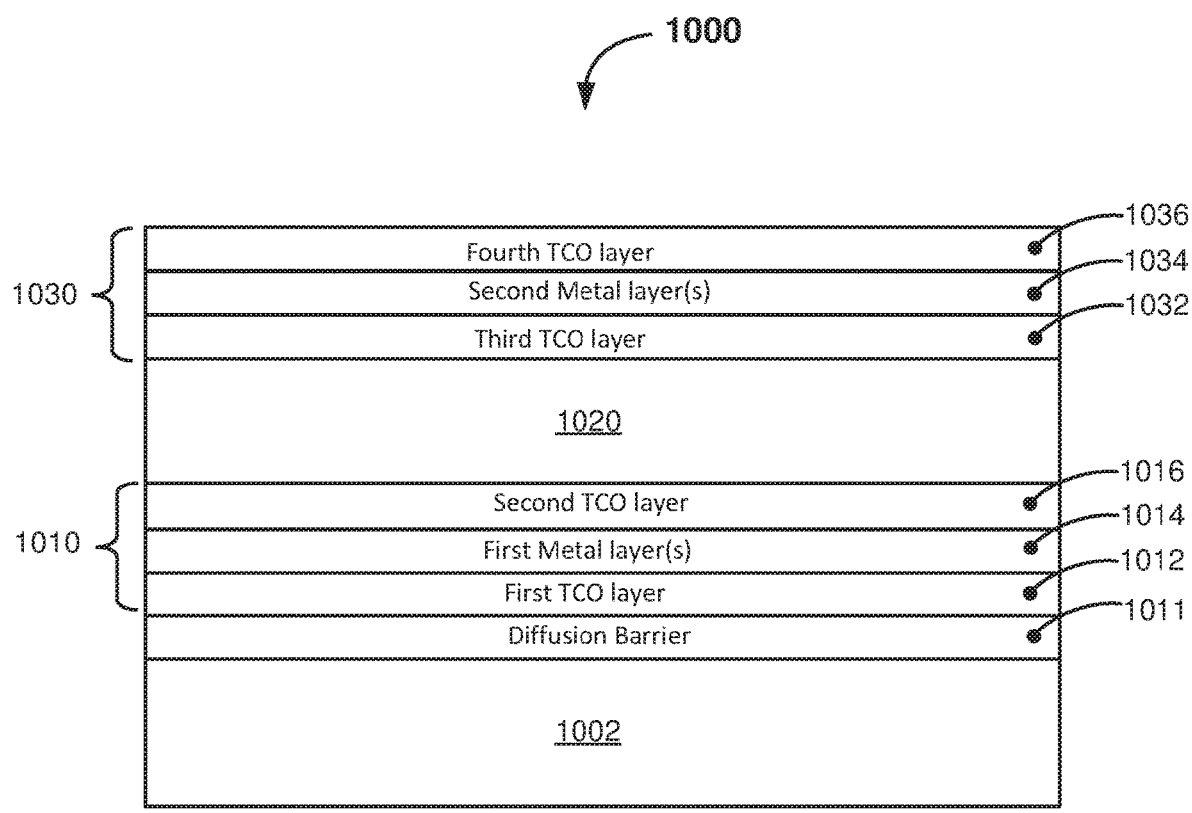
FIG. 10 depicts a schematic illustration of an electrochromic device with each of two conductors having an IMI stack, according to embodiments.

As discussed herein, certain implementations pertain to an electrochromic device including at least one conductor having a TCO/Metal/TCO stack also referred to as an "IMI stack." An BE stack generally includes one or more metal layers sandwiched between two TCO layers. For example, FIG. 10 depicts a schematic illustration of an electrochromic device 1000 having a first conductor 1010 and a second conductor 1030, each having an IMI stack. As shown, the electrochromic device 1000 includes a substrate 1002, a diffusion barrier 1011 disposed on the substrate 1002, the first composite conductor 1010 disposed on the diffusion barrier 1011, an electrochromic stack 1020 disposed on the first composite conductor 1010, and the second composite conductor 1030 disposed on the electrochromic stack 1020.

The first composite conductor 1010 includes a first TCO layer 1012 disposed on the diffusion barrier 1011, a first metal layer(s) 1010 disposed on the first TCO layer 1012, and a second TCO layer 1016 disposed on the first metal layer(s) 1014. The second composite conductor 1030 includes a third TCO layer 1032 disposed on the electrochromic stack 1020, a second metal layer(s) 1034 disposed on the third TCO layer 1032, and a fourth TCO layer 1036 disposed on the second metal layer(s) 1034. In another aspect, the first composite conductor 1010 and/or the second composite conductor 1030 further include one or more color tuning layers.

Figure 5A:
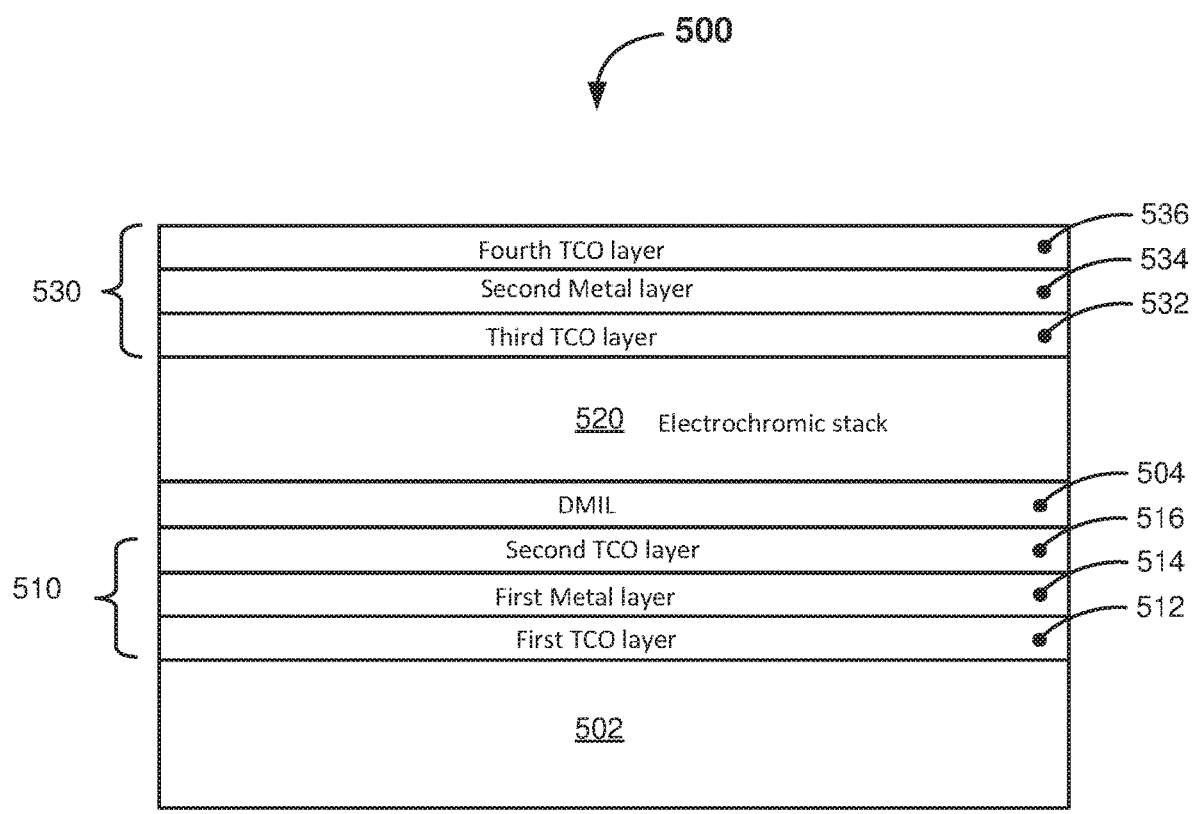
FIG. 5A depicts a schematic illustration of a cross section of an electrochromic device with a composite conductor having a DMIL between a TCO/Metal/TCO stack and the electrochromic stack, according to aspects.
Figure 5B:
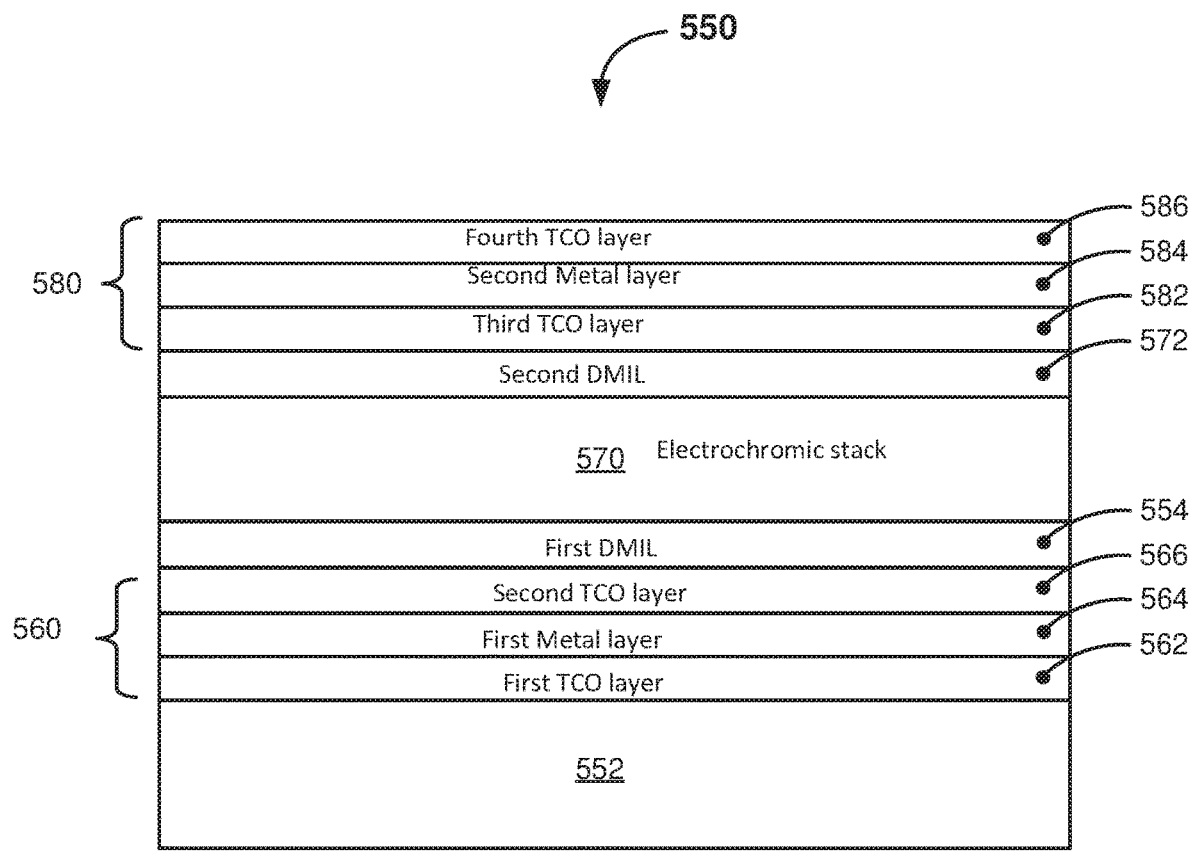
FIG. 5B depicts a schematic illustration of a cross section of an electrochromic device with a composite conductor having a DMIL between a TCO/Metal/TCO stack and the electrochromic stack, according to aspects.

In another implementation, the electrochromic device 1000 shown in FIG. 10 also includes (i) a DMIL between the electrochromic stack and the second TCO layer such as in the example shown in FIG. 5A and/or (ii) a DMIL, between the electrochromic stack and the third TCO layer such as in the example shown in FIG. 5B.

Each of the first TCO layer 1012, second TCO layer 1016, the third TCO layer 1032, and the fourth TCO layer 1036 is made of any one of the materials described herein for TCOs and has the associated electrical, physical and optical properties of the TCO material. Some examples of suitable TCO materials include FTO, ITO, AZO, etc. These TCO layers may be made of the same or different TCO materials. In certain aspects, each of the TCO layers 1012, 1016, 1032, and 1036 has a thickness of less than 200 nm. In one aspect, each of the TCO layers 1012, 1016, 1032, and 1036 has a thickness between 20-50 nm.

The first metal layer 1014 is made of any of the metal materials as described herein for metal layers, including alloys, intermetallics, mixtures and/or layers of metals, and having the electrical, physical and optical properties of the metals. In one aspect, the first metal layer 1014 is silver. In one aspect, the first metal layer 1014 has a thickness of less than 20 nm. The second metal layer 1034 is made of any of the metal materials as described herein for metal layers, including alloys, intermetallics, mixtures and/or layers of metals, and having the electrical, physical and optical properties of the metals. In one aspect, the second metal layer 1034 is silver. In some aspects, the second metal layer 1034 has a thickness of less than 20 nm. Some examples of suitable metals for the first and second metal layers 1014, 1034 include Ag, Cu, Al, W, and Au.

The diffusion barrier 1011 is made of any of the materials described herein for a diffusion barrier. In some aspects, the diffusion barrier 1011 has a thickness of less than 100 nm.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 1010 in FIG. 10. In another implementation, the first conductor and the second conductor have the construct of the second conductor 1030 in FIG. 10. In another implementation, the first conductor has the construct of the second conductor 1030 in FIG. 10 and the second conductor has the construct of the first conductor 1010 in FIG. 10. Alternatively, the order of the layers in each of the conductors in any of these implementations may be reversed.

Figure 12:
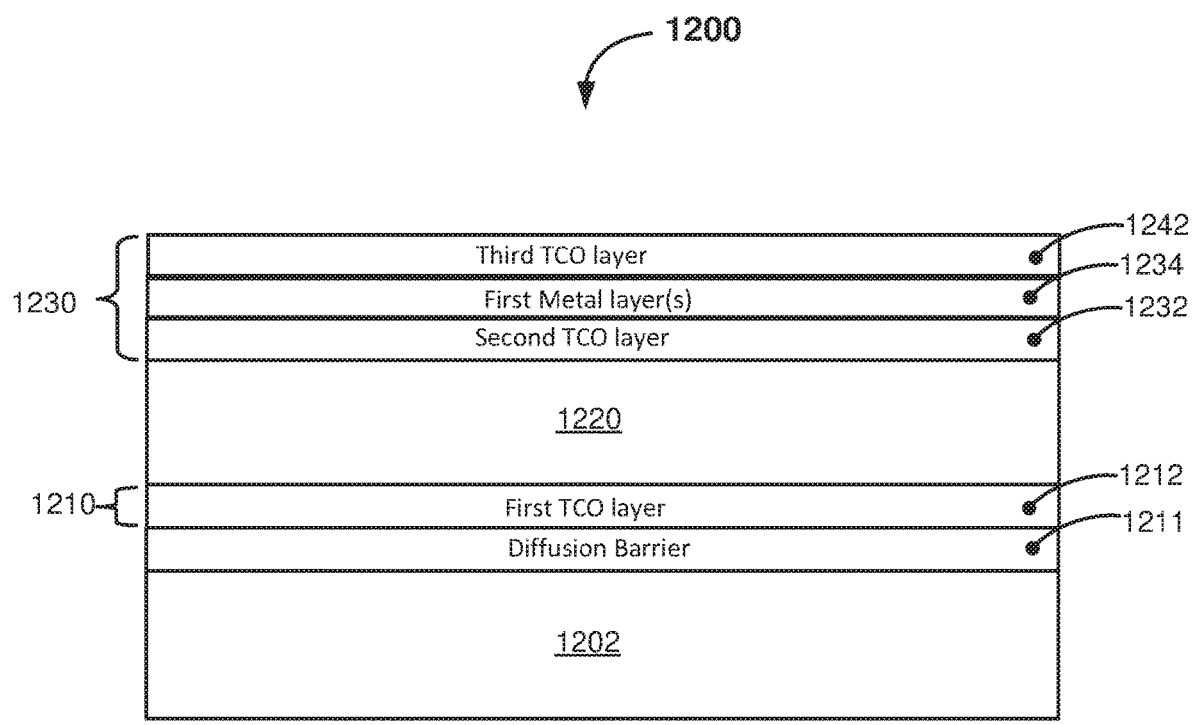
FIG. 12 depicts a schematic illustration of an electrochromic device having a first conductor made of a single transparent conductive layer and a second conductor having an IMI stack, according to embodiments.

Another implementation is an electrochromic device having a first conductor that is a simple construct made of a single transparent conductive layer (e.g., polished TEC) and a second conductor made of a more complex multi-layer construct including an IMI stack. An example of the implementation is shown in FIG. 12. The first and second conductor have low sheet resistance where the sheet resistance of the first conductor matches or approximately matches the sheet resistance of the second conductor, e.g., the sheet resistance of the first and second conductors may be about or lower than 7 Ohms/sq. The transparent conductive layer of the first conductor is a metal oxide material such as FTO, ITO, AZO, or the like. Having a second conductor with an IMI stack may provide the advantage of offering a more neutral color and higher transmissivity. For example, implementing an IMI stack may reduce the b* (i.e. blue-yellow component in CIE color coordinate system) closer to zero. According to one aspect of this implementation, the first conductor may be a single transparent conductive layer made by pyrolytic processing and the second multi-layer conductor with matching or nearly matching sheet resistance after the electrochromic stack is deposited using another more complex type of processing since pyrolytic processing cannot be performed once the electrochromic device materials are deposited. This example may provide the technical advantage of providing savings in not having to form two multi-layer conductor structures.

FIG. 12 depicts a schematic illustration of an electrochromic device 1200 having a first conductor 1210 and a second conductor 1230. As shown, the electrochromic device 1200 includes a substrate 1202, a diffusion barrier 1211 disposed on the substrate 1202, the first conductor 1210 with a first transparent conductive oxide layer 1212 disposed on the diffusion barrier 1211, an electrochromic stack 1220 disposed on the first conductor 1210, and the second conductor 1230 disposed on the electrochromic stack 1220. The second composite conductor 1030 includes an IMI stack with a metal layer or layers 1234 sandwiched between a second transparent conductive oxide (TCO) layer 1232 and a third TCO layer 1242. As shown, the second transparent conductive oxide (TCO) layer 1232 is disposed on the electrochromic stack 1220, the metal layer or layers 1234 is disposed on the second TCO layer 1232, and the third TCO layer 1236 is disposed on the metal layer or layers 1234. In another implementation, the second composite conductor 1230 further includes one or more color tuning layers adjacent the metal layer or layers 1234.

Each of the TCO layers 1212, 1232, and 1242 is made of any one of the materials described herein for TCOs and has the associated electrical, physical and optical properties of the TCO material. Some examples of suitable TCO materials include FTC, ITO, AZO, etc. These TCO layers may be made of the same or different TCO materials. In certain aspects, each of the TCO layers 1212, 1232, and 1242 has a thickness of less than 200 nm. In one aspect, each of the TCO layers 1212, 1232, and 1242 has a thickness between 20-50 nm.

The metal layer(s) 1234 is made of any of the metal materials as described herein for metal layers, including alloys, intermetallics, mixtures and/or layers of metals, and having the electrical, physical and optical properties of the metals. In one aspect, the metal layer(s) 1234 is silver. In one aspect, the metal layer(s) 1234 has a thickness of less than 20 nm. Some examples of suitable metals for the metal layer (s) 1234 include Ag, Cu, Al, W, and Au.

The sheet resistance of the transparent conductive layer 1212 of the first conductor 1210 matches or approximately matches the sheet resistance of the second conductor 1230. In one aspect, the sheet resistance of the first conductor 1210 and second conductor 1230 varies by less than 20%. In another aspect, the sheet resistance of the first conductor 1210 and second conductor 1230 varies by less than 10%. In another aspect, the sheet resistance of the first conductor 1210 and second conductor 1230 varies by less than 5%.

The diffusion barrier 1211 is made of any of the materials described herein for a diffusion barrier. In some aspects, the diffusion barrier 1211 has a thickness of less than 100 nm.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 1210 in FIG. 12. In another implementation, the first conductor and the second conductor have the construct of the second conductor 1230 in FIG. 12. In another implementation, the first conductor has the construct of the second conductor 1230 in FIG. 12 and the second conductor has the construct of the first conductor 1210 in FIG. 12. Alternatively, the order of the layers in each of the conductors in any of these implementations may be reversed.

DMIL Between Conductor with TCO/Meta/TCO IMI Stack and Electrochromic Stack

In certain embodiments, an electrochromic device has a lower composite conductor including a TCO (e.g., ITO)/Metal/TCO (e.g., ITO) stack also referred to as an "IMI stack" and a DMIL (e.g., TiO$_2$) between the IMI stack and the electrochromic stack. An example of such an electrochromic device is shown in FIG. 5. In these embodiments, the DMIL layer may improve durability of the electrochromic device. There may be a DMIL between each IMI, of two, and an electrochromic stack that is sandwiched therebetween, that is, IMI/DMIL/EC stack/DMIL/IMI, optionally with color tuning and/or diffusion barrier layers between that structure and the substrate.

FIG. 5A depicts a schematic illustration of an electrochromic device 500 including a substrate 502, a first composite conductor 510 disposed on the substrate 502, a 504 disposed on the first composite conductor 510, an electrochromic stack 520 disposed on the DMIL 504, and a second composite conductor 530 disposed on the electrochromic stack 520. The first composite conductor 510 includes a first TCO layer 512 disposed on the substrate 502, a first metal layer (e.g., silver) 514 disposed on the first TCO layer 512, and a second TCO layer 516 disposed on the first metal layer 514. The second composite conductor 530 includes a third TCO layer 532 disposed on the electrochromic stack 520, a second metal layer (e.g., silver) 534 disposed on the third TCO layer 532, and a fourth TCO layer 536 disposed on the second metal layer 534. Another embodiment also includes a second DMIL between the electrochromic stack and the third TCO layer as shown in FIG. 5B.

In one implementation, the first and second composite conductors 510 and 530 have the same or substantially similar material layers in a mirrored arrangement. That is, the fourth TCO 536 is the same or substantially similar to the first TCO layer 512, the third TCO layer 532 is the same or substantially similar to the second TCO layer 516, and the first metal layer 514 is the same or substantially similar to the second metal layer 534. In other embodiments, the first and second composite conductors 510 and 530 may have different orders of the same layers. In yet other embodiments, the first and second composite conductors 510 and 530 may have one more different material layers. In certain aspects, the first composite conductor 510 and/or the second composite conductor 530 have one or more color tuning layers.

The first TCO layer 512 is made of any of the materials described above for TCOs and has the associated electrical, physical and optical properties of the TCO materials as described above. In one embodiment, the first TCO layer 512 is a FTO layer or other TCO material layer between about 200 nm and 500 nm thick. In another embodiment, the first TCO layer 512 has a thickness in a range between about 20 nm-50 nm. In one case, the first TCO layer 512 has a thickness of less than about 200 nm. The first metal layer (e.g., silver) 514 is made of any of the metal materials as described above for metal layers, including alloys, intermetallics, mixtures and/or layers of metals, and having the electrical, physical and optical properties of the metals as described above. In one embodiment, the first metal layer 514 is silver. In one embodiment, the first metal layer 514 has a thickness in the range of about 1 nm and about 5 nm. In one embodiment, the first metal layer 514 has a thickness in the range of about 5 nm to about 30 nm. In one embodiment, the first metal layer 514 has a thickness in the range of about 10 nm and about 25 nm. In one embodiment, the first metal layer 514 has a thickness in the range of about 15 nm and about 25 nm. In one embodiment, the first metal layer 512 has a thickness of less than about 20 nm.

The second TCO layer 516 is made of any of the materials described above for TCOs and has the associated electrical, physical and optical properties of the TCO materials as described above. In one embodiment, the second TCO layer 516 is a FTC) or other material layer between about 200 nm and 500 nm thick. In another embodiment, the second TCO layer 516 has a thickness in a range between about 20 nm-50 nm. In one case, the second TCO layer 516 has a thickness of less than about 200 nm. The third TCO layer 532 is made of any of the materials described above for TCOs and has the associated electrical, physical and optical properties of the TCO materials as described above. In one embodiment, the third TCO layer 532 is a FTO or other TCO material layer between about 200 nm and 500 nm thick. In another embodiment, the third TOO layer 532 has a thickness in a range between about 20 nm-50 nm. In one case, the third TCO layer 532 has a thickness of less than about 200 nm. The second metal layer 534 is made of any of the metal materials as described above for metal layers, including alloys, intermetallics, mixtures and/or layers of metals, and having the electrical, physical and optical properties of the metals as described above. In one embodiment, the second metal layer 534 is silver. In one embodiment, the second metal layer 534 has a thickness in the range of between about 1 nm and about 5 nm thick. In one embodiment, the second metal layer 534 has a thickness in the range of between about 5 nm to about 30 nm. In one embodiment, the second metal layer 534 has a thickness in the range of between about 10 nm and about 25 nm. In one embodiment, the second metal layer 534 has a thickness between about 15 nm and about 25 nm In one embodiment, the second metal layer 534 has a thickness of less than about 20 mu.

The fourth TCO layer 536 is made of any of the materials described above for TCOs and has the associated electrical, physical and optical properties of the TCO materials as described above. In one embodiment, the fourth TCO layer 536 is a FTO or other TCO material layer between about 200 nm and 500 nm thick. In another embodiment, the fourth TCO layer 536 has a thickness in a range between about 20 nm-50 nm In one case, the fourth TCO layer 536 has a thickness of less than about 200 nm. The first DMIL 504 may be made of any of the materials described above for DMILs and has the associated electrical, physical and optical properties of the DMIL, materials as described above. In one embodiment, the first DMIL 504 is of $TiO_2$. In one case, the first DMIL 504 of $TiO_2$ is between 10 nm and 100 nm thick. In another case, the first DMIL 504 of $TiO_2$ is between 25 nm and 75 nm thick. In another case, the first DMIL 504 of $TiO_2$ is between 40 nm and 60 nm thick. In yet another case, the first DMIL 504 of $TiO_2$ is about 50 nm thick.

FIG. 5B depicts a schematic illustration of an electrochromic device 500 including a substrate 552, a first composite conductor 560 disposed on the substrate 552, a first DMIL 554 disposed on the first composite conductor 550, an electrochromic stack 570 disposed on the first DMIL 554, a second DMIL 572 disposed on the electrochromic stack 520, and a second composite conductor 580 disposed on the second DMIL 572. The first composite conductor 560 includes a first TCO layer 562 disposed on the substrate 552, a first metal layer (e.g., silver) 564 disposed on the first TCO layer 562, and a second TCO layer 566 disposed on the first metal layer 564. The second composite conductor 580 includes a third TCO layer 582 disposed on the second DMIL 572, a second metal layer (e.g., silver) 584 disposed on the third TCO layer 582, and a fourth TCO layer 586 disposed on the second metal layer 584.

In one implementation, the first and second composite conductors 560 and 580 have the same or substantially similar material layers in a mirrored arrangement. That is, the fourth TCO 586 is the same or substantially similar to the first TCO layer 562, the third TCO layer 532 is the same or substantially similar to the second TCO layer 566, and the first metal layer 564 is the same or substantially similar to the second metal layer 584. In other embodiments, the first and second composite conductors 560 and 580 may have different orders of the same layers. In yet other embodiments, the first and second composite conductors 560 and 580 may have one more different material layers. In certain aspects, the first composite conductor 560 and/or the second composite conductor 580 have one or more color tuning layers.

The first TCO layer 562 is made of any of the materials described above for TCOs and has the associated electrical, physical and optical properties of the TCO materials as described above. In one embodiment, the first TCO layer 562 is a FTO or other TCO material layer between about 200 nm and 500 nm thick. In another embodiment, the first TCO layer 562 has a thickness in a range between about 20 nm 50 nm. In one case, the first TCO layer 562 has a thickness of less than about 200 nm. The first metal layer (e.g., silver) 564 is made of any of the metal materials as described above for metal layers, including alloys, intermetallics, mixtures and/or layers of metals, and having the electrical, physical and optical properties of the metals as described above. In one embodiment, the first metal layer 564 is silver. In one embodiment, the first metal layer 564 has a thickness in the range of about 1 nm and about 5 nm. In one embodiment, the first metal layer 564 has a thickness in the range of about 5 nm to about 30 nm. In one embodiment, the first metal layer 564 has a thickness in the range of about 10 nm and about 25 nm. In one embodiment, the first metal layer 564 has a thickness in the range of about 15 nm and about 25 mu. In one embodiment, the first metal layer 564 has a thickness of less than about 20 mu.

The second TCO layer 570 is made of any of the materials described above for TCOs and has the associated electrical, physical and optical properties of the TCO materials as described above. In one embodiment, the second TCO layer 570 is a FTO layer or other material layer between about 200 nm and 500 nm thick. In another embodiment, the second TCO layer 570 has a thickness in a range between about 20 nm-50 nm. In one case, the second TCO layer 570 has a thickness of less than about 200 nm. The third TCO layer 582 is made of any of the materials described above for TCOs and has the associated electrical, physical and optical properties of the TCO materials as described above. In one embodiment, the third TCO layer 582 is a FTO or other TCO material layer between about 200 nm and 500 nm thick. In another embodiment, the third TCO layer 582 has a thickness in a range between about 20 nm-50 nm. In one case, the third TCO layer 582 has a thickness of less than about 200 nm. The second metal layer 584 is made of any of the metal materials as described above for metal layers, including alloys, intermetallics, mixtures and/or layers of metals, and having the electrical, physical and optical properties of the metals as described above. In one embodiment, the second metal layer 584 is silver. In one embodiment, the second metal layer 584 has a thickness in the range of between about 1 nm and about 5 nm thick. In one embodiment, the second metal layer 584 has a thickness in the range of between about 5 nm to about 30 nm. In one embodiment, the second metal layer 584 has a thickness in the range of between about 10 nm and about 25 nm. In one embodiment, the second metal layer 584 has a thickness between about 15 nm and about 25 nm. In one embodiment, the second metal layer 584 has a thickness of less than about 20 nm.

The fourth TCO layer 586 is made of any of the materials described above for TCOs and has the associated electrical, physical and optical properties of the TCO materials as described above. In one embodiment, the fourth TCO layer 586 is a FTO or other TCO material layer between about 200 nm and 500 nm thick. In another embodiment, the fourth TCO layer 586 has a thickness in a range between about 20 nm-50 nm. In one case, the fourth TCO layer 586 has a thickness of less than about 200 mm. The first DMIL 584 may be made of any of the materials described above for DMILs and has the associated electrical, physical and optical properties of the DMIL materials as described above. In one embodiment, the first DMIL 584 is of $TiO_2$. In one case, the first DMIL 584 of $TiO_2$ is between 10 nm and 100 nm thick. In another case, the first DMIL 584 of $TiO_2$ is between 25 nm and 75 nm thick. In another case, the first DMIL 584 of $TiO_2$ is between 40 nm and 60 nm thick. In yet another case, the first DMIL 584 of $TiO_2$ is about 50 nm thick.

The second DMIL 572 may be made of any of the materials described above for DMILs and has the associated electrical, physical and optical properties of the DMIL materials as described above. In one embodiment, the second DMIL 572 is of $TiO_2$. In one case, the second DMIL 572 of $TiO_2$ is between 10 nm and 100 nm thick. In another case, the second DMIL 572 of $TiO_2$ is between 25 nm and 75 nm thick. In another case, the second DMIL 572 of $TiO_2$ is between 40 nm and 60 nm thick. In yet another case, the second DMIL 572 of $TiO_2$ is about 50 nm thick. In one embodiment, the second DMIL 572 has the same characteristics of first DMIL 554.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 510 in FIG. 5A. In another implementation, the first conductor and the second conductor have the construct of the first conductor 560 in FIG. 5B. In another implementation, the first conductor and the second conductors have the construct of the second conductor 530 in FIG. 5A. In another implementation, the first conductor and the second conductor have the construct of the second conductor 580 in FIG. 5B. In another implementation, the first conductor has the construct of the second composite conductor 530 in FIG. 5A and the second conductor have the construct of the first composite conductor 510 in FIG. 5A. In another implementation, the first conductor has the construct of the second composite conductor 580 in FIG. 5B and the second conductor have the construct of the first composite conductor 560 in FIG. 5B. Alternatively, the order of the layers in each of the conductors in any of these implementations may be reversed.

DMIL Between Conductor and the Electrochromic Stack

In certain embodiments, an electrochromic device has one or more of its conductors separated from the electrochromic stack by a DMIL. The DMIL may improve the durability of the electrochromic device. Some examples of materials that can be used for a DMIL include $TiO_x$ and $TiO_2$. For example, the DMIL may be located between each IMI stack, of two IMI stacks, and an electrochromic (EC) stack that is sandwiched therebetween, that is, IMI/DMIL/EC stack/DMIL/IMI, optionally with one or more color tuning layers and/or a diffusion barrier between that structure and the substrate. An example of such an electrochromic device is shown in FIG. 5B. In another example, the DMIL may be located between one of the IMI stacks and an electrochromic stack sandwiched between the IMI stacks, that is, IMI/DMIL/EC stack/IMI, optionally with one or more color tuning layers and/or a diffusion barrier between that structure and the substrate. An example of such an electrochromic device is shown in FIG. 5A. In another example, the DMIL may be located between a metal layer or layers and an electrochromic stack sandwiched between the metal layer(s) and a TCO layer, optionally with one or more color tuning layers and/or a diffusion barrier between that structure and the substrate. An example of such an electrochromic device is shown in FIG. 11.

Figure 11:
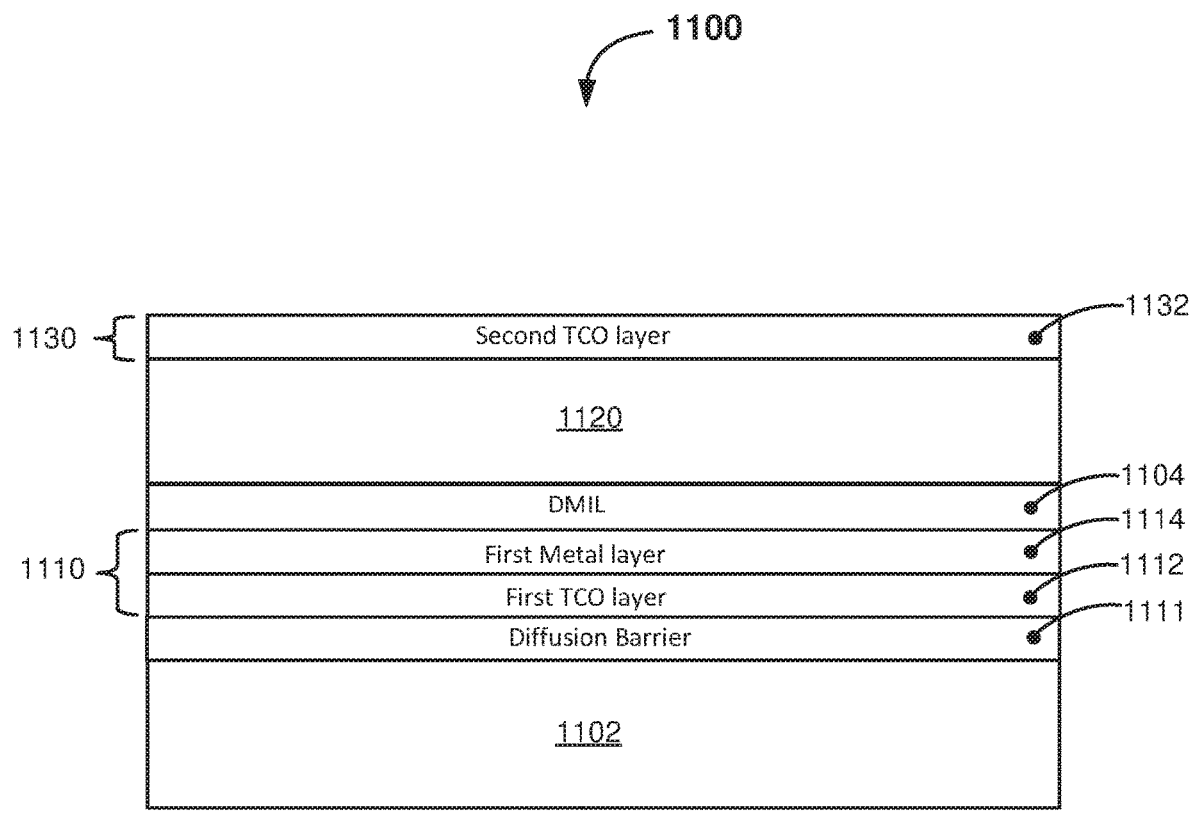
FIG. 11 depicts a schematic illustration of an electrochromic device with a DMIL between a conductor and an electrochromic stack, according to embodiments.

FIG. 11 depicts a schematic illustration of an electrochromic device 1100 having a substrate 1102, a diffusion barrier 1111 disposed on the substrate 1102, and a multi-layer conductor 1110 disposed on the diffusion barrier 1111. The multi-layer conductor 1110 includes a first TCO layer disposed on the diffusion barrier 1111 and a first metal layer disposed on the first TCO layer. The electrochromic device 1100 also includes an electrochromic stack 1120 disposed on the DMIL 1104 and a single layer conductor with a second TCO layer 1132 disposed on the electrochromic stack 1120. Optionally, the electrochromic device may further include one or more color tuning layers adjacent the first metal layer.

In another implementation, the electrochromic device 1100 further includes a second multi-layer conductor including the second TCO layer 1132 and a second metal layer and also a second DMIL sandwiched between the electrochromic stack 1120 and the second metal layer. Optionally, the electrochromic device 1100 may further include one or more color tuning layers adjacent the first metal layer and/or the second metal layer.

Each TCO layer of the electrochromic devices described in this section can be made of any TCO material described herein and has associated electrical, physical and optical properties. Some examples of suitable TCO materials include FTO, ITO, AZO, etc. In one aspect, each TCO layer of an electrochromic device described in this section has a thickness of less than 200 nm. In another aspect, each TCO layer of an electrochromic device described in this section has a thickness between 20-50 nm. Further, each metal layer of the electrochromic devices described in this section can be made of any metal material described herein for metal layers, including alloys, intermetallics, mixtures and/or layers of metals, and having the electrical, physical and optical properties of the metals. Some examples of suitable metals include Ag, Cu, Al, W, and Au. In one aspect, each metal layer of an electrochromic device described in this section has a thickness of less than 20 nm. In one aspect, the diffusion barrier has a thickness of less than 100 nm.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 1110 in FIG. 11. In another implementation, the first conductor and the second conductor have the construct of the second conductor 1130 in FIG. 11. In another implementation, the first conductor has the construct of the second conductor 1130 in FIG. 11 and the second conductor has the construct of the first conductor 1110 in FIG. 11. Alternatively, the order of the layers in each of the conductors in any of these implementations may be reversed.

Barrier/Blocking Layer(s)

In certain embodiments, an electrochromic device includes one or more barrier or blocking layers disposed between the lower conductor and the electrochromic stack to help block diffusion or migration of metal (e.g., silver) into the electrochromic stack and migration of lithium into the lower conductor. A barrier layer may contain a nitride, a carbide, an oxynitride, or an oxycarbide of various metals or metalloids, e.g., a nitride barrier layer may include silicon nitride, aluminum nitride, zirconium nitride, titanium nitride, zinc nitride, magnesium nitride, gallium nitride, tantalum nitride, niobium nitride, bismuth nitride, yttrium nitride, iridium nitride, indium nitride, tin nitride, nickel nitride, hafnium nitride. Thus barrier layers of various implementations may include carbides, oxynitrides and oxycarbide analogs of the aforementioned metals and metalloids. For example, a barrier/blocking layer of certain embodiments may include tantalum nitride, titanium nitride, silicon nitride, silicon oxynitride and the like, which can serve to block migration of silver from the lower conductor into the electrochromic stack. Titanium nitride and tantalum nitride, e.g., are particularly good in barrier layers to prevent metal migration. An example of an electrochromic device with one or more barrier/blocking layers disposed between the lower conductor and the electrochromic stack is shown in FIG. 6.

Figure 6:
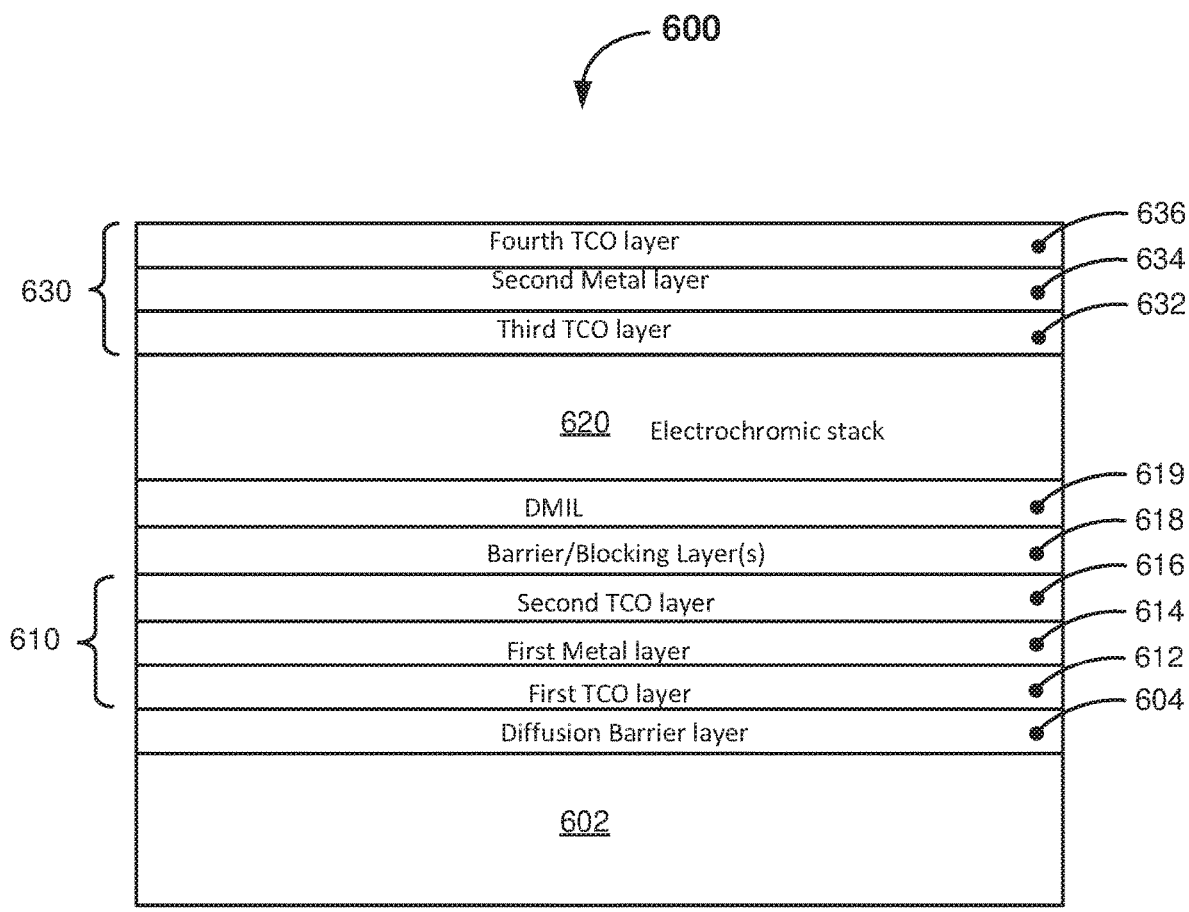
FIG. 6 depicts a schematic illustration of a cross section of an electrochromic device with one or more barrier/blocking layer, according to aspects.

FIG. 6 depicts a schematic illustration of an electrochromic device 600, according to embodiments. The electrochromic device 600 includes a substrate 602, one or more diffusion barrier layers 604 disposed on the substrate 602, a first composite conductor 610 disposed on the diffusion barrier layer(s) 604, one or more barrier/blocking layers 618 (e.g., material layers of TaN or TiN) disposed on the a first composite conductor 610, a first DMIL 619 (e.g., $TiO_2$) disposed on the one or more barrier/blocking layers 618, an electrochromic stack 620 disposed on the first DMIL 619, and a second composite conductor 630 disposed on the electrochromic stack 620. The first composite conductor 610 includes a first TCO layer 612 (e.g., ITO layer) disposed on the one or more diffusion barrier layers 604, a first metal layer 614 (e.g., silver layer) disposed on the first TCO layer 612, and a second TCO layer 616 disposed on the first metal layer 614. The second composite conductor 630 includes a third TCO layer 632 disposed on electrochromic stack 620, a second metal layer 634 disposed on the third TCO layer 632, and a fourth TCO layer 636 disposed on the second metal layer 634. The one or more barrier/blocking layers 618 are between the first DMIL 619 and the second TCO layer 616 to provide a barrier for diffusion into the electrochromic stack 620. For example, if the metal layer 614 is a silver layer and the one or more barrier/blocking layers 618 comprise TaN or TiN, then the TaN or. TiN barrier/blocking layers 618 can block migration of silver into the electrochromic stack 620.

The first TCO layer 612 is made of any of the materials described above for TCOs and has the associated electrical, physical and optical properties of the TCO materials as described above. In one embodiment, the first TCO layer 612 is a FTC) or other TCO material layer between about 200 nm and 500 nm thick. In another embodiment, the first TCO layer 612 has a thickness in a range between about 20 nm-50 nm. In one case, the first TCO layer 612 has a thickness of less than about 200 nm. The first metal layer 614 is made of any of the metal materials as described above for metal layers, including alloys, intermetallics, mixtures and/or layers of metals, and having the electrical, physical and optical properties of the metals as described above. In one embodiment, the first metal layer 614 is silver. In one embodiment, the first metal layer 614 has a thickness in the range of between about 1 nm and 5 nm thick. In one embodiment, the first metal layer 614 has a thickness in the range of between about is about 5 nm to about 30 nm. In one embodiment, the first metal layer 614 has a thickness in the range of between about 10 nm and about 25 nm. In one embodiment, the first metal layer 614 has a thickness in the range of between about 15 nm and about 25 nm. In one embodiment, the first metal layer 612 has a thickness of less than about 20 nm.

The second TCO layer 616 is made of any of the materials described above for TCOs and has the associated electrical, physical and optical properties of the TCO materials as described above. In one embodiment, the second TCO layer 616 is a FTC) layer or other material layer between about 200 nm and 500 nm thick. In another embodiment, the second TCO layer 616 has a thickness in a range between about 20 nm 50 nm. In one case, the second TCO layer 616 has a thickness of less than about 200 nm. The third TCO layer 632 is made of any of the materials described above for TCOs and has the associated electrical, physical and optical properties of the TCO materials as described above. In one embodiment, the third TCO layer 632 is a FTO or other TCO material layer between about 200 nm and 500 nm thick. In another embodiment, the third TCO layer 632 has a thickness in a range between about 20 nm-50 nm. In one case, the third TCO layer 632 has a thickness of less than about 200 nm. The second metal layer 634 is made of any of the metal materials as described above for metal layers, including alloys, intermetallics, mixtures and/or layers of metals, and having the electrical, physical and optical properties of the metals as described above. In one embodiment, the second metal layer 634 is silver. In one embodiment, the second metal layer 634 has a thickness in the range of between about 1 nm and 5 nm thick. In one embodiment, the second metal layer 634 has a thickness in the range of between about 5 nm and about 30 mm In one embodiment, the second metal layer 634 has a thickness in the range of between about 10 nm and about 25 nm. In one embodiment, the second metal layer 634 has a thickness in the range of between about 15 nm and about 25 nm. In one embodiment, the second metal layer 634 has a thickness of less than about 20 nm.

The fourth TCO layer 636 is made of any of the materials described above for TCOs and has the associated electrical, physical and optical properties of the TCO materials as described above. In one embodiment, the fourth TCO layer 636 is a FTO layer between about 200 nm and 500 nm thick. In another embodiment, the fourth TCO layer 636 has a thickness in a range between about 20 nm-50 nm. In one case, the fourth TCO layer 636 has a thickness of less than about 200 nm. The barrier/blocking layers 618 is made of materials described above for barrier/blocking layers and has all the associated electrical, physical and optical properties of the barrier/blocking layers. The first DMIL 619 may be made of any of the materials described above for DMILs and has the associated electrical, physical and optical properties of the DMIL materials as described above. In one embodiment, the first DMIL 619 is of $TiO_2$. In one case, the first DMIL 619 of $TiO_2$ is between 10 nm and 100 nm thick. In another case, the first DMIL 619 of $TiO_2$ is about 50 nm thick. In one case, the first DMIL 619 of $TiO_2$ is between 10 nm and 100 nm thick. In another case, the first DMIL 619 of $TiO_2$ is between 25 nm and 75 nm thick. In another case, the first DMIL 619 of $TiO_2$ is between 40 nm and 60 nm thick. In yet another case, the first DMIL 619 of $TiO_2$ is about 50 nm thick.

In one implementation, the first and second composite conductors 610 and 630 have the same or substantially similar material layers with the illustrated mirrored layout. That is, the first TCO layer 612 is the same or substantially similar to the fourth TCO layer 636, the first metal layer 614 is the same or substantially similar to the second metal layer 634, and the second TCO layer is the same or substantially similar to the third TCO layer 632. In other embodiments, the first and second composite conductors may have different orders of the same layers. In yet other embodiments, the first and second composite conductors may have one more different material layers. In certain implementations, the electrochromic device 600 omits the diffusion barrier 604. In certain aspects, the first and/or second composite conductor 610, 630 of the electrochromic device 600 shown in FIG. 6 further includes one or more color tuning layers adjacent the metal layers.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first composite conductor 610 in FIG. 6. In another implementation, the first conductor and the second conductor have the construct of the second composite conductor 630 in FIG. 6. In another implementation, the first conductor has the construct of the second composite conductor 630 in FIG. 6 and the second conductor have the construct of the first composite conductor 610 in FIG. 6. Alternatively, the order of the layers in each of the conductors in any of these implementations may be reversed.

Figure 13:
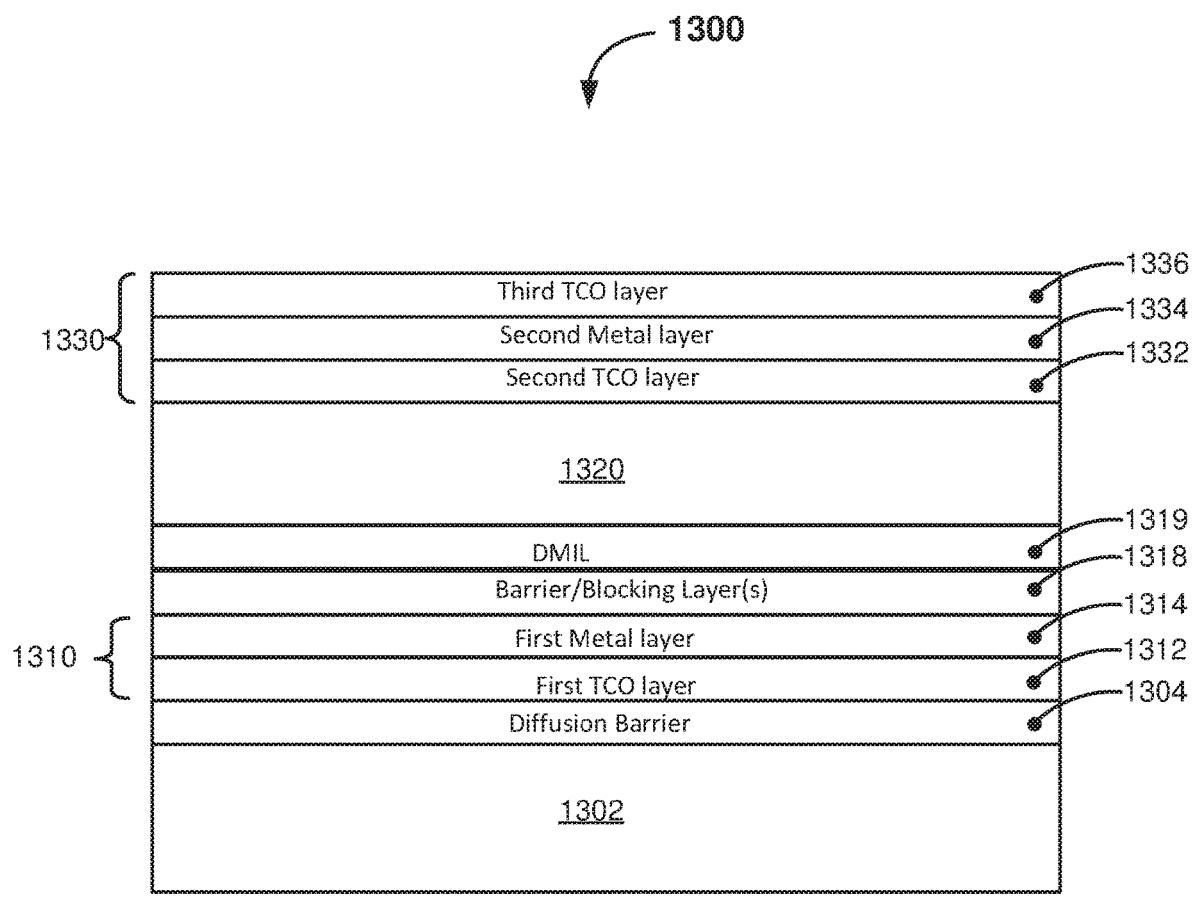
FIG. 13 depicts a schematic illustration of an electrochromic device having one or more barrier/blocking layers, according to embodiments.
Figure 14:
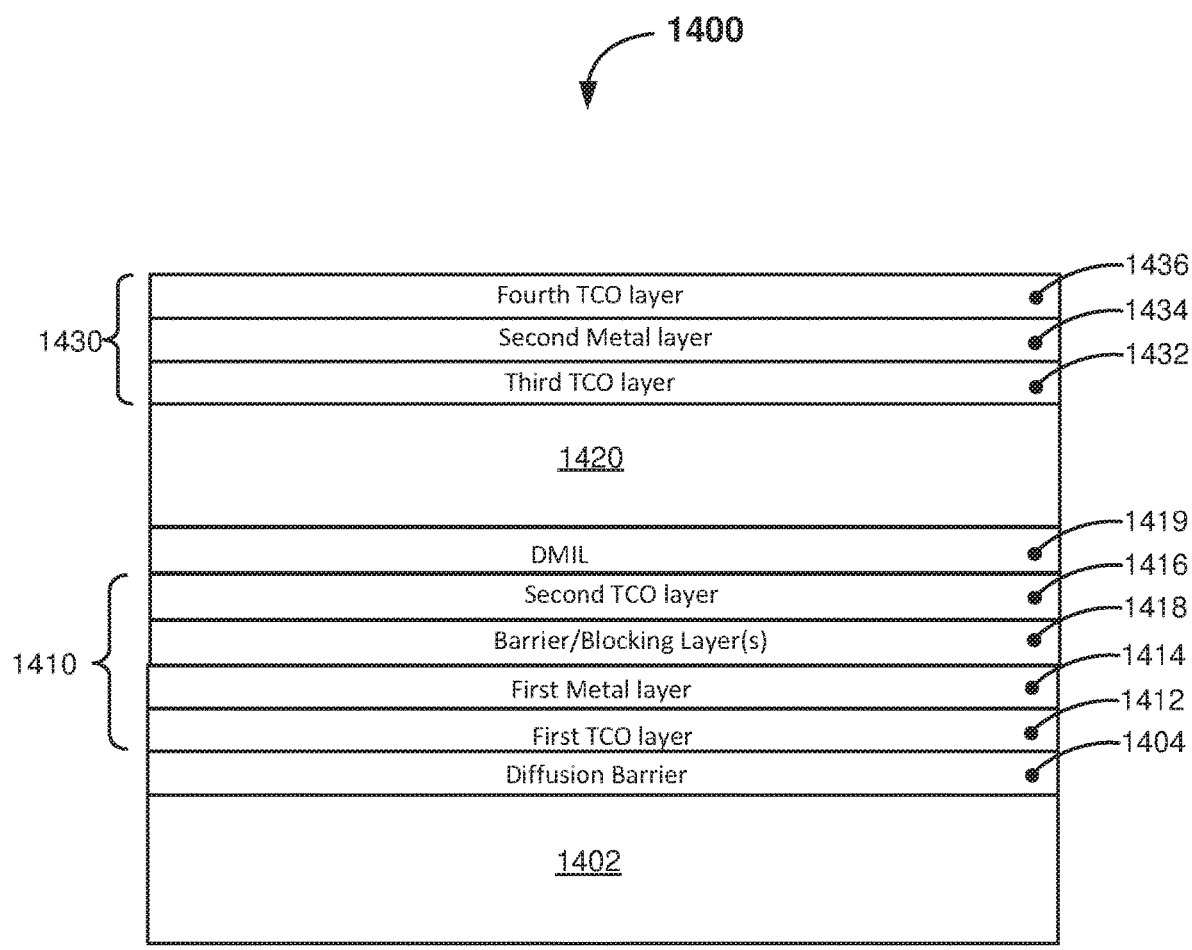
FIG. 14 depicts a schematic illustration of an electrochromic device having one or more barrier/blocking layers, according to embodiments.

Other examples of an electrochromic device with one or more barrier/blocking layer(s) are shown in FIGS. 13 and 14. In certain implementations, one or more barrier/blocking layers are included to prevent metal (e.g., silver) from migrating from a metal layer into the electrochromic stack and/or to prevent lithium from migrating from the electrochromic stack into a conductor.

FIG. 13 depicts a schematic illustration of an electrochromic device 1300, according to embodiments. The electrochromic device 1300 includes a substrate 1302, one or more diffusion barrier layers 1304 disposed on the substrate 1302, a first multi-layer conductor 1310 disposed on the diffusion barrier layer(s) 1304, one or more barrier/blocking layers 618 (e.g., material layers of TaN or TiN) disposed on the first multi-layer conductor 1310, a DMIL 1319 (e.g., $TiO_x$) disposed on the one or more barrier/blocking layers 1318, an electrochromic stack 1320 disposed on the DMIL 1319, and a second multi-layer conductor 1330 disposed on the electrochromic stack 1320. The first multi-layer conductor 1330 includes a first TCO layer 1312 disposed on the diffusion barrier 1304 and a first metal layer 1314 disposed on the first TCO layer 1312. The second multi-layer conductor 630 includes a second TCO layer 1332 disposed on electrochromic stack 1320, a second metal layer 1334 disposed on the second TCO layer 1332, and a third TCO layer 1336 disposed on the second metal layer 1334. The barrier/blocking layer(s) 1318 are between the DMIL 1319 and the metal layer(s) 1314 to provide a barrier for migration of metal into the electrochromic stack 1320 and/or to provide a barrier for migration of lithium from the electrochromic stack 1320 into the first conductor 1310. For example, if the first metal layer 1314 includes silver and the barrier/blocking layer(s) 1318 comprise TaN or TiN, then the TaN or TiN in the barrier/blocking layer(s) 1318 can block migration of the silver from the first metal layer 1314 into the electrochromic stack 1320 and can block migration of lithium from the electrochromic stack 1320 into the first conductor 1310. In another implementation, the electrochromic device 1300 further includes one or more color tuning layers adjacent one or more of the metal layers 1314 and 1334.

The TCO layers 1312, 1332, and 1336 are each made of any of the materials described above for TCOs and has the associated electrical, physical and optical properties of the TCO materials as described above. In one aspect, each of the TCO layers 1312, 1332, and 1336 are less than 200 nm thick. In another aspect, each of the TCO layers 1312, 1332, and 1336 are between 20 nm and 50 nm thick. The metal layers 1314, 1334 are each made of any of the metal materials as described herein for metal layers, including alloys, intermetallics, mixtures and/or layers of metals, and having the electrical, physical and optical properties of the metals as described above. In one embodiment, the first metal layer 1314 and/or the second metal layer 1334 includes silver. In one aspect, each of the metal layers 1314, 1334 are less than 20 nm thick. The barrier/blocking layer(s) 1318 is made of materials described above for barrier/blocking layers and has all the associated electrical, physical and optical properties of the barrier/blocking layers. In one aspect, the barrier/blocking layer(s) 1318 is less than 100 nm thick. In one embodiment, the barrier/blocking layer(s) 1318 includes TaN. The DMIL 1319 may be made of any of the materials described above for DMILs and has the associated electrical, physical and optical properties of the DMIL materials as described above. In one embodiment, the DMIL 1319 is made of $TiO_x$. In one case, the DMIL 1319 is less than 100 nm thick. In another implementation, the electrochromic device 1300 omits the diffusion barrier 1304.

In some implementations, an electrochromic device includes one or more diffusion barrier layers disposed on a substrate, first conductor disposed over the one or more diffusion barrier layers, an electrochromic stack disposed on the first conductor, and a second conductor disposed on the electrochromic stack. In one implementation, the first conductor and the second conductor have the construct of the first conductor 1310 in FIG. 13. In another implementation, the first conductor and the second conductor have the construct of the second conductor 1330 in FIG. 13. In another implementation, the first conductor has the construct of the second conductor 1330 in FIG. 13 and the second conductor has the construct of the first conductor 1310 in FIG. 13. Alternatively, the order of the layers in each of the conductors in any of these implementations may be reversed.

FIG. 14 depicts a schematic illustration of an electrochromic device 1300, according to embodiments. The electrochromic device 1400 includes a substrate 1402, a diffusion barrier 1404 disposed on the substrate 1402, a first multi-layer conductor 1410 disposed on the diffusion barrier 1404, a DMIL 1419 (e.g., $TiO_x$) disposed on the first multi-layer conductor 1410, an electrochromic stack 1420 disposed on the DMIL 1419, and a second multi-layer conductor 1430 disposed on the electrochromic stack 1420. The first multi-layer conductor 1430 includes a first TCO layer 1412 disposed on the diffusion barrier 1404, a first metal layer 1414 disposed on the first TCO layer 1412, one or more barrier/blocking layers 618 (e.g., material layers of TaN or TiN) disposed on the first metal layer 1414, and a second TCO layer 1416 disposed on the barrier/blocking layer(s) 618. The second multi-layer conductor 630 includes an IMI stack with a second metal layer 1434 between a third TCO layer 1432 and a fourth TCO layer 1436. In another implementation, the electrochromic device 1400 further includes one or more color tuning layers adjacent one or more of the metal layers 1414 and 1434.

The TCO layers 1412, 1416, 1432, and 1436 are each made of any of the materials described above for TCOs and has the associated electrical, physical and optical properties of the TCO materials as described above. In one aspect, each of the TCO layers 1412, 1416, 1432, and 1436 are less than 200 nm thick. In another aspect, each of the TCO layers 1412, 1416, 1432, and 1436 are between 20 nm and 50 nm thick. The metal layers 1414, 1434 are each made of any of the metal materials as described herein for metal layers, including alloys, intermetallics, mixtures and/or layers of metals, and having the electrical, physical and optical properties of the metals as described above. In one embodiment, the first metal layer 1414 and/or the second metal layer 1434 includes silver. In one aspect, each of the metal layers 1414, 1434 are less than 20 nm thick. The barrier/blocking layer(s) 1418 is made of materials described above for barrier/blocking layers and has all the associated electrical, physical and optical properties of the barrier/blocking layers. In one aspect, the barrier/blocking layer(s) 1418 is less than 100 nm thick. In one embodiment, the barrier/blocking layer(s) 1418 includes TaN. The DMIL 1419 may be made of any of the materials described above for DMILs and has the associated electrical, physical and optical properties of the DMIL materials as described above. In one embodiment, the Milt 1419 is made of $TiO_x$. In one case, the DMIL 1419 is less than 100 nm thick. In another implementation, the electrochromic device 1400 omits the diffusion barrier 1404.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 1410 in 14. In another implementation, the first conductor and the second conductor have the construct of the second conductor 1430 in FIG. 14. In another implementation, the first conductor has the construct of the second conductor 1430 in FIG. 14 and the second conductor has the construct of the first conductor 1410 in FIG. 14. Alternatively, the order of the layers in each of the conductors in any of these implementations may be reversed.

Protective Cap

In certain embodiments, an electrochromic device includes a protective cap layer on top of a key conductive layer (e.g., metal layer) to protect it from being damaged during one or more fabrication operations. For example, a key conductive layer may be of aluminum, which is readily oxidized to aluminum oxide during fabrication operations such as those that include high temperature such as a heat treatment process. Oxidation of an aluminum conductive layer can make it a poor conductor, particularly if the aluminum layer is thin. Certain aspects pertain to fabricating a protective cap layer, such as a titanium protective cap layer, over the aluminum conductive layer to protect it during fabrication. Using titanium metal as a protective cap layer has the benefit that the titanium oxidized to $TiO_2$, which generates a DMIL layer while simultaneously protecting the underlying aluminum from oxidation.

Figure 7:
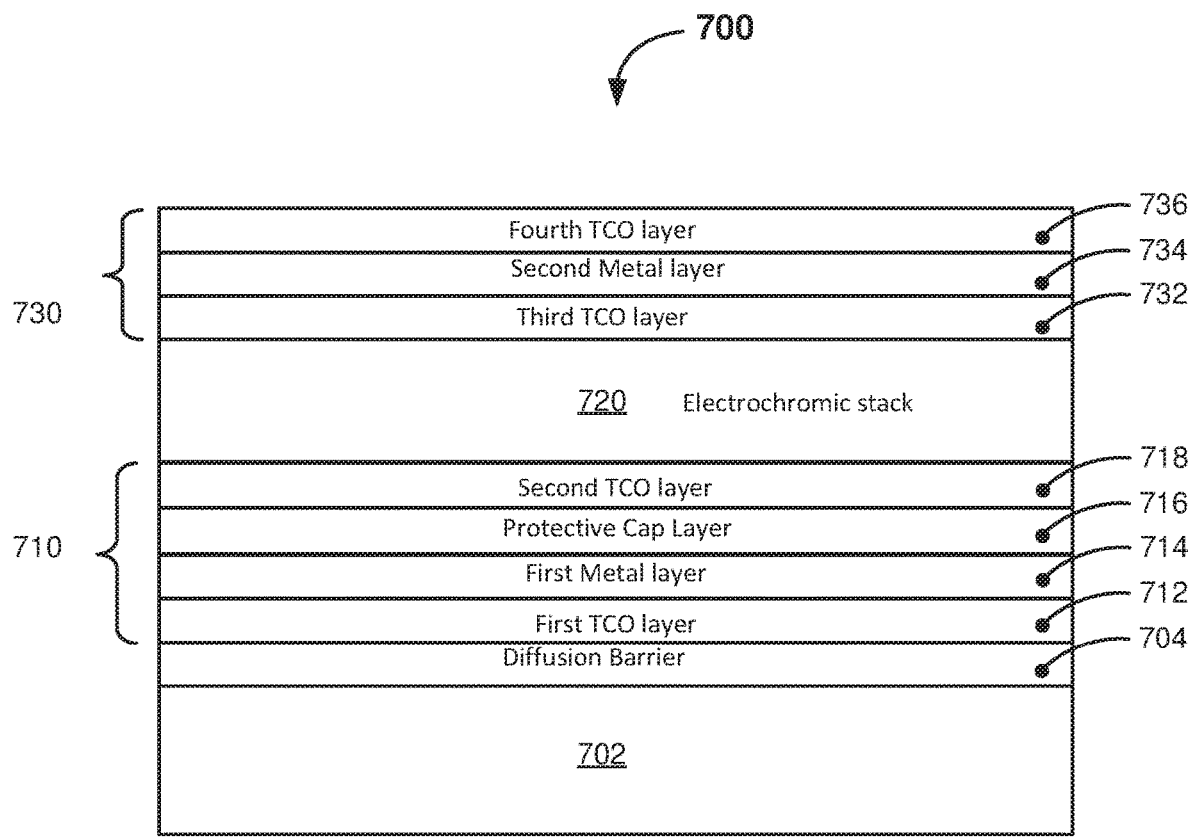
FIG. 7 depicts a schematic illustration of a cross section of an electrochromic device with a protective cap, according to aspects.

FIG. 7 depicts a schematic illustration of an electrochromic device 700 including a substrate 702, one or more diffusion bather layers 704 disposed on the substrate 702, a first composite conductor 710 disposed on the diffusion barrier layer(s) 704, an electrochromic stack 720 disposed on the first composite conductor 710, and a second composite conductor 730 disposed on the electrochromic stack 720. The first composite conductor 710 includes a first TCO layer 712 disposed on the one or more diffusion barrier layers 704, a first metal layer (e.g., silver) 714 disposed on the first TCO layer 712, a protective cap layer 716 disposed on the first metal layer 714, and a second TCO layer 718 disposed on the protective cap layer 716. If the protective cap layer is of material such as titanium that oxidizes to generate a DMIL during a fabrication operation, then a DMIL layer (not shown) may be formed at the interface to the second TCO 718. The second composite conductor 530 includes a third TCO layer 732 disposed on the electrochromic stack 720, a second metal layer (e.g., silver) 734 disposed on the third. TCO layer 732, and a fourth TCO layer 736 disposed on the second metal layer 734.

The first TCO layer 712 is made of any of the materials described above for TCOs and has the associated electrical, physical and optical properties of the TCO materials as described above. In one embodiment, the first TCO layer 712 is a FTO or other TCO material layer between about 200 nm and 500 nm thick. In another embodiment, the first TCO layer 712 has a thickness in a range between about 20 nm-50 nm. In one case, the first TCO layer 712 has a thickness of less than about 200 nm. The first metal layer 714 is made of any of the metal materials as described above for metal layers, including alloys, intermetallics, mixtures and/or layers of metals, and having the electrical, physical and optical properties of the metals as described above. In one embodiment, the first metal layer 714 is silver. In one embodiment, the first metal layer 714 has a thickness in the range of between about 1 nm and 5 nm thick. In one embodiment, the first metal layer 714 has a thickness in the range of between about 5 nm and about 30 nm. In one embodiment, the first metal layer 714 has a thickness in the range of between about 10 nm and about 25 nm. In one embodiment, the first metal layer 714 has a thickness in the range of between about 15 nm and about 25 nm. In one embodiment, the first metal layer 714 has a thickness of less than about 20 nm.

The protective cap layer 716 may be made of any of the materials described above for protective cap materials and has the associated electrical, physical and optical properties of the protective cap materials as described above. The second TCO layer 718 is made of any of the materials described above for TCOs and has the associated electrical, physical and optical properties of the TCO materials as described above. In one embodiment, the second TCO layer 718 is a FTO layer or other material layer between about 200 nm and 500 nm thick. In another embodiment, the second TCO layer 718 has a thickness in a range between about 20 nm 50 nm. In one case, the second TCO layer 718 has a thickness of less than about 200 nm. The third TCO layer 732 is made of any of the materials described above for TCOs and has the associated electrical, physical and optical properties of the TCO materials as described above. In one embodiment, the third TCO layer 732 is a FTO or other TCO material layer between about 200 nm and 500 nm thick. In another embodiment, the third TCO layer 732 has a thickness in a range between about 20 nm-50 nm. In one case, the third TCO layer 732 has a thickness of less than about 200 nm. The second metal layer 734 is made of any of the metal materials as described above for metal layers, including alloys, intermetallics, mixtures and/or layers of metals, and having the electrical, physical and optical properties of the metals as described above. In one embodiment, the second metal layer 734 is silver. In one embodiment, the second metal layer 734 has a thickness in the range of between about 1 nm and 5 nm thick. In one embodiment, the second metal layer 734 has a thickness in the range of between about 5 nm and about 30 nm. In one embodiment, the second metal layer 734 has a thickness in the range of between about 10 nm and about 25 nm. In one embodiment, the second metal layer 734 has a thickness in the range of between about 15 nm and about 25 nm. In one embodiment, the second metal layer 734 has a thickness of less than about 20 nm.

The fourth TCO layer 736 is made of any of the materials described above for TCOs and has the associated electrical, physical and optical properties of the TCO materials as described above. In one embodiment, the fourth TCO layer 736 is a FTO or other TCO material layer between about 200 nm and 500 nm thick. In another embodiment, the fourth TCO layer 736 has a thickness in a range between about 20 nm-50 nm. In one case, the fourth TCO layer 736 has a thickness of less than about 200 nm.

In one implementation, the first and second composite conductors 710 and 730 have the same or substantially similar material layers in a mirrored arrangement. That is, the fourth TCO 736 is the same or substantially similar to the first TCO layer 712, the third TCO layer 732 is the same or substantially similar to the second TCO layer 716, and the first metal layer 714 is the same or substantially similar to the second metal layer 734. In other embodiments, the first and second composite conductors 710 and 730 may have different orders of the same layers. In yet other embodiments, the first and second composite conductors 710 and 730 may have one more different material layers. In certain aspects, the first composite conductor 710 and/or the second composite conductor 740 have one or more color tuning layers.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first composite conductor 710 in FIG. 7. In another implementation, the first conductor and the second conductor have the construct of the second composite conductor 730 in FIG. 7. In another implementation, the first conductor has the construct of the second composite conductor 730 in FIG. 7 and the second conductor have the construct of the first composite conductor 710 in FIG. 7. Alternatively, the order of the layers in each of the conductors in any of these implementations may be reversed.

Other Examples of Multi-Layer Lower Conductors

Figure 8:
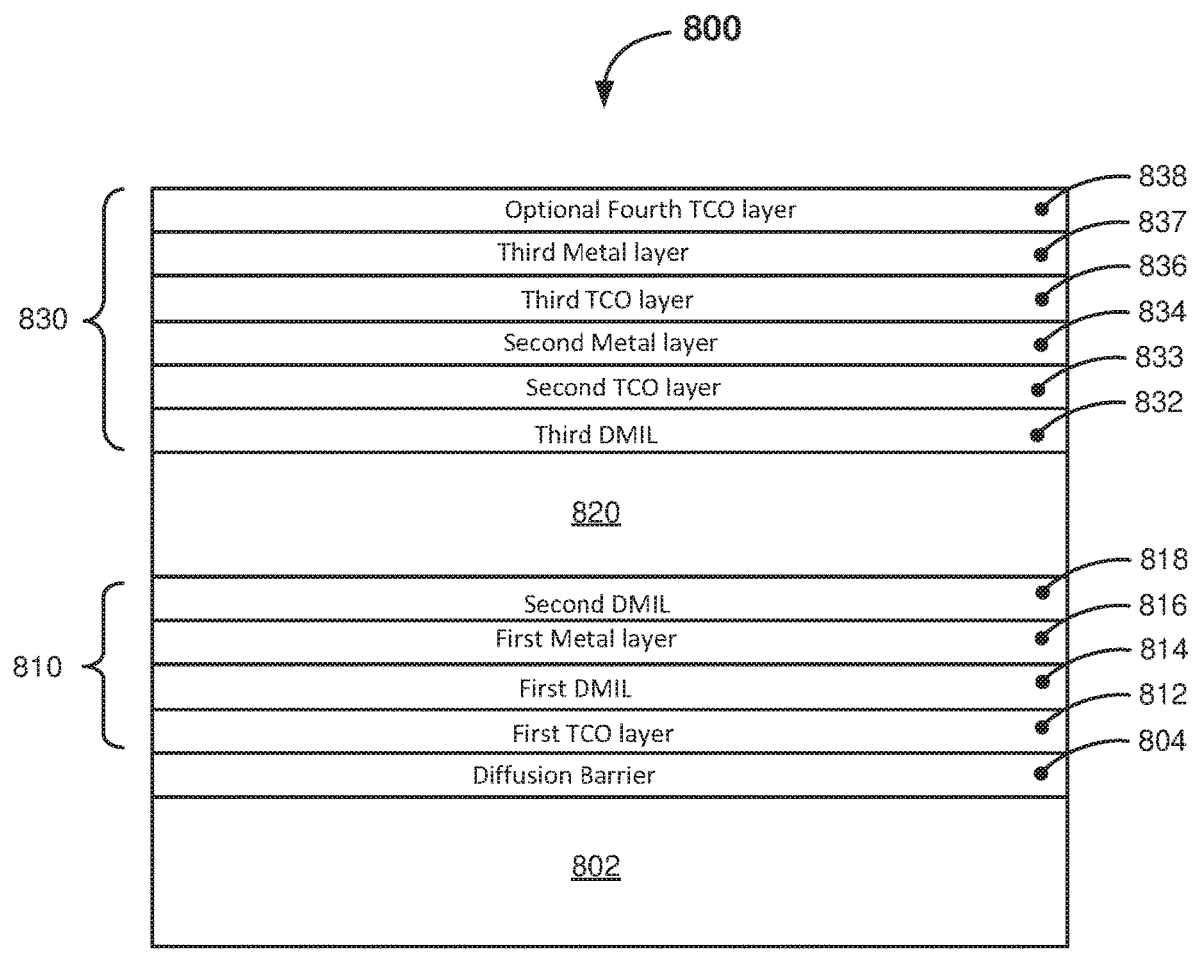
FIG. 8 depicts a schematic illustration of a cross section of an electrochromic device with multi-layer conductors, according to embodiments.

FIG. 8 is an example used to illustrate various other embodiments of multi-layer conductors. FIG. 8 depicts a schematic illustration of the material layers of an electrochromic device 800, according to embodiments. The electrochromic device 800 includes a substrate 802, one or more diffusion barrier layers 804 disposed on the substrate 802, a first composite conductor 810 disposed on the diffusion barrier layer(s) 804, an electrochromic stack 820 disposed on the first composite conductor 810, and a second composite conductor 830 disposed on the electrochromic stack 820. The first composite conductor 810 includes a first TCO layer 812 disposed over the one or more diffusion barrier layers 804, a first DMIL 814 disposed over the first TCO layer 812, a first metal layer 816 disposed over the first DMIL 814, and a second DMIL 818 disposed over the first metal layer 816. The second composite conductor 830 includes an optional third DMIL 832 shown disposed over the electrochromic stack 820, a second TCO 833 disposed over the third DMIL 832, a second metal layer 834 disposed over the second TCO 833, a third TCO 836 disposed over the second metal layer 834, an optional third metal layer 837 disposed over the third TCO 836, and an optional fourth TCO 838 disposed over the third metal layer 837.

In certain aspects, the first composite conductor 810 of the electrochromic device 800 shown in FIG. 8 further includes one or more color tuning layers located adjacent one or more of the metal layers. In these color tuning embodiments, the one or more color tuning layers may be selected to increase transparency of the conductor and/or to modify the wavelength of light passing through the electrochromic device to change the color of light transmitted. Some examples of materials that can be used in color tuning layers are silicon oxide, tin oxide, iridium tin oxide, and the like.

The first TCO layer 812 is made of any of the materials described above for TCOs and has the associated electrical, physical and optical properties of the TCO materials as described above. In one embodiment, the first TCO layer 812 is a FTO or other TCO material layer between about 200 nm and 500 nm thick. In another embodiment, the first TCO layer 812 has a thickness in a range between about 20 nm-50 nm. In one case, the first TCO layer 812 has a thickness of less than about 200 nm.

The first DMIL 814 may be made of any of the materials described above for DMILs and has the associated electrical, physical and optical properties of the DMIL materials as described above. In one embodiment, the first DUEL 814 is of $TiO_2$. In one case, the first DMIL 814 of $TiO_2$ is between 10 nm and 100 nm thick. In another case, the first DMIL 814 of $TiO_2$ is between 25 nm and 75 nm thick. In another case, the first DMIL 814 of $TiO_2$ is between 40 nm and 60 nm thick. In yet another case, the first DMIL 814 of $TiO_2$ is about 50 nm thick.

The first metal layer 816 is made of any of the metal materials as described above for metal layers, including alloys, intermetallics, mixtures and/or layers of metals, and having the electrical, physical and optical properties of the metals as described above. In one embodiment, the first metal layer 816 is silver. In one embodiment, the first metal layer 816 has a thickness in the range of between about 1 mu and 5 nm thick. In one embodiment, the first metal layer 816 has a thickness in the range of between about 5 nm and about 30 nm. In one embodiment, the first metal layer 816 has a thickness in the range of between about 10 nm and about 25 nm. In one embodiment, the first metal layer 816 has a thickness in the range of between about 15 nm and about 25 nm. In one embodiment, the first metal layer 816 has a thickness of less than about 20 nm.

A function of the second DMIL 818 is to prevent metal from the first metal layer 816 from migrating and exposure to the electrochromic stack 820. For example, the electrochromic device 800 may be lithium, proton or other ion based in some cases. Such electrochromic devices undergo oxidation/reduction reactions at their electrode layers. The second DMIL 818 protects the first metal layer 816 from oxidation and reduction reactions, particularly oxidation. The second DMIL 818 can be made of any of the materials described above for DMILs and has the electrical, physical and optical properties of DMILs as described above. In one embodiment, the second DMIL 818 is $TiO_2$. In one case, the second DMIL 818 of $TiO_2$ is between 10 nm and 100 nm thick. In another case, the second DMIL 818 of $TiO_2$ is between 25 nm and 75 nm thick. In another case, the second DMIL 818 of $TiO_2$ is between 40 nm and 60 nm thick. In yet another case, the second. DMIL 818 of $TiO_2$ is about 50 nm thick.

The third DMIL 832 is an optional layer. The third DMIL 832 may function to prevent the second TCO layer 833 from exposure to the electrochromic stack 820 and/or may function as a traditional DMIL. In one embodiment, the third DMIL 832 is NiWO and is between about 10 nm and about 100. In another embodiment, the third DMIL 832 is NiWO and is between about 10 nm and about 50 nm thick.

The second TCO layer 833 may be made of any of the materials described above for TCOs and has the associated electrical, physical and optical properties of the TCO materials as described above. In one embodiment, the second TCO layer 833 is ITO or other TCO material and is between about 10 nm and about 100 nm thick. In one embodiment, the second TCO layer 833 is ITO or other TCO material and is between about 25 nm and about 75 nm thick. In one embodiment, the second TCO layer 833 is ITO or other TCO material and is about 50 nm thick. In another embodiment, the second TCO layer 833 has a thickness in a range between about 20 nm-50 nm. In one case, the second TCO layer 833 has a thickness of less than about 200 nm.

The second metal layer 834 is made of any of the metal materials as described above for metal layers, including alloys, intermetallics, mixtures and/or layers of metals, and having the electrical, physical and optical properties of the metals as described above. In one embodiment, the second metal layer 834 is silver. In one embodiment, the second metal layer 834 has a thickness in the range of between about 1 nm and 5 nm thick. In one embodiment, the second metal layer 834 has a thickness in the range of between about 5 mu and about 30 rum In one embodiment, the second metal layer 834 has a thickness in the range of between about 10 nm and about 25 nm. In one embodiment, the second metal layer 834 has a thickness in the range of between about 15 nm and about 25 nm. In one embodiment, the second metal layer 835 has a thickness of less than about 20 nm.

The third TCO layer 836 may be made of any of the materials described above for TCOs and has the associated electrical, physical and optical properties of the TCO materials as described above. In one embodiment, the third TCO layer 836 is ITO or other TCO material and is between about 50 nm and about 500 nm thick. In one embodiment, the third TCO layer 836 is ITO or other TCO material and is between about 100 nm and about 500 nm thick. In one embodiment, the third TCO layer 836 is ITO or other TCO material and is between about 100 nm thick and about 250 nm thick. In another embodiment, the third TCO layer 836 has a thickness in a range between about 20 nm-50 nm In one case, the third TCO layer 836 has a thickness of less than about 200 nm.

The third metal layer 837 is optional. If this third metal layer 837 is included, then the optional fourth TCO layer 838 is also included. The third metal layer 837 is made of any of the metal materials as described above for metal layers, including alloys, intermetallics, mixtures and/or layers of metals, and having the electrical, physical and optical properties of the metals as described above. In one embodiment, the third metal layer 837 is silver. In one embodiment, the third metal layer 837 has a thickness in the range of between about 1 nm and 5 nm thick. In one embodiment, the third metal layer 837 has a thickness in the range of between about 5 nm and about 30 nm. In one embodiment, the third metal layer 837 has a thickness in the range of between about 10 nm and about 25 nm. In one embodiment, the third metal layer 837 has a thickness in the range of between about 15 nm and about 25 nm. In one embodiment, the third metal layer 837 has a thickness of less than about 20 nm.

The fourth TCO layer 838 is optional. If the fourth TCO layer 838 is included, then the third metal layer 837 is also included. The fourth TCO layer 838 may be made of any of the materials described above for TCOs and has the associated electrical, physical and optical properties of the TCO materials as described above. In one embodiment, the fourth TCO layer 838 is ITO and is between about 50 nm and about 500 nm thick. In one embodiment, the fourth TCO layer 838 is ITO or other TCO material layer that is between about 100 nm and about 500 nm thick. In one embodiment, the fourth TCO layer 838 is ITO other TCO material layer that is between about 100 nm thick and about 250 nm thick. In another embodiment, the fourth TCO layer 838 has a thickness in a range between about 20 nm-50 nm. In one case, the fourth TCO layer 838 has a thickness of less than about 200 nm.

In some implementations, an electrochromic device includes one or more diffusion barrier layers disposed on a substrate, a first conductor disposed over the one or more diffusion barrier layers, an electrochromic stack disposed on the first conductor, and a second conductor disposed on the electrochromic stack. In one implementation, the first conductor and the second conductor have the construct of the first conductor 810 in FIG. 8. In another implementation, the first conductor and the second conductor have the construct of the second composite conductor 830 in FIG. 8. In another implementation, the first conductor has the construct of the second conductor 830 in FIG. 8 and the second conductor has the construct of the first conductor 810 in FIG. 8. Alternatively, the order of the layers in each of the conductors in any of these implementations may be reversed.

In certain aspects, an electrochromic device includes two conductors, at least one of which is a multi-layer conductor, and an electrochromic stack between the conductors, disposed on a substrate (e.g., glass). Each multi-layer conductor includes a metal layer sandwiched between at least two non-metal layers such as, for example, a metal oxide layer, a transparent conductive oxide (TCO) layer and/or a DMIL. That is, a metal layer is not in direct contact with the electrochromic stack. In some cases, one or both of the conductors further comprise one or more additional metal layers. In these aspects, the additional metal layers are also sandwiched between layers and not in contact with the electrochromic stack. In some aspects, the one or more metal layers of a multi-layer conductor are not in contact with a TCO layer. For example, a metal layer of a multi-layer conductor may be sandwiched between two DMILs.

In certain aspects, a multi-layer conductor may comprise a metal layer sandwiched between a DMIL and a non-metal layer. In some cases, the sandwiched metal layer may comprise of one of silver, gold, copper, platinum, and alloys thereof in some cases, the metal layer may be comprised of an alloy whose oxides have low resistivity. In one example, the metal layer may further comprise another material (e.g., Hg, Ge, Sn, Pb, As, Sb, or Bi) as compound during the preparation of the oxide to increase density and/or lower resistivity.

Layers of Multi-Layer Lower Conductors with Multiple Functions

In certain embodiments, one or more of the layers of materials described herein can serve multiple functions. For example, in one embodiment, a layer disposed on the substrate function both as a diffusion barrier and an opposite susceptibility layer. Also, a layer can function both as a DMIL layer and as an opposite susceptibility layer.

Electromagnetic-Shielding

In certain embodiments, a faster-switching electrochromic window with one or more electrochromic devices described herein is configured to provide electromagnetic shielding by blocking electromagnetic communication signals. Each of these electromagnetic-shielding, electrochromic windows has a shielding stack of one or more material layers that functions to Hock the electromagnetic communication signals. In certain aspects, the shielding stack and the electrochromic device share certain layers of a single multi-functional stack of material layers. For example, an electrochromic device may include a composite conductor with material layers that can function as a shielding stack. In other aspects, the layers of the electrochromic device and the shielding stack are separate structures on the same substrate, separate structures on different substrates (e.g., different substrates of an IGU), or separate structures on different surfaces of the same substrate.

One embodiment is an electrochromic device having one or more layers that function as an electromagnetic shield. In one embodiment, the electromagnetic shielding function is active, i.e. it can be turned on and off with a grounding function, e.g. by a controller. In one embodiment the electromagnetic shielding function is passive, i.e. always on. This may be because the layers inherently possess a shielding function by design, i.e. they do not rely on a grounding function, or e.g. because a layer or layers is permanently grounded. One embodiment is an electrochromic device stack and electromagnetic shield combination, whether the electromagnetic shield is part of the electrochromic device stack or a separate device.

These electromagnetic-shielding, electrochromic windows can be used to prevent electromagnetic interference (EMI), allowing for sensitive electromagnetic transmissions to be observed in the shielded space, or to block wireless communication and create private spaces in which outside devices are prevented from eavesdropping on wireless transmissions originating from within the space. Electrochromic windows configured to provide electromagnetic shielding for a structure or building, can effectively turn a building, room, or other space into a Faraday cage, provided the surrounding structure itself attenuates electromagnetic signals (e.g., the surrounding structure is made from conductive materials such as steel or aluminum or is properly grounded so as to block as a Faraday cage would otherwise). Electrochromic windows configured for electromagnetic shielding may be characterized as sufficiently attenuating electromagnetic transmissions across a range of frequencies, for example, between 20 MHz and 10,000 MHz. Some applications may allow more limited or selective attenuation. For example, depending on the structure of the shielding feature, one or more subranges may be excluded from attenuation. For example, in some embodiments, electromagnetic radiation may be attenuated by about 10 dB to 70 dB over selected ranges or about 20 dB to 50 dB over selected ranges.

Electromagnetic-shielding, electrochromic windows can be placed in a room of other region of a building that requires security to prevent wireless electromagnetic communications from entering or exiting the region. A window controller can be used to activate and deactivate the shielding features in the secure region according to a schedule or as triggered by an event such as the entry of particular individual or asset into the secure region or into the vicinity of the secure region. The window controller may issue the instructions over a window communications network or locally, for example, from a local onboard controller at the window. In one aspect, the shielding stack has at least one metal layer, for example, as part of a multi-layer conductor of an electrochromic device. To activate the shielding feature, the metal layer of the shielding stack may be grounded to effectively block communications. In one aspect, the same window controller that controls the transition of the electrochromic device(s) to different tint states also controls the shielding features of the window ("active" shielding). In one example, the shielding stack is selectively controlled to shield or not with a grounding function. The grounding function may be controlled by the window controller that also controls transitioning of the electrochromic device to different tint states. In other embodiments, the shielding function may be inherent in the structure of the shielding stack, i.e. a grounding function need not be applied in order to effect a shielding function (referred to as "passive" shielding).

The shielding stack of an electromagnetic-shielding, electrochromic window is designed to attenuate transmission of electromagnetic radiation in frequencies used for wireless communication while transmitting most radiation in the visible spectrum. The shielding generally includes one or more layers of electrically conductive material (i.e. one or more electroconductive layers) that span the area where transmission of electromagnetic radiation is to be blocked. For example, the one or more electroconductive layers may be coextensive with the surface area (or visible area between the window frames) of the transparent substrate upon which it is disposed in order to provide attenuation of the electromagnetic radiation. In some cases, the attenuating effect of the window can be increased when the one or more electroconductive layers are grounded or held at a particular voltage to provide attenuation of electromagnetic radiation. In some cases, the one or more electroconductive layers are not connected to ground or an external circuit and have a floating potential. Electromagnetic shielding for other window applications has previously been described in, for example, U.S. Pat. Nos. 5,139,850 and 5,147,694.

In one aspect, an electromagnetic-shielding, electrochromic window is configured to selectively Hock certain wavelengths of electromagnetic communication, thus acting as high, low, or bandpass filters. In other words, the shielding stack can be configured to block transmission and or reception of communications in certain frequency ranges but allow communications in other frequency ranges, which may be deemed sufficiently secure in some contexts. For example, it may be possible to allow communication that is transmitted at 800 MHz, while blocking communication.

The electroconductive layer can be made of any of a number of conductive materials such as silver, copper, gold, nickel, aluminum, chromium, platinum, and mixtures, intermetallics and alloys thereof. In some cases, the electroconductive layer may be comprised of multiple layers of the same or different conductive materials. For example, an electroconductive layer of a shielding stack may be of a "metal sandwich" construction of two or more different metal sublayers (e.g., Cu/Ag/Cu or NiCr/metal/NiCr where the metal sublayer is one of the aforementioned metals).

In one aspect, a shielding stack includes one or more silver electroconductive layers that have a floating electric potential, where each silver layer has a thickness of about 10 nm-20 nm. The shielding stack also includes one or more anti-reflection layers made of indium tin oxide. The anti-reflection layers have a thickness of about 30 nm to 40 nm when adjacent to one silver electroconductive layer and a thickness of about 75 nm-85 nmn when interposed between two silver electroconductive layers.

In some cases, the one or more electroconductive layers of a shielding stack are made of an opaque or reflective material (e.g., metal layers) in its bulk form. For example, the one or more electroconductive layers of a shielding stack may be the one or more metal layers of a composite conductor (e.g., 310, 330, 410, 430, 510, 530, 560, 580) of an electrochromic device (e.g. 300, 400, 500, 550, etc.). In one aspect, the shielding stack may be designed to minimize attenuation of visible radiation while still strongly attenuating radiation at longer wavelengths commonly used in wireless communication according to one aspect. One way to minimize attenuation of visible radiation is to include at least one anti-reflection layer disposed adjacent to each electroconductive layer (e.g., metal layer). In some cases, anti-reflection layers are placed on either side of an electroconductive layer to enhance light transmission through coated substrate having the shielding stack. An anti-reflection layer typically has a refractive index that differs from the adjacent electroconductive layer. Typically, anti-reflection layers are a dielectric or metal oxide material. Examples of anti-reflection layers include indium tin oxide (ITO), $In_2O_3$, $Nb_2O_5$, $Ta_2O_5$, $SnO_2$, ZnO or $Bi_2O_3$. In certain embodiments, an anti-reflection layer is a tin oxide layer having a thickness in the range of between about 15 to 80 nm, or between about 30 to 50 nm. In general, the thickness of the anti-reflection layer is dependent on the thickness of the conductive layer.

According to one aspect, a shielding stack includes at least one electroconductive layer (e.g. metal layer) and at least one anti-reflection layer adjacent each electroconductive layer. The anti-reflection layer may be, for example, a layer of material of "opposing susceptibility" such as a "color tuning" layer, a TCO layer, a DMIL layer, or other anti-reflection layer. With reference to FIG. 4, for example, the first composite conductor 410 of the electrochromic device 400 includes a stack of a metal layer (e.g., silver) 412 disposed between one or more color tuning layers 411 and a first DMIL (e.g., $TiO_2$) 424, which can function as a shielding stack comprised of a metal layer sandwiched between anti-reflection layers. As another example, the first composite conductor 510 of the electrochromic device 500 in FIG. 5 includes a stack of a metal layer 514 between the first TCO layer 512 and the second TCO layer 516 and DMIL 504, which can function as a shielding stack comprised of a metal layer sandwiched between anti-reflection layers. The second conductor 530 of the electrochromic device 500 in FIG. 5 has a stack of a metal layer 534 between the third TCO layer 532 and the fourth TCO layer 536, which can also function as a shielding stack comprised of a metal layer sandwiched between anti-reflection layers. Other examples can be found in other illustrated examples and elsewhere in the disclosure.

According to another aspect, a shielding stack includes two or more separate electroconductive layers (e.g. metal layers), along with an interlayer or anti-reflection layer between the electroconductive layers. An illustrated example of an electrochromic device that includes a shielding stack according to this construction is shown in FIG. 4. As shown, the electrochromic device 400 includes a first metal layer 412, a second metal layer 433, and if DMILs 424, 432 are made of $TiO_2$, they function as anti-reflections layers between the metal layers. Additional examples can be found in other illustrated embodiments and elsewhere in the disclosure. An interlayer may be made from materials that are transparent to short wave electromagnetic radiation in the visible spectrum while absorbing frequencies having longer wavelengths that are used for communication. An interlayer may be a single layer or a composite of several material layers. If an electrochromic window is of a laminate construction, a resin such as polyvinylbutyral ("PVB") or polyurethane may be used as an interlayer to laminate two transparent substrates together. In one example when a resin such as PVB is used, the thickness of the interlayer is in the range of about 0.25 mm to 1.5 mm.

According to another aspect, a shielding stack may comprise two or more electroconductive layers, where each electroconductive layer is sandwiched by an anti-refection layer. An illustrated example of an electrochromic device that includes a shielding stack according to this construction is shown in FIG. 5B. As shown, the electrochromic device 550 includes a first metal layer 564, a second metal layer 584, and TCOs that sandwich each of the metal layers. Additional examples can be found in other illustrated embodiments and elsewhere in the disclosure. In another aspect, four or more electroconductive layers may be used in a single shielding stack.

When a shielding stack having a single electroconductive layer is used in combination with a semiconductor metal oxide layer, or when a shielding stack having two electroconductive layers is used, the spacing between the electroconductive layers required to achieve a particular attenuation effect may depend on the composition (e.g., glass, air, gas, or EC device layers) and thickness of the layers that lie between the two electroconductive layers.

In one embodiment, a shielding stack includes a single layer of silver (or other conductive material) with a thickness in the range of about 15 nm to 60 nm. A thickness greater than about 15 nm of silver provides a low sheet resistance of less than 5 ohms per square. In one example, a single electroconductive, silver layer will be between about 20 and 30 nm thick and thus allow sufficient absorption of electromagnetic radiation in communications frequencies while maintaining a sufficiently high light transmissivity. In this case, the silver layer may be electrically coupled to ground either by physical connection (e.g., a bus bar), or by capacitive coupling between the electroconductive layer and a metal frame that at least partially overlaps the electroconductive layer.

In one aspect, a shielding stack includes two layers of silver or other electroconductive material, each having a thickness in a range of about 7 nm to about 30 nm. A shielding stack with two layers of electroconductive material has been found to have a reduced light reflection for a given attenuation as compared to when a single, but thicker, silver layer is used. In one case, one of the electroconductive layers (first) is electrically coupled to ground either by physical connection (e.g., a bus bar), or by capacitive coupling between the electroconductive layer and a grounded metal frame that at least partially overlaps the electroconductive layer. The other (second) electroconductive layer may be capacitively coupled to the first grounded electroconductive layer, thus connecting the second electroconductive layer to ground. In another case, both the first and second electroconductive layers are physically connected to ground. In another case, one or both of the electroconductive layers have floating potentials (i.e., they are not electrically connected to ground or a source of defined potential). In the embodiments according to this aspect, most attenuation can be attributed to the reflection of electromagnetic radiation at the first electroconductive layer. Further attenuation occurs as a result of absorption in the interlayer region between the electroconductive layers (or their proximate antireflective layers) as the path length of incoming waves is greatly increased due reflections between the electroconductive layers, resulting in significant absorption of radiation reflecting within the interlayer.

In yet another embodiment, the outer surface of an electromagnetic-shielding, electrochromic window is coated with a transparent abrasion-resistant coating including an electroconductive semiconductor metal oxide layer, which may serve the purpose of a shielding stack or a portion thereof. In this embodiment, the lite also includes a shielding stack having a single layer of silver (or other conductive material) with a thickness of, e.g., between about 15 and 50 nm placed on one of the interior surfaces of the glass (e.g., S3 4), such as a surface not having an electrochromic stack. Optionally, an interlayer may be placed at any location between the metal oxide layer and the shielding stack to increase absorption of waves reflecting between the two electroconductive layers. In some instances the metal oxide layer and the shielding stack are placed on opposite lites of an IGU such that there is a gap between the metal oxide layer and the shielding stack. As examples, abrasion resistant coatings may be made from metal oxides such as tin doped indium oxide, doped tin oxide, antimony oxide, and the like. In this embodiment, the electroconductive layer and the abrasion resistant coating are electrically coupled to ground, either by physical connection (e.g., a bus bar), or by, e.g., capacitive coupling between the electroconductive layer and a metal frame that at least partially overlaps the layer.

In yet another embodiment, a shielding stack is incorporated into a flexible shielding film, which may be adhered to or otherwise mounted to a substrate. For example, an IGU may be configured for electromagnetic shielding by attaching a flexible shielding film to surface S1 or S4 of an IGU lite after the IGU is fabricated. Alternatively, during assembly of an IGU, the flexible shielding film may be attached to surface S2 or S3 of an IGU lite. As another example, a flexible shielding film may be embedded in the laminate during fabrication. In yet another example, an IGU can be constructed so that S2 has an electrochromic device, and the mate lite for the IGU is a laminate having a shielding film laminated between two substrates.

Flexible shielding films may be configured to block one or more of radio frequency (RF), infrared (IR) and ultraviolet (UV) signals. Some examples of flexible films such as SD2500/SD2510, SD 1000/SD 1010 and DAS Shield™ films, sold by Signals Defense, of Owings Mills, Maryland are commercially available.

Figure 9:
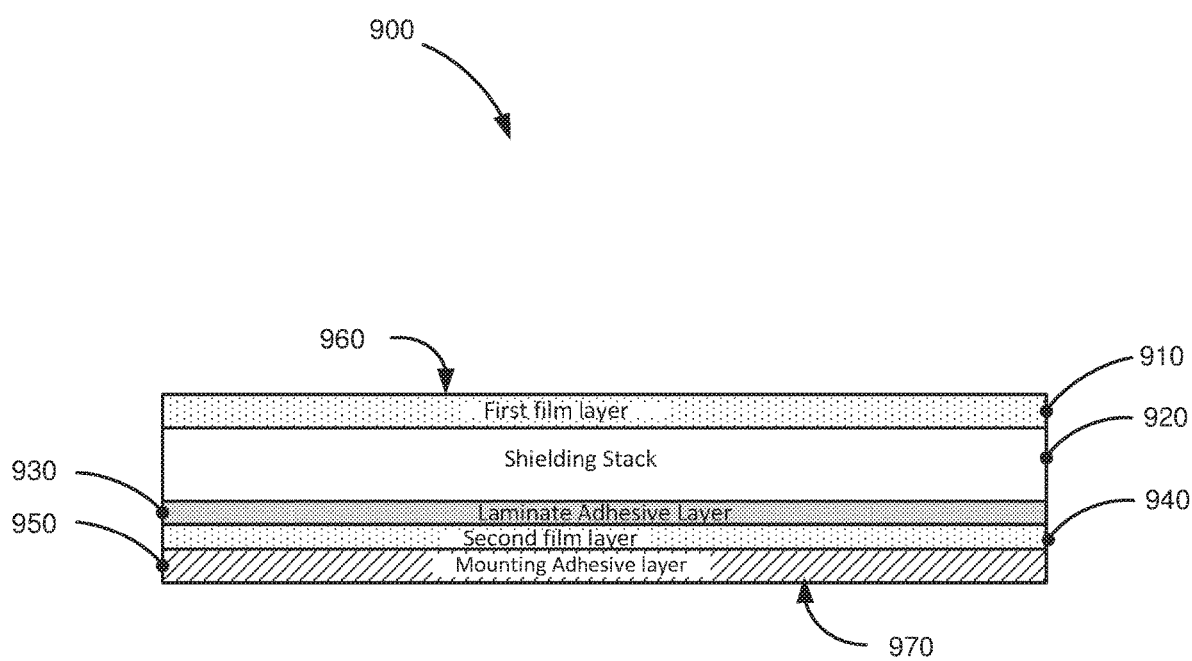
FIG. 9 depicts a schematic illustration of a flexible electromagnetic shielding film, according to embodiments.

FIG. 9 depicts a flexible electromagnetic shielding film 900 that may be mounted onto the surface of a substrate (without or without an electrochromic device) to provide electromagnetic shielding. A first film layer 910 is used as a substrate onto which a shielding stack 920 is deposited or formed. A laminate adhesive layer 930 is used to bond the shielding stack 920 to a second film layer 940, encapsulating the shielding stack 920 within a flexible film. A mounting adhesive layer 950 may also be included in the flexible electromagnetic shielding film 900 as shown in FIG. 9. The mounting adhesive layer 950 can then be used to bond the other layers of the shielding film 900 to the surface of the substrate of the window to provide electromagnetic shielding. In some cases, the total thickness of the flexible electromagnetic shielding film, when mounted on a lite, is between about 25 µm and 1000 µm. Optionally, an additional protective layer (not shown) may be located on the surface 960. The type of material that can be used for a protective layer varies depending on the window environment. Some examples of materials that can be used include materials such as epoxy, resin, or any natural or synthetic material that provides adequate protection to the shielding film structure. While a flexible electromagnetic shielding film is being transported, stored, or otherwise held prior to installation on a lite, optionally a release film layer may be located on the surface 970. The release film layer may protect the mounting adhesive layer 950 until the time of installation when the release film is removed.

In another embodiment, a flexible electromagnetic shielding film includes a substrate onto which a shielding stack is deposited or formed, and a mounting adhesive layer in that bonds the shielding stack directly to the surface of the window substrate. This embodiment omits the laminate layer 930 and the second film layer 940 shown in FIG. 9. Many materials may be suitable for film layers 910 and 940, for laminate adhesive layer 930, and for mounting adhesive layer 950. Typically materials chosen should be transparent to visible light and have sufficiently low haze so the optical properties of a lite are not substantially diminished. In certain embodiments, film layers are less than about 300 µm thick (e.g., between about 10 µm and 275 µm thick) and are made from a thermoplastic polymer resin. Examples of film materials include polyethylene terephthalate, polycarbonate, polyethylene naphthalate. One of skill in the art may select from a variety of acceptable adhesive layers and mounting adhesive layers. Depending on the thickness of a shielding stack, the placement of the film within an IOU unit, or the optical properties desired from a window configured for electromagnetic shielding, different adhesives may be used. In one example, the mounting adhesive layer 950 may be made from a pressure sensitive adhesive such as National Starch 80-1057 available from Ingredion Inc. Examples of other suitable adhesives include Adcote 76R36 with catalyst 9H1H, available from Rohm & Haas and Adcote 89r3 available from Rohm & Haas.

Layers described for electromagnetic shielding and/or the electrochromic device may be fabricated using a variety of deposition processes including those used for fabricating electrochromic devices. In some instances, the steps used for depositing a shielding stack may be integrated into the fabrication process steps for depositing an electrochromic device. In general, a shielding stack or an abrasion-resistant coating that is a semiconductor metal oxide may be deposited by physical and/or chemical vapor techniques onto a transparent substrate at any step in the fabrication process. Individual layers of a shielding stack are often well suited for being deposited by a physical vapor deposition technique such sputtering. In some cases, a silver (or other metal) layer is deposited by a technique such as cold spraying or even a liquid based process such as coating with a metal ink. In cases where a resin material such as PVB is used, the interlayer may be formed through a lamination process in which two substrates (optionally having one or more layers thereon) are joined together.

In some aspects, the shielding stack is disposed on one substrate and the electrochromic device is disposed on another substrate of an IGU, a laminate construction, or combination thereof. In one example, a laminate lite of an IGU includes the shielding stack, while a non-laminate lite of the IGU includes an electrochromic device. In another embodiment, both liter of the IGU are laminates, where one laminate lite includes a shielding stack and the other laminate lite includes an electrochromic device. In yet other embodiments, a single laminate includes both an electrochromic device coating and a shielding stack. The laminate may itself be a lite of an KW or not.

Although the foregoing embodiments have been described in some detail to facilitate understanding, the described embodiments are to be considered illustrative and not limiting. It will be apparent to one of ordinary skill in the art that certain changes and modifications can be practiced within the scope of the above description and the appended claims.

What is claimed is:

1. An electrochromic device, comprising:
   a first conductor and a second conductor, wherein at least one of the first and second conductors is a multi-layer conductor comprising a metal layer and at least one color-tuning layer sandwiched between a first transparent conductive oxide layer and a second transparent conductive oxide layer; and
   a solid state and inorganic electrochromic stack between the first and second conductors adjacent a substrate.

2. The electrochromic device of claim 1, further comprising one or more additional metal layers, wherein each of the one or more additional metal layers is sandwiched between the first transparent conductive oxide layer and the second transparent conductive oxide layer.

3. The electrochromic device of claim 1, further comprising a diffusion barrier disposed on the substrate.

4. The electrochromic device of claim 3, wherein the diffusion barrier is a sodium diffusion barrier.

5. The electrochromic device of claim 3, wherein the diffusion barrier includes a tri-layer stack comprising a $SiO_2$ layer, a $SnO_2$ layer, and a $SiO_x$ layer.

6. The electrochromic device of claim 5, wherein the $SiO_2$ layer has a thickness of between 20 nm and 30 nm, the $SnO_2$ layer has a thickness of between 20 nm and 30 nm, and the $SiO_x$ layer has a thickness of between 2 nm and 10 nm.

7. The electrochromic device of claim 1, wherein the at least one color-tuning layer lies adjacent the metal layer.

8. The electrochromic device of claim 7, wherein the metal layer is transparent by virtue of being adjacent to the at least one color-tuning layer.

9. The electrochromic device of claim 1, wherein the first transparent conductive oxide layer and the second transparent conductive oxide layer each have a thickness of less than 200 nm.

10. The electrochromic device of claim 1, wherein the first transparent conductive oxide layer and the second transparent conductive oxide layer each have a thickness between 20 nm and 50 nm.

11. The electrochromic device of claim 10, wherein the metal layer has a thickness of less than 20 nm.

12. The electrochromic device of claim 3, wherein the diffusion barrier has a thickness of less than 100 nm.

13. The electrochromic device of claim 1, wherein an overall sheet resistance of the first and second conductors is less than 5 2/u or less than 2 2/u.

14. The electrochromic device of claim 1, wherein a sheet resistance of the first and second conductors varies by (i) less than 20% or less than 10%.

15. The electrochromic device of claim 1, further comprising a defect mitigating insulating layer disposed between the second transparent conductive oxide layer of the multi-layer conductor and the solid state and inorganic electrochromic stack.

16. The electrochromic device of claim 1, wherein a thickness of the at least one color-tuning layer is configured to tune color of light transmitted through the electrochromic device in a bleached state.

17. The electrochromic device of claim 1, wherein the at least one color-tuning layer is a high-index, low-loss dielectric material of opposing susceptibility to the metal layer.

18. The electrochromic device of claim 1, wherein the at least one color-tuning layer comprises a silicon oxide, a tin oxide, or an indium tin oxide.

19. An electrochromic device, comprising:
a first conductor and a second conductor, wherein at least one of the first and second conductors is a multi-layer conductor comprising a metal layer and at least one color-tuning layer sandwiched between a first transparent conductive oxide layer and a defect mitigating insulating layer; and
a solid state and inorganic electrochromic stack between the first and second conductors adjacent a substrate.

20. The electrochromic device of claim 19, further comprising one or more additional metal layers sandwiched between the first transparent conductive oxide layer and the defect mitigating insulating layer.

21. The electrochromic device of claim 20, further comprising a diffusion barrier disposed on the substrate.

22. The electrochromic device of claim 21, wherein the diffusion barrier is a sodium diffusion barrier.

23. The electrochromic device of claim 21, wherein the diffusion barrier includes a stack comprising a $SiO_2$ layer, a $SnO_2$ layer, and a $SiO_x$ layer.

24. The electrochromic device of claim 23, wherein the $SiO_2$ layer has a thickness of between 20 nm and 30 nm, the $SnO_2$ layer has a thickness of between 20 nm and 30 nm, and the $SiO_x$ layer has a thickness of between 2 nm and 10 nm.

25. The electrochromic device of claim 17, wherein the at least one color-tuning layer lies adjacent the metal layer.

26. The electrochromic device of claim 25, wherein the metal layer is transparent by virtue of being adjacent to the at least one color-tuning layer.

27. The electrochromic device of claim 19, wherein the first transparent conductive oxide layer has a thickness of less than 200 nm.

28. The electrochromic device of claim 19, wherein the first transparent conductive oxide layer has a thickness between 20 nm and 50 nm.

29. The electrochromic device of claim 28, wherein the metal layer has a thickness of less than 20 nm.

* * * * *